US006953150B2

(12) United States Patent
Shepley et al.

(10) Patent No.: US 6,953,150 B2
(45) Date of Patent: Oct. 11, 2005

(54) CASH DISPENSING AUTOMATED BANKING MACHINE DIAGNOSTIC DEVICE

(75) Inventors: Steven Shepley, Uniontown, OH (US); Glenda Griswold, North Canton, OH (US)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 0 days.

(21) Appl. No.: 10/721,114

(22) Filed: Nov. 25, 2003

(65) Prior Publication Data

US 2004/0149818 A1 Aug. 5, 2004

Related U.S. Application Data

(60) Provisional application No. 60/429,249, filed on Nov. 25, 2002, provisional application No. 60/429,250, filed on Nov. 25, 2002, provisional application No. 60/429,476, filed on Nov. 26, 2002, provisional application No. 60/429,521, filed on Nov. 26, 2002, provisional application No. 60/429,528, filed on Nov. 26, 2002, provisional application No. 60/453,370, filed on Mar. 10, 2003, and provisional application No. 60/465,733, filed on Apr. 25, 2003.

(51) Int. Cl.[7] .................... G06F 17/60

(52) U.S. Cl. .................... 235/379; 902/38; 902/39; 235/380

(58) Field of Search .................... 235/379, 437, 235/385, 440, 381; 902/38, 39

(56) References Cited

U.S. PATENT DOCUMENTS 4,186,871 A * 2/1980 Anderson et al. ............. 705/71
5,253,167 A * 10/1993 Yoshida et al. ............... 705/43
5,563,393 A * 10/1996 Coutts ........................ 235/379
5,983,197 A * 11/1999 Enta ........................... 705/16
6,279,826 B1 * 8/2001 Gill et al. ................... 235/379
6,364,697 B1 * 4/2002 Tseng et al. ................ 439/533
6,431,439 B1 * 8/2002 Suer et al. .................. 235/380
6,676,018 B1 * 1/2004 Trelawney et al. ......... 235/381
6,789,730 B1 * 9/2004 Trelawney et al. ......... 235/376

* cited by examiner

*Primary Examiner*—Daniel Stcyr
*Assistant Examiner*—Daniel A. Hess
(74) *Attorney, Agent, or Firm*—Ralph E. Jocke; Christopher L. Parmelee; Walker & Jocke

(57) ABSTRACT

An automated banking machine (10) includes a lockable first fascia portion (20) which when unlocked enables access to a chest lock input device (104), inputs to which enable opening a chest door (18) of the machine. Opening the first fascia portion also enables access to an actuator (116) which enables moving a second fascia portion (22) for conducting service activities. A controller (72) in the machine selectively illuminates light emitting devices (118, 126) for purposes of facilitating user operation of the machine. Sensing devices (128) adjacent a card reader slot (28) on the machine enables the controller to detect the presence of unauthorized card reading devices. Servicing the machine is facilitated through use of a portable diagnostic article (98) which enables the controller to access diagnostic data stored in memory and which provides data indicative of the significance of the diagnostic data.

16 Claims, 32 Drawing Sheets

2540

CASH DISPENSING AUTOMATED BANKING MACHINE DIAGNOSTIC DEVICE

CROSS REFERENCE TO RELATED APPLICATION

This Application claims benefit pursuant to 35 U.S.C. §119(e) of Provisional Application Ser. Nos.: 60/429,249 filed Nov. 25, 2002; 60/429,250 filed Nov. 25, 2002; 60/429,476 filed Nov. 26, 2002; 60/429,521 filed Nov. 26, 2002; 60/429,528 filed Nov. 26, 2002; 60/453,370 filed Mar. 10, 2003; and 60/465,733 filed Apr. 25, 2003.

TECHNICAL FIELD

This invention relates to automated banking machines. Specifically this invention relates to automated banking machine apparatus, systems and methods that provide for improved reliability and serviceability.

BACKGROUND ART

Automated banking machines are known. A common type of automated banking machine used by consumers is an automated teller machine ("ATM"). ATMs enable customers to carry out banking transactions. Examples of banking transactions that are sometimes carried out with ATMs include the dispensing of cash, the making of deposits, the transfer of funds between accounts, the payment of bills, the cashing of checks, the purchase of money orders, the purchase of stamps, the purchase of tickets, the purchase of phone cards and account balance inquiries. The types of banking transactions a customer can carry out at an ATM are determined by the particular banking machine, the system in which it is connected and the programming of the machine by the entity responsible for its operation.

Other types of automated banking machines may be operated in other types of environments. For example certain types of automated banking machines may be used in a customer service environment. For example certain types of automated banking machines may be used for purposes of counting currency or other items that are received from or which are to be given to a customer. Other types of automated banking machines may be used to validate items which provide the customer with access, value or privileges such as tickets, vouchers, checks or other financial instruments. Other examples of automated banking machines may include machines which are operative to provide users with the right to merchandise or services in an attended or a self-service environment. For purposes of this disclosure an automated banking machine shall be deemed to include any machine which may be operated to carry out transactions including transfers of value.

ATMs may include various types of transaction function devices. These devices are operated to carry out transactions. Different types of ATMs include different types of devices. The different types of devices enable the ATM to carry out different types of transactions. For example, some types of ATMs include a depository for accepting deposits while other ATMs do not. Some ATMs have a "touch screen" while others have separate displays and input buttons. ATMs can also be fitted with devices such as cash and coin acceptors, statement printers, check validators, bill acceptors, thumb print readers and other types of devices, while other ATMs do not include such devices.

Many financial institutions wish to add new functionality to their existing ATMs. For example, a bank with ATMs for dispensing cash may wish to add a statement printer to each of the ATMs for printing a customer's banking statement. Such new functionality usually requires additional software modifications to the ATM in addition to the new hardware. Unfortunately, the process of updating ATM software is typically complicated by the fact that many financial institutions purchase ATM hardware from more than one manufacturer. Thus, to add new software for performing a new function such as printing banking statements, separate applications must be written or modified for each vendor-specific ATM platform. Compounding this complexity, vendor-specific ATM platforms may similarly incorporate transaction function devices from a variety of other sources so within a vendor-specific ATM platform, significant variation may also be present in vendor-specific transaction function device drivers. Porting applications to multiple ATM platforms, significantly reduces the productivity of the ATM software developers. Consequently, there exists a need for an architecture that enables developers to write ATM applications that work with minimal modification on a plurality of proprietary ATM platforms, with a plurality of proprietary transaction function devices.

To achieve this goal, industry standards are being developed which are designed to enable ATM hardware and software to be cross-vendor compatible. One example of such a standard is WOSA/XFS (Windows Open Services Architecture/eXtensions for Financial Services) which is defined by the CEN/ISSS XFS standard committee. FIG. 26 shows a schematic view of an exemplary WOSA/XFS architecture. An exemplary WOSA/XFS enabled ATM 1110 may include a WOSA/XFS Manager 1112. The WOSA/XFS Manager 1112 includes a standardized interface to enable an ATM terminal application 1114 to communicate with ATM transaction function devices 1116. Each transaction function device 1116 includes a corresponding service provider interface component 1118. The service providers 1118 are supplied by the vendors of the ATM devices 1116 and are specially designed to accept requests from the WOSA/XFS Manager 1112 and pass those requests on to the corresponding device 1116. Theoretically, the ATM terminal application 1114 will be able to run on any vendor's ATM hardware 120 as long as both the ATM terminal application 1114 and the vendor's implementation of the service providers 1118 adhere to the WOSA/XFS specifications.

Another example of an emerging industrial standard for an ATM hardware/software architecture is J/XFS (Java/eXtensions for Financial Services). Unlike WOSA-XFS which is designed for Microsoft Windows® platforms only, J/XFS is a Java-based architecture that may be implemented on any hardware/software platform that supports a Java Virtual Machine (JVM). As shown in FIG. 27, an exemplary J/XFS enabled ATM 1210 may include a J/XFS Kernel. The J/XFS Kernel is similar in functionality to the previously described WOSA/XFS Manager 1112, however the J/XFS Kernel runs in a JVM 1224. The J/XFS Kernel is operative responsive to commands from an ATM terminal application 1214 to have a device service layer 1220 control the operation of ATM devices 1216. Like the previously described service providers 1118, the device service layer 1220 includes vendor provided device services 1218 that correspond to the vendor's hardware devices 1216.

In general the previously described XFS architectures define a standard for the lowest common denominator of ATM hardware features. Unfortunately, by including only those features that are common to all ATM hardware devices, the XFS standards cannot include interfaces to unique features associated with a vendor's particular implementation of a transaction function device. One example of unique features that are not implemented in the XFS interfaces includes access to low level diagnostic testing of individual hardware components of a device. Such control over low level hardware functionality can be very useful when troubleshooting problems with a specific component such as a motor or sensor. Unfortunately, as each vendor may mechanically and/or electronically construct a particular type of device completely differently than another vendor, the XFS standards have not attempted to implement methods for testing low level vendor specific hardware.

It is desirable to keep automated banking machines in operation at all appropriate times to the extent possible. If a machine should experience a malfunction, it is useful to return the machine to service as quickly as possible. The inability to perform low-level diagnostic testing, and the wide variation in vendor developed transaction function device diagnostic testing methods and capabilities may create significant delays in diagnosing and resolving such malfunctions. Thus there exists a need for low level diagnostic tools and testing of ATM hardware which may be used in either single vendor or cross-vendor XFS enabled terminals. There further exists a need for improvements in the operation, reliability, servicing and repair of automated banking machines.

DISCLOSURE OF INVENTION

It is an object of an exemplary embodiment of the invention to provide an automated banking machine.

It is a further object of an exemplary embodiment of the invention to provide an automated banking machine which provides improved access for servicing.

It is a further object of an exemplary embodiment of the invention to provide an automated banking machine which enables controlling the temperature of machine components to extend service life.

It is a further object of an exemplary embodiment of the invention to provide an automated banking machine which provides for reliable illumination of transaction areas while facilitating servicing of the machine.

It is a further object of an exemplary embodiment of the invention to provide an automated banking machine that facilitates the detection of fraudulent activity which may be attempted at the machine.

It is a further object of an exemplary embodiment of the invention to provide an architecture including standardized low level interfaces for hardware devices made by a plurality of vendors.

It is a further object of an exemplary embodiment of the invention to provide an automated banking machine with improved diagnostic capabilities.

It is a further object of an exemplary embodiment of the invention to provide an automated banking machine which reduces the risk of unauthorized access to devices and operations of the machine.

Further objects of exemplary embodiments will be made apparent in the following Best Modes for Carrying Out Invention and the appended claims.

The foregoing objects are accomplished in some exemplary embodiments by an automated banking machine which is an ATM. The ATM includes a plurality of transaction function devices. In the exemplary embodiment the transaction function devices include input and output devices which are part of a user interface. In the exemplary embodiment the transaction function devices also include devices for carrying out types of banking transactions such as a currency dispenser device and a deposit accepting device. The exemplary embodiment of the ATM also includes at least one computer which is generally referred to herein as a controller, and which is operative to cause the operation of the transaction function devices in the machine.

In some exemplary embodiments the controller may include a module interface framework which provides a uniform interface between an ATM application and a plurality of modules, generally comprising transaction function devices. An exemplary module interface framework includes a device server which is operative as a device dispatcher and manager. The device server may be accessed by a terminal application, XFS service provider component (SP), and/or a diagnostic application through at least one module interface application program interface ("API"). The device server is operative to selectively direct transaction function devices to operation through use of one of module interface components which corresponds to the transaction function devices. The use of a module interface framework enables the use of a consistent set of commands for use by one or more applications to control a plurality of vendor specific transaction function devices which may be incorporated in any individual ATM In some embodiments, it may be desirable to use a cross-vendor ATM terminal application, in which case an XFS layer, using a service provider for each transaction function device may be employed between the ATM terminal application and the module interface framework or in parallel with the module interface framework.

In an exemplary embodiment the ATM includes a housing with a secure chest portion and an upper housing area. The chest portion houses certain transaction function devices such as the currency dispenser device. The chest portion includes a chest door which is generally secured but which is capable of being opened when unlocked by authorized persons.

In the exemplary embodiment the upper housing area includes a first portion and a second portion. Access to the first and second portions are controlled by independently movable first and second fascia portions. In the exemplary embodiment one or more devices that must be manipulated in order to unlock the chest door are positioned within the first housing area. Access to the first portion of the upper housing is controlled by a fascia lock in operative connection with the first fascia portion. Thus when servicing of devices within the chest portion is required, a servicer first accesses the first portion of the upper housing area by unlocking the fascia lock to gain access to the chest lock input devices located within the upper housing area in the first portion. Once access to the first portion is achieved, the servicer provides one or more inputs to the chest lock input device to enable unlocking the chest door. In the exemplary embodiment this may be accomplished without moving the second fascia portion or moving the transaction function devices which are located within the second portion of the upper housing area.

In some exemplary embodiments the display types used as part of the user interface of the automated banking machine generate considerable heat. The combination of the heat generated by the display as well as other devices within the housing of the machine can cause elevated temperatures within the housing. This problem may occur more frequently within machines that are located in an outdoor environment where the external temperature may often become elevated. Unduly high temperatures within the machine may cause damage to the display or other machine components, or may shorten component life.

In the exemplary embodiment the housing is provided with an air cooling opening in proximity with the display so as to facilitate a flow of cooling air therethrough. In a further exemplary embodiment a baffle structure is provided in intermediate relation between the air cooling opening and the display and other components within the machine, so as to reduce the risk of moisture and other contaminants entering the interior of the machine as well as to reduce the risk of unauthorized access. In an exemplary embodiment the baffle structure is adapted to direct moisture and other contaminants to the outside of the housing of the machine while facilitating access to the transaction function devices for servicing.

In some exemplary embodiments during operation of the ATM, the transaction areas are illuminated to facilitate operation of the machine by users. Such transaction areas include in an exemplary embodiment, recessed pockets on the machine housing from which users can receive currency to be delivered to them, as well as where a user inputs deposit items. Further in an exemplary embodiment the controller of the ATM is operative to illuminate the transaction areas at those times when the user would be expected to receive or place items in such transaction areas during the conduct of transactions. This facilitates guiding the user to the particular transaction area on the machine even when the machine is being operated during daylight hours.

In an exemplary embodiment the transaction areas are positioned on components of the machine that are relatively movable during servicing activities. To facilitate the illumination of such areas while enabling relative movement, a light transmissive window is provided adjacent to certain transaction areas in the exemplary embodiment. In an operative position of the machine the window is aligned with an illumination source located in another portion of the housing. A controller of the machine initiates illumination of the illumination source at appropriate times in the conduct of transactions which causes illumination of the transaction area. However, when servicing the machine the transaction area and the illumination source may be relatively moved without making special accommodations such as disconnecting electrical connectors or light guides in order to gain access to conduct servicing activities.

In some exemplary embodiments the capability of illuminating selected areas of the machine during certain transaction steps may be utilized in conjunction with an anti-fraud device. In an exemplary embodiment the anti-fraud device is used to reduce the risk that an unauthorized card reading device is installed externally of the machine adjacent to the card reader slot of the machine fascia. Criminals are sometimes ingenious and in the past some have produced reading devices that can intercept magnetic stripe data on cards that are being input to an ATM by a consumer. By intercepting this data, criminals may be able to conduct unauthorized transactions with the consumer's card number. Such external reading devices may be made to appear to be a part of the normal ATM fascia.

In an exemplary embodiment the housing in surrounding relation of the card reader slot is illuminated responsive to operation of the controller. In some exemplary machines the housing is operative to illuminate an area generally entirely surrounding the slot so as to make it more readily apparent to a user that an unauthorized modification or attachment to the fascia may have been made.

In some exemplary embodiments during normal operation, the illumination of the area surrounding the fascia card slot is operative to help to guide the user to the slot such as during a transaction when a user is required to input or take their card. The exemplary ATM is provided with radiation sensing devices positioned adjacent to the illumination devices that are operative to illuminate the area surrounding the card reader slot. The exemplary controller is programmed to sense changes in the magnitude of radiation sensed by the one or more radiation sensing devices. The installation of an unauthorized card reading device in proximity to the card reading slot generally produces a change in the magnitude of the radiation sensed by the radiation sensing devices. The exemplary controller is programmed to recognize such changes and to take appropriate action in response thereto so as to reduce the possibility of fraud. Such action may include in some exemplary embodiments, the machine sending a status message through a network to a person to be notified of a possible fraud condition. Such actions may also include in some embodiments, warning the user of the machine to look for the installation of a possible fraud device. Of course these approaches are exemplary and in other embodiments other approaches may be used.

In some exemplary embodiments of the ATM an improved diagnostic system may be provided for authorized servicers of the machine. The improved diagnostic system may include security features so as to reduce the risk of unauthorized persons using service and diagnostic capabilities of the machine for unauthorized purposes.

In an exemplary embodiment authorized servicers are provided with a portable diagnostic article bearing computer readable instructions such as a CD, DVD, smart card, portable memory device, compact flash card, portable hard drive, portable computing device, or any other portable device which is operative to provide diagnostic information to an ATM. When an authorized servicer is to service the machine, the portable diagnostic article is placed into operative engagement with a diagnostic article reading device. This may include for example a CD drive located within the chest portion of the housing of the ATM. This exemplary approach may reduce the risk that persons who do not have access to the chest area are enabled to access the diagnostic article reading device. However, in other embodiments other approaches may be used.

In an exemplary embodiment the diagnostic article provides to the controller of the machine one or more secret codes. The secret codes may then be manipulated through the operation of the controller to determine if the diagnostic article is authorized. In some embodiments a servicer may also be required to input identifying information through one or more input devices on the ATM. Such identifying information may also be utilized in the determination as to whether the diagnostic article is authorized. Further in some exemplary embodiments the secret codes in the diagnostic article may be date, location and/or device sensitive such that the diagnostic article with the secret codes may be employed only during particular times and/or during a particular calendar period, at particular machines or for only certain devices in the machine. Of course these security procedures are exemplary and in other embodiments other or additional approaches may be used.

In some exemplary embodiments the ATM controller responsive to authentication of the diagnostic article is operative to enable the machine to output protected diagnostic data which is stored in one or more data stores within the machine. This may include for example information concerning performance of devices, information concerning sensed malfunctions or near malfunctions, data concerning statistical operational trends of various transaction function devices and/or other information that may be useful in diagnosing a malfunction of the machine and/or in preventing a future malfunction. In the exemplary embodiment this diagnostic data is stored in a protected manner in the data store of the machine so as to prevent access thereto by unauthorized persons. However, when the machine is engaged with an authorized diagnostic article such data, or information based thereon, is enabled to be output either through output devices on the machine, such as a screen, and/or other devices, such as a portable terminal or cell phone carried by a servicer.

In some exemplary embodiments, the ATM controller responsive to authentication of the diagnostic article is operative to enable the machine to switch to a diagnostic application. The diagnostic application may include, for example graphical representations of the system, module, and component status by displaying a graphical representation of the system, or selected module, or component. In addition, the diagnostic application may include a plurality of icons which identify portions of the system, module, or component about which more information is available, or for which diagnostic tests or other options may be available. In some embodiments of a diagnostic application, options available to the servicer may include the ability to direct a transaction function device to selectively perform one or more low level actions, such as turning on an indicator light, a motor, or sensor. In some embodiments, the availability of such information may be announced by other output means, such as textually or aurally or audibly. In some exemplary embodiments, such information, tests, or other options may be accessed or initiated by touching or clicking the related icon or textual description. In some embodiments, the information available may include suggested recovery actions, ranked by likelihood. This diagnostic application may further be operable responsive to a servicer input to switch from a graphical diagnostic and testing mode to a non-graphical diagnostic and mode.

In some exemplary embodiments the diagnostic article further includes service data which is useful in diagnosing and/or correcting problems which have or which may occur at the machine. In some embodiments the service data may be included within or interoperable with electronic service manual data which describes various features of the machine and instructions for remedial actions and preventive maintenance. In some exemplary embodiments the service data may include instructions which are operative to cause the controller within the machine to conduct at least one diagnostic test of one or more transaction function devices. In some embodiments the service data may further be operative to enable the controller to output suggested remedial actions or suggest further testing based on one or more results of a diagnostic test. In some embodiments, the diagnostic application may be operative responsive to servicer selection of a recovery action to display the relevant service manual data in a browser window. In further exemplary embodiments a servicer may be enabled to browse through service manual data or other information included in or on the diagnostic article so as to receive outputs that facilitate servicing and maintaining the machine.

In some exemplary embodiments, the diagnostic application may be made more accessible to a variety of servicers by use of a diagnostics toolkit. The diagnostics toolkit makes common functions available through the use of sample code, templates, and high level objects in programming environments such as Microsoft NET and/or Suns Microsystems JAVA for example. The use of such a toolkit allows a company to create diagnostic applications in a variety of languages and for a variety transaction function devices.

In some exemplary embodiments the diagnostic article may include service or other data in an encrypted format. Various types of standard and nonstandard encryption may be used in various embodiments. The controller may be operative to decrypt such encrypted data so as to facilitate the output of the data from the ATM. Further in some exemplary embodiments the diagnostic article may include browser software thereon. Such browser software may be loaded from the diagnostic article to the controller of the machine and used to interpret the service data from the diagnostic article. In some embodiments the browser software may be operative to interpret embedded instructions of a nonpublic and/or nonstandard nature which may be included within the service data. This may facilitate the provision of service data on the diagnostic article while preventing access by unauthorized users. In some exemplary embodiments the diagnostic article may further include instructions or devices which prevent the permanent loading of the browser software and/or service data onto another computer and/or may operate to cause such items to be erased from memory of a computer when the diagnostic article is removed from operative engagement with a computer.

In some exemplary embodiments the diagnostic article may be utilized with computer devices that are separate from the ATM. This may include for example devices such as notebook computers, PCs, PDAs or cell phones. In such exemplary embodiments the service article may be utilized with such devices to provide access to service data thereon such as for example electronic service manuals. Security provisions may be provided in the manner previously discussed or in other manners to assure that use is not made of the diagnostic article by unauthorized users. Further, in exemplary embodiments instructions from the service article that may be operative to cause a controller of an ATM to interact with transaction function devices may be rendered inoperative when the service article is installed in connection with a computer device which is not an ATM.

As will be appreciated, the foregoing objects and examples are exemplary and embodiments of the invention need not meet all or any of the foregoing objects, and need not include all or any of the exemplary features described above. Additional aspects and embodiments within the scope of the claims will be devised by those having skill in the art based on the teachings set forth herein.

BEST MODES FOR CARRYING OUT INVENTION

Figure 1:
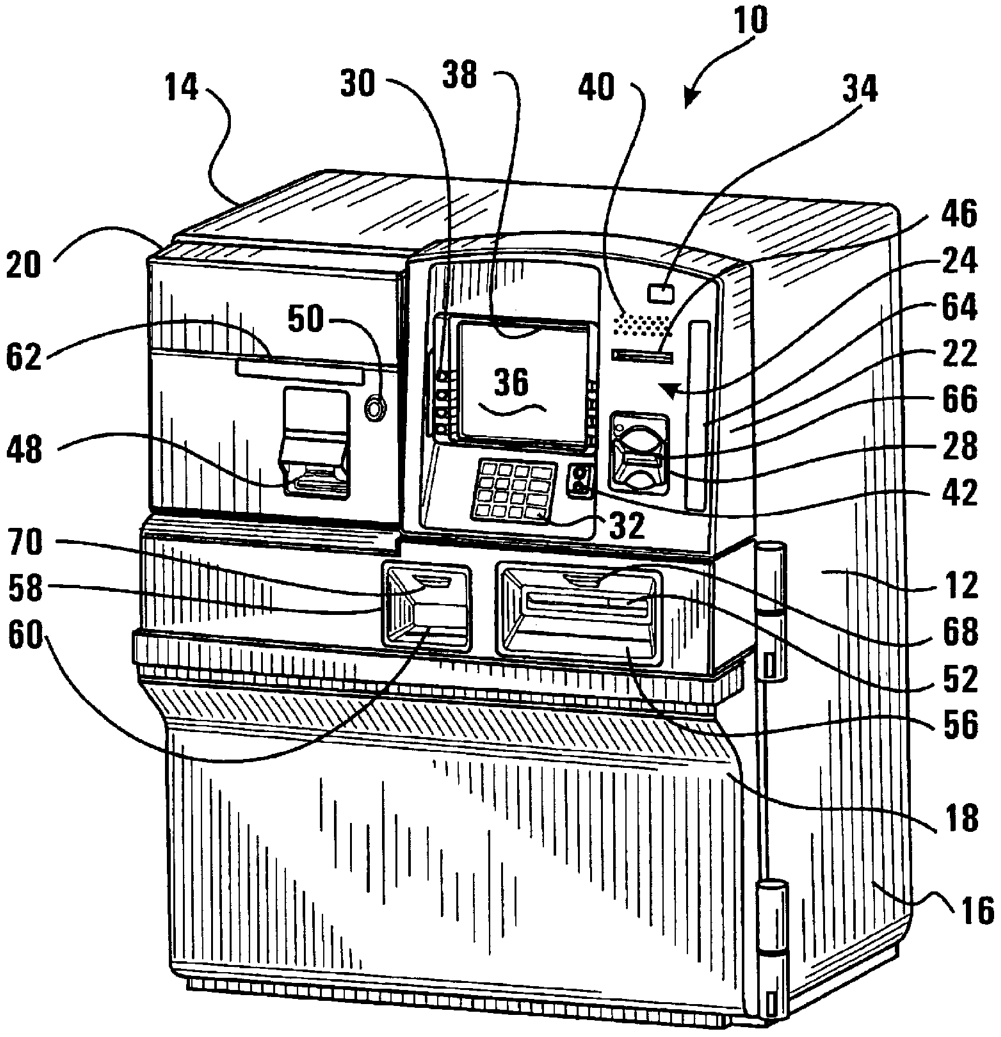
FIG. 1 is an isometric external view of an exemplary embodiment of an automated banking machine which is an ATM.

Referring now to the drawings and particularly to FIG. 1, there is shown therein an exemplary embodiment of an automated banking machine generally indicated 10. In the exemplary embodiment automated banking machine 10 is a drive up ATM, however the features described and claimed herein are not necessarily limited to ATMs of this type. The exemplary ATM includes a housing 12. Housing 12 includes an upper housing area 14 and a secure chest portion 16 in a lower portion of the housing. Access to the chest portion 16 is controlled by a chest door 18 which when unlocked by authorized persons in the manner later explained, enables gaining access to the interior of the chest area.

The exemplary ATM 10 further includes a first fascia portion 20 and a second fascia portion 22. Each of the fascia portions is movably mounted relative to the housing as later explained, which in the exemplary embodiment facilitates servicing.

The ATM includes a user interface generally indicated 24. The exemplary user interface includes input devices such as a card reader 26 (shown in FIG. 3) which is in operative connection with a card reader slot 28 which extends in the second fascia portion. Other input devices of the exemplary user interface 24 include function keys 30 and a keypad 32. The exemplary ATM 10 also includes a camera 34 which also may serve as an input device for biometric features and the like. The exemplary user interface 24 also includes output devices such as a display 36. Display 36 is viewable by an operator of the machine when the machine is in the operative connection to an opening 38 in the second fascia portion 22. Further output devices in the exemplary user interface include a speaker 40. A headphone jack 42 also serves as an output device. The headphone jack 42 may be connected to a headphone provided by a user who is visually impaired to provide the user with voice guidance in the operation of the machine. The exemplary machine further includes a receipt printer 44 (see FIG. 3) which is operative to provide users of the machine with receipts for transactions conducted. Transaction receipts are provided to users through a receipt delivery slot 46 which extends through the second fascia portion. Exemplary receipt printers that may be used in some embodiments are shown in U.S. Pat. Nos. 5,729,379 and 5,850,075, the disclosures of which are incorporated by reference herein. It should be understood that these input and output devices of the user interface 24 are exemplary and in other embodiments, other or different input and output devices may be used.

In the exemplary embodiment the second fascia portion 22 has included thereon a deposit envelope providing opening 48. Deposit envelopes may be provided from the deposit envelope providing opening 48 to users who may place deposits in the machine. The first fascia portion 20 also includes a fascia lock 50. Fascia lock 50 is in operative connection with the first fascia portion 20 and limits access to the first portion of the upper housing area behind the fascia to authorized persons. In the exemplary embodiment fascia lock 50 comprises a key type lock. However, in other embodiments other types of locking mechanisms may be used. Such other types of locking mechanisms may include for example, other types of mechanical and electronic locks that are opened in response to items, inputs, signals, conditions, actions or combinations or multiples thereof.

The exemplary ATM 10 further includes a delivery area 52. Delivery area 52 is in connection with a currency dispenser device 54 which is positioned in the chest portion 16 and is shown schematically in FIG. 3. The delivery area 52 is a transaction area on the machine in which currency sheets are delivered to a user. In the exemplary embodiment the delivery area 52 is positioned and extends within a recessed pocket 56 in the housing of the machine.

ATM 10 further includes a deposit acceptance area 58. Deposit acceptance area 58 is an area through which deposits such as deposit envelopes to be deposited by users are placed in the machine. The deposit acceptance area 58 is in operative connection with a deposit accepting device positioned in the chest portion 16 of the ATM. Exemplary types of deposit accepting devices are shown in U.S. Pat. Nos. 4,884,769 and 4,597,330, the disclosures of which are incorporated herein by reference.

In the exemplary embodiment the deposit acceptance area 58 serves as a transaction area of the machine and is positioned within a recessed pocket 60. It should be understood that while the exemplary embodiment of ATM 10 includes an envelope deposit accepting device and a currency sheet dispenser device, other or different types of transaction function devices may be included in automated banking machines and devices encompassed by the present invention. These may include for example, check and/or money order accepting devices, ticket accepting devices, stamp accepting devices, card dispensing devices, money order dispensing devices and other types of devices which are operative to carry out transaction functions.

In the exemplary embodiment illustrated in FIG. 1, the ATM 10 includes certain illuminating devices which are used to illuminate transaction areas, some of which are later discussed in detail. First fascia portion 20 includes an illumination panel 62 for illuminating the deposit envelope providing opening 48. Second fascia portion 22 includes an illumination panel 64 for illuminating the area of the receipt delivery slot 46 and the card reader slot 28. Further, an illuminated housing 66 later discussed in detail, bounds the card reader slot 28. Also, in the exemplary embodiment an illuminating window 68 is positioned in the recessed pocket 56 of the delivery area 52. An illuminating window 70 is positioned in the recessed pocket 60 of the deposit acceptance area 58. It should be understood that these structures and features are exemplary and in other embodiments other structures and features may be used.

Figure 3:
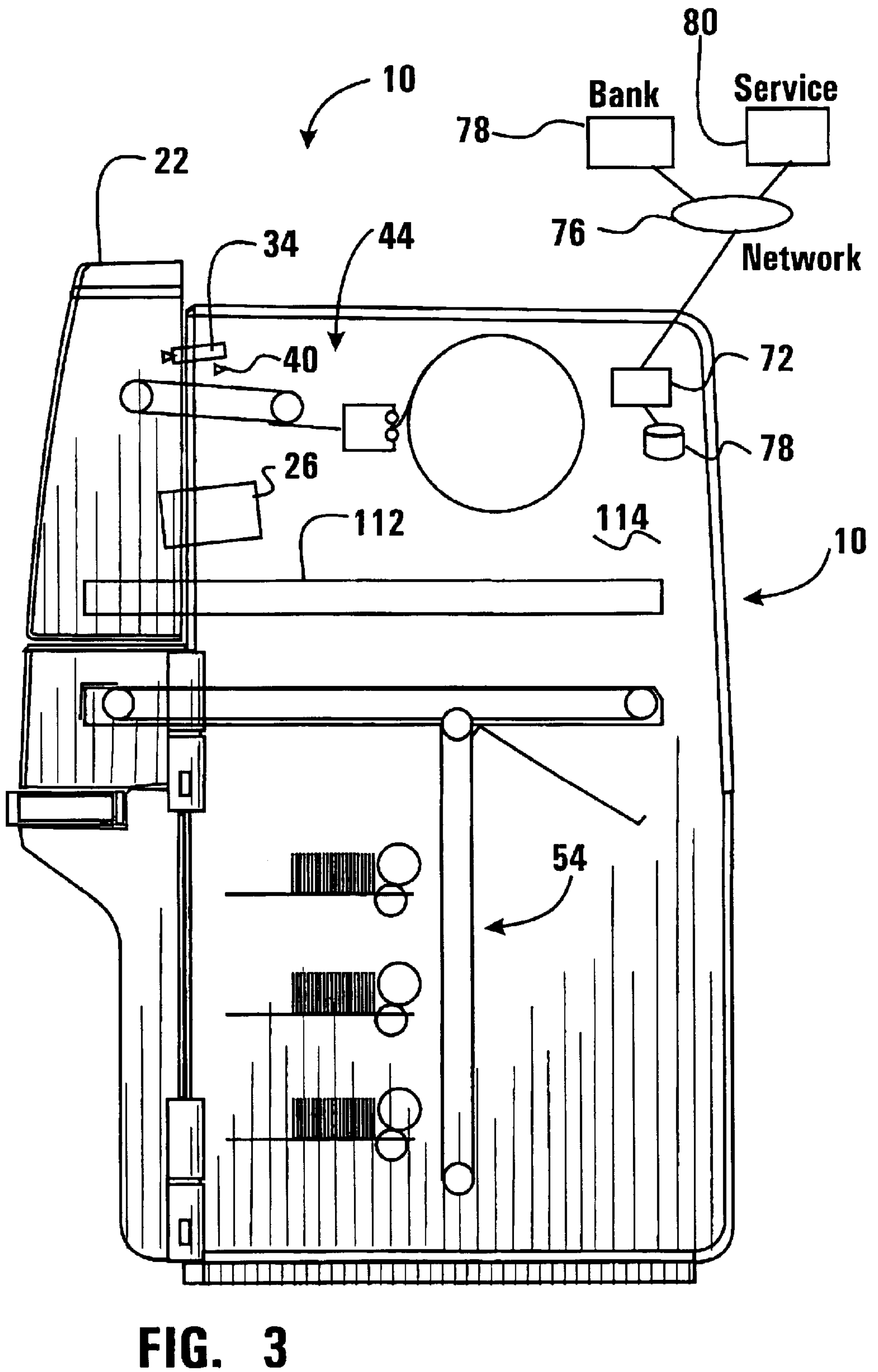
FIG. 3 is a transparent side view showing schematically some internal features of the ATM.

As schematically represented in FIG. 3, the ATM 10 includes one or more internal computers. Such internal computers include one or more processors. Such processors may be in operative connection with one or more data stores. In some embodiments processors may be located on certain devices within the ATM so as to individually control the operation thereof. Examples such as multi-tiered processor systems are shown in U.S. Pat. Nos. 6,264,101 and 6,131,809, the disclosures of which are incorporated herein by reference.

For purposes of simplicity, the exemplary embodiment will be described as having a single controller which controls the operation of devices within the machine. However it should be understood that such reference shall be construed to encompass multicontroller and multiprocessor systems as may be appropriate in controlling the operation of a particular machine. In FIG. 3 the controller is schematically represented 72. Also as schematically represented, the controller 72 is in operative connection with one or more data stores 78. Such data stores 78 in exemplary embodiments are operative to store program instructions, values and other information used in the operation of the machine. Although the controller 72 is schematically shown in the upper housing area 14 of ATM 10, it should be understood that in alternative embodiments controllers may be located within various portions of the automated banking machine.

In order to conduct transactions the exemplary ATM 10 communicates with remote computers. The remote computers are operative to exchange messages with the machine and authorize and record the occurrence of various transactions. This is represented in FIG. 3 by the communication of the machine through a network 76 with a bank 78, which has at least one computer which is operative to exchange messages with the ATM through a network 76. For example, the bank 78 may receive one or more messages from the ATM requesting authorization to allow a customer to withdraw $200 from their account. The remote computer at the bank 78 will operate to determine that such a withdrawal is authorized and will return one or more messages to the machine through the network 76 authorizing the transaction. After the ATM conducts the transaction, the ATM will generally send one or more messages back through the network 76 to the bank 78 indicating that the transaction was successfully carried out. Of course these messages are merely exemplary.

It should be understood that in some embodiments the ATM may communicate with other entities and through various networks. For example as schematically represented in FIG. 3, the ATM will communicate with computers operated by service providers 80. Such communications may occur through a network 76. Such service providers may be entities to be notified of status conditions or malfunctions of the ATM as well as entities who are to be notified of corrective actions. An example of such a system for accomplishing this is shown in U.S. Pat. No. 5,984,178, the disclosure of which is incorporated by reference herein. Other third parties who may receive notifications from exemplary ATMs include entities responsible for delivering currency to the machine to assure that the currency supplies are not depleted. Other entities may be responsible for removing deposit items from the machine. Alternative entities that may be notified of actions at the machine may include entities which hold marketing data concerning consumers and who provide messages which correspond to marketing messages to be presented to consumers. Various types of messages may be provided to remote systems and entities by the machine depending on the capabilities of the machines in various embodiments and the types of transactions being conducted.

Figure 4:
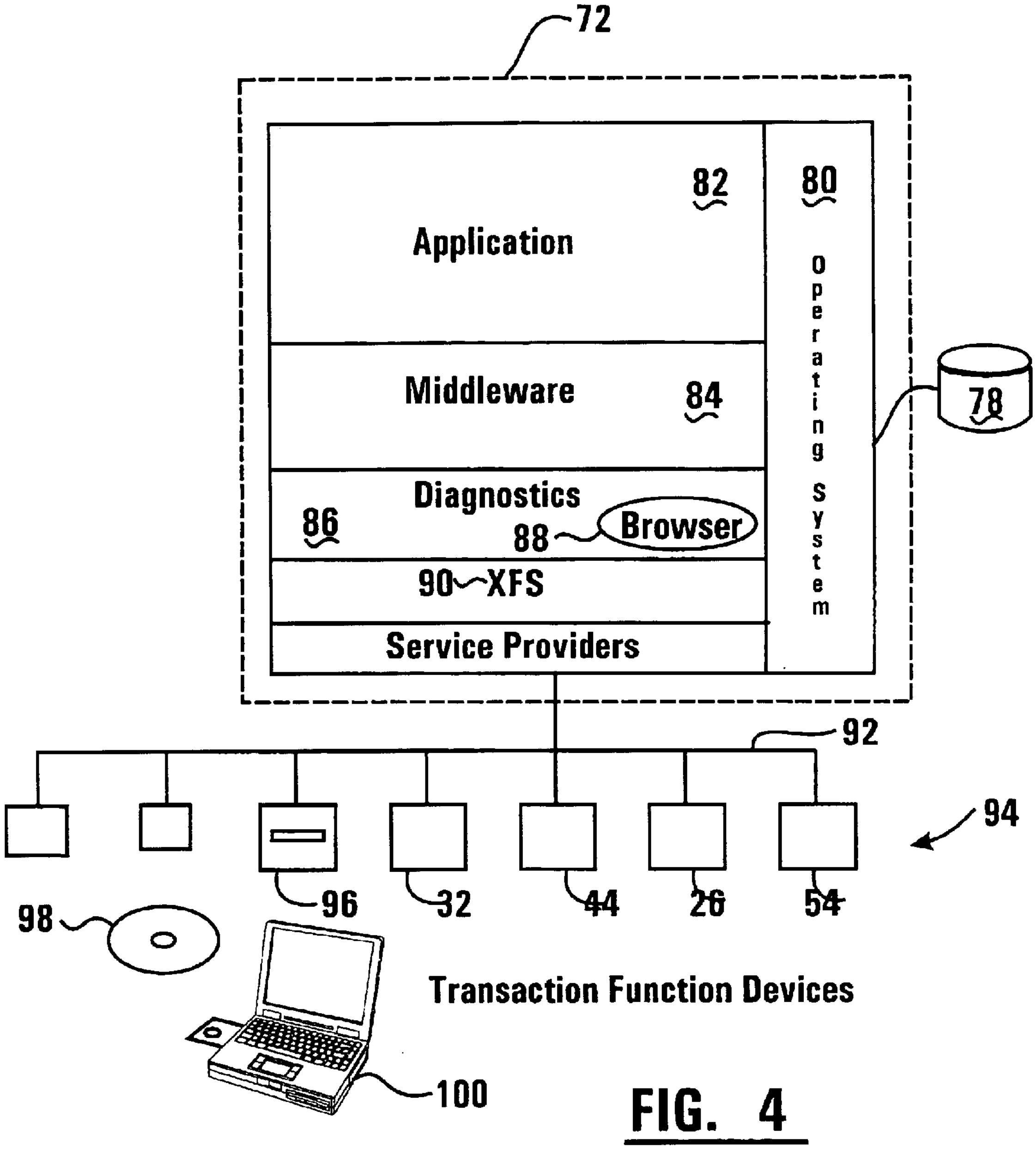
FIG. 4 is a schematic view representative of the software architecture of an exemplary embodiment.

FIG. 4 shows schematically an exemplary software architecture which may be operative in the controller 72 of machine 10. The exemplary software architecture includes an operating system such as for example Microsoft® Windows, IBM OS/2® or Linux. The exemplary software architecture also includes an ATM application 82. The exemplary application 82 includes the instructions for the operation of the automated banking machine and may include, for example, an Agilis™ 91x application that is commercially available from Diebold, Incorporated which is a software application for operating ATMs, and which may further be a cross vendor application. A further example of a software application which may be used in some embodiments is shown in U.S. Pat. No. 6,289,320, the disclosure of which is incorporated herein by reference.

In the exemplary embodiment middleware software layer schematically indicated 84 is operative in the controller 72. In the exemplary embodiment the middleware software layer 84 operates to compensate for differences between various types of automated banking machines and transaction function devices used therein. The use of a middleware software layer 84 enables the more ready use of an identical software application on various types of ATM hardware. In the exemplary embodiment the middleware software layer 84 may be Involve® software which is commercially available from Nexus Software, a wholly owned subsidiary of the assignee of the present invention.

The exemplary software architecture further includes a diagnostics layer 86. The diagnostics layer 86 is operative as later explained to enable accessing and performing various diagnostic functions of the devices within the ATM. In the exemplary embodiment the diagnostics layer 86 operate in conjunction with a browser schematically indicated 88.

The exemplary software architecture may further include an XFS layer schematically indicated 90 which is described in more detail below. The XFS layer 90 presents a standardized interface to the software layers above the XFS layer and which facilitates the development of software which can be used in conjunction with different types of ATM hardware. Of course this software architecture is exemplary and in other embodiments other architectures may be used.

Figure 28:
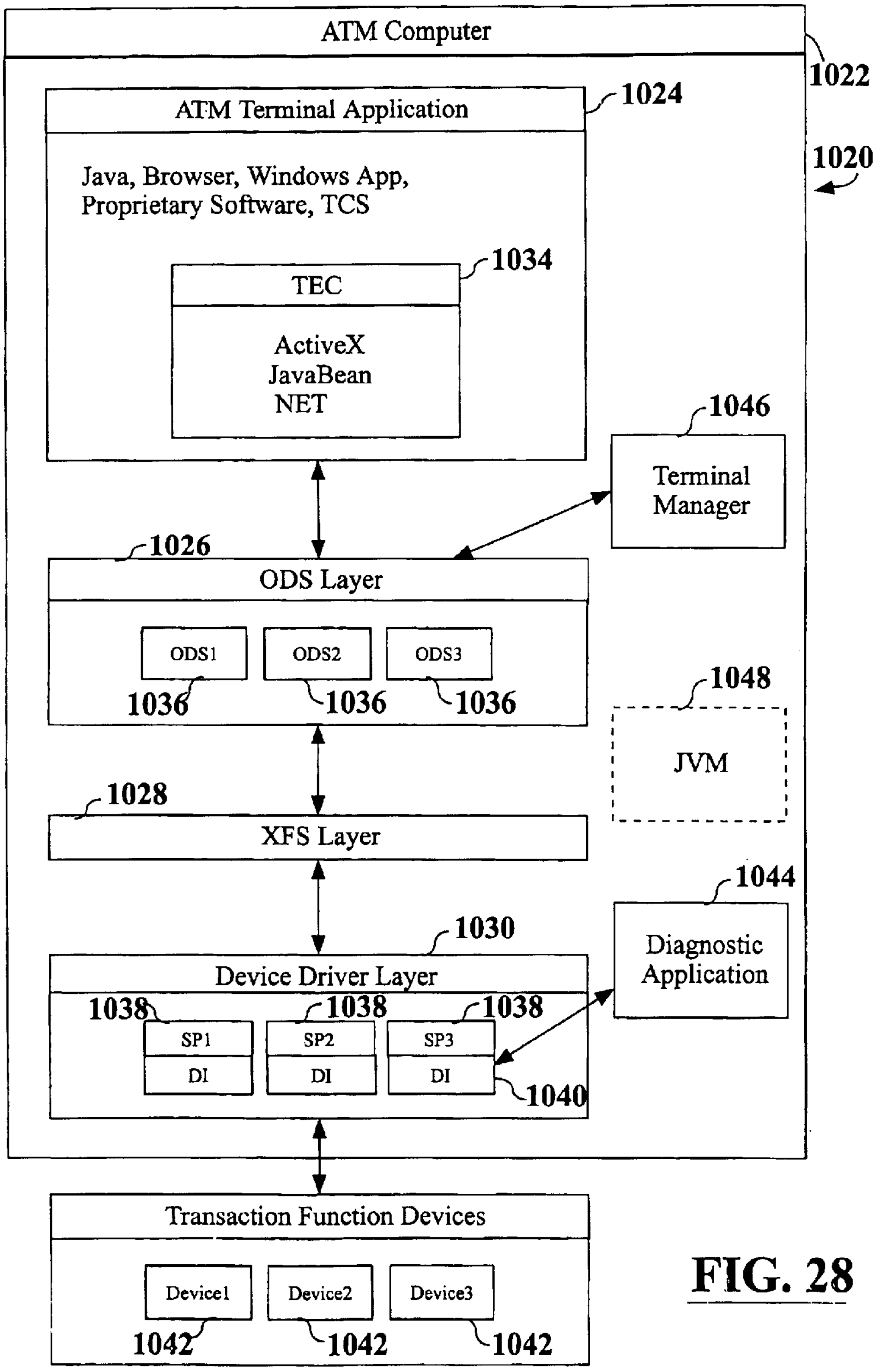
FIG. 28 is a schematic view representative of an exemplary embodiment of an XFS enabled ATM.

An example of an XFS enabled cross vendor architecture which may be used in an exemplary embodiment, includes an Agilis™ 91x application that is commercially available from Diebold, Incorporated. FIG. 28 shows a schematic view representative of an exemplary embodiment of a cross-vendor ATM architecture 1020. Here the ATM architecture 1020 includes a computer 1022 that is in operative connection with a plurality of transaction function devices 1042. Such transaction function devices may include for example such devices as a note dispenser, coin dispenser, card reader, printer, key pad, display device, function keys, depositor, cash acceptor or any other hardware device that may be operatively connected to an ATM.

The computer 1022 may include software components including a terminal application 1024 that is operative to control the operation of the transaction function devices 1042. The computer 1022 may further include an XFS layer 1028 that corresponds to a multi-vendor supported interface for ATM devices such as the WOSA/XFS Manager or the J/XFS Kernel. A current release of the XFS layer includes XFS 3.0. Exemplary embodiments of the components described herein which communicate with the XFS layer may be compatible with the XFS 3.0 standard or any other older or new XFS standard that is developed.

In addition, the computer 1022 may further include a device driver layer 1030 which includes a plurality of device driver components 1038 that interface with the XFS layer. For example, if the XFS layer corresponds to the WOSA/XFS Manager, the device driver components 1038 correspond to the WOSA/XFS service provider interfaces. If the XFS layer corresponds to the J/XFS Kernel, the device driver components 1038 correspond to the J/XFS device services. In an exemplary embodiment which includes a J/XFS Kernel terminal applications may use Sun Microsystems' Java®. Examples of automated transaction machines that include a Java-based terminal application are found in U.S. application Ser. No. 09/193,637 which, is incorporated herein by reference in its entirety. As used herein device drivers which correspond to either WOSA/XFS service provider interfaces or J/XFS device services are referred to as service provider components 1038 or SP components.

For each transaction function device 1042, an SP 1038 must be installed in the computer that is operative to enable commands passed through the XFS layer 1028 to control the operation of the transaction function devices 1042. In one exemplary embodiment the SPs 1038 are manually installed from a portable physical media such as a disk or CD supplied by the manufacture of the device. In another exemplary embodiment the SPs are operatively downloaded from a data store of SPs that is in operative connection with the computer. In a further exemplary embodiment the SPs are retrieved by the computer 1022 from the transaction function devices 1042 themselves using a service configuration protocol such as Sun Microsystems JINI™, Microsoft Universal Plug and Play™, or other plug and play architecture.

Each of the SPs 1038 are operative responsive to the XFS layer 1028 to have at least one transaction function device 1042 perform a function. For example, a card reader SP is operative responsive to a read card request from the XFS layer 1028 to have its corresponding card reader device physically read information from a card and return the information through the XFS layer. Another SP such as a note dispenser SP is operative responsive to a dispense request from the XFS layer 1028 to have its corresponding cash dispenser dispense an amount of notes.

In this described exemplary embodiment the terminal application 1024 is operative to control transaction function devices 1042 through communication with the XFS layer 1028. However, rather than having the terminal application 1024 communicate with the XFS layer directly, the exemplary embodiment includes an ODS layer 1026 operative in the computer 1022 between the terminal application 1024 and the XFS layer 1028. An example of an ODS layer may include the previously described Involve® software.

In this described exemplary embodiment, the ODS layer 1026 is operative responsive to the terminal application 1024 to control the functionality of transaction function devices 1042 through communication with the XFS and device driver layers 1028 and 1030. The ODS layer 1026 includes a plurality of ODS components 1036 that generally correspond to the SPs 1038 and/or the transaction function devices 1042. For example, the exemplary embodiment may include a card reader ODS component that corresponds to a card reader SP for a card reader. An exemplary embodiment may also include a note dispenser ODS component that corresponds to a note dispenser SP for a note dispenser.

When SPs from two or more vendors generally communicate with the XFS layer in a consistent manner, a single ODS component may be used when either of the drivers are installed in the ATM. However, if the vendor-specific SPs implement communication with the XFS layer in a different manner, vendor-specific ODS components may be operatively programmed for each of the vendor-specific SPs. A vendor specific ODS component may then be installed in the ODS layer responsive to whichever vendor-specific SP is installed in the ATM. The vendor specific ODS component is operative to communicate through the XFS layer in a manner that is appropriate for the particular implementation of the vendor-specific driver.

Although each vendor-specific ODS component may communicate with the XFS layer in a different manner, all of the vendor specific ODS components for a particular type of device share a common interface for access by external applications such as the terminal application 1024. The ODS layer 1026 is thus operative to isolate the inconsistencies in communication between different SPs, and to present the terminal application 1024, or any other application, with a common set of methods, properties and events for communicating with transaction function devices from different vendors.

The described exemplary embodiment encompasses a testing process that is operative to identify unique characteristics and/or inconsistencies in a vendor's implementation of a SP and to operatively adapt ODS components to include those features that are necessary to properly and consistently communicate with the SP through the XFS layer.

In general the testing process includes the configuration of the particular vendor's hardware device and corresponding SP on an XFS enabled test platform. The test platform typically includes a computer system with an XFS layer and an ODS component that corresponds to the particular type of the vendor's device. For example, if the particular device being tested is a note dispenser, an ODS component that corresponds to an SP for a note dispenser is installed in the test platform.

The test platform further includes a testing application. The testing application is operative to interface with the ODS component and issue a plurality of commands through the ODS component to control the operation of the vendor's device. A user may monitor and/or interact with the device and the test application to determine which functions of the device may or may not work properly with the ODS component.

For example, when testing a card reader the testing application enables a user to issue a command to the ODS component to have the device read a card. The testing application is further operative to output to the user the results of the operation. If the operation appears to work correctly, the testing application may display the contents of the information read from the card. A user may then verify that the contents are correct. If the operation failed, the user may evaluate the error messages that are generated. In addition, if the operation triggers an unexpected event through the XFS layer, the testing application is further operative to report what events have been triggered as a result of the operation.

In addition to monitoring the testing application, the user may also monitor the actual device to determine if the operation produces the correct function. For example, if the device corresponds to a note dispenser, the testing application may include an operation to dispense a certain amount of cash or number of notes through communication with a cash dispenser ODS. By monitoring the cash dispenser the user can determine if the correct amount of cash was dispensed, for example. After functional problems between the current ODS component and the device have been identified, the ODS component may be operatively modified to compensate for the idiosyncrasies associated with the vendor's implementation of the SP. The modified ODS component may then be further tested on the testing platform to either uncover further inconsistencies or to certify that the ODS component works properly. Once an ODS component has been certified, it may be installed in any ATM that includes the tested vendor's device, SP and corresponding XFS layer to enable a terminal application to properly control the device's functionality.

In the exemplary embodiment the terminal application 1024 may be based on any programming architecture that is operative to communicate with the ODS layer 1026. In one exemplary embodiment the terminal application may be a Microsoft Windows-based application comprised of one or more Windows-based executable programs. In an exemplary embodiment the Windows-based application may include a plurality of .Net components and applications. In an alternative exemplary embodiment the terminal application may include a browser based application with a user interface comprised of web pages. Such web pages may include static web pages and/or dynamically generated web pages using Active Server pages, .Net, PHP, and CGI for example. In addition, the web pages may include HTML, DHTML, XML, Java Script, Active X, .Net components, Java applets, or any other markup language, component or script. In further exemplary embodiments the terminal application may be a Java application that is operative in a Java Virtual Machine (JVM).

In an exemplary embodiment, the ODS layer may be based on any programming architecture that is operative to communicate with the XFS layer 28. For example, if the XFS layer corresponds to a J/XFS Kernel running in a JVM 48 of the computer 22, the ODS components may be constructed as Java Beans that are operative in the JVM. If the XFS layer corresponds to the WOSA/XFS Manager, the ODS components may be constructed as a plurality of Windows-based DLLs and or .Net components. If portions of the XFS layer and/or terminal application are both Windows-based and Java-based, the ODS layer may include components operative in the JVM and components operative as DLLs. In other embodiments, the ODS layer and terminal application may be configured as other types of applets, modules or libraries which are appropriate for the operating system architecture and the XFS layer.

To enhance the productivity of programmers who develop a terminal application, the described exemplary embodiment may comprise the integration of transaction element components (TECs) 1034 with the terminal application 1024. TECs are objects or classes such as ActiveXs, .Net object, or Java Beans that encapsulate the complex operation of one or more transaction function devices 1042 into a package of streamlined methods, properties and events. The TEC objects include the necessary functionality to communicate with the ODS layer. In the exemplary embodiment an entire terminal application can be constructed from TEC objects. Although the ODS components 1036 may generally have a one to one relationship with corresponding SPs 1038 and/or transaction function devices 1042, the TEC objects combine logical groupings of functions for different devices resulting in the TEC objects having a generally one to many relationship with ODS components.

Figure 29:
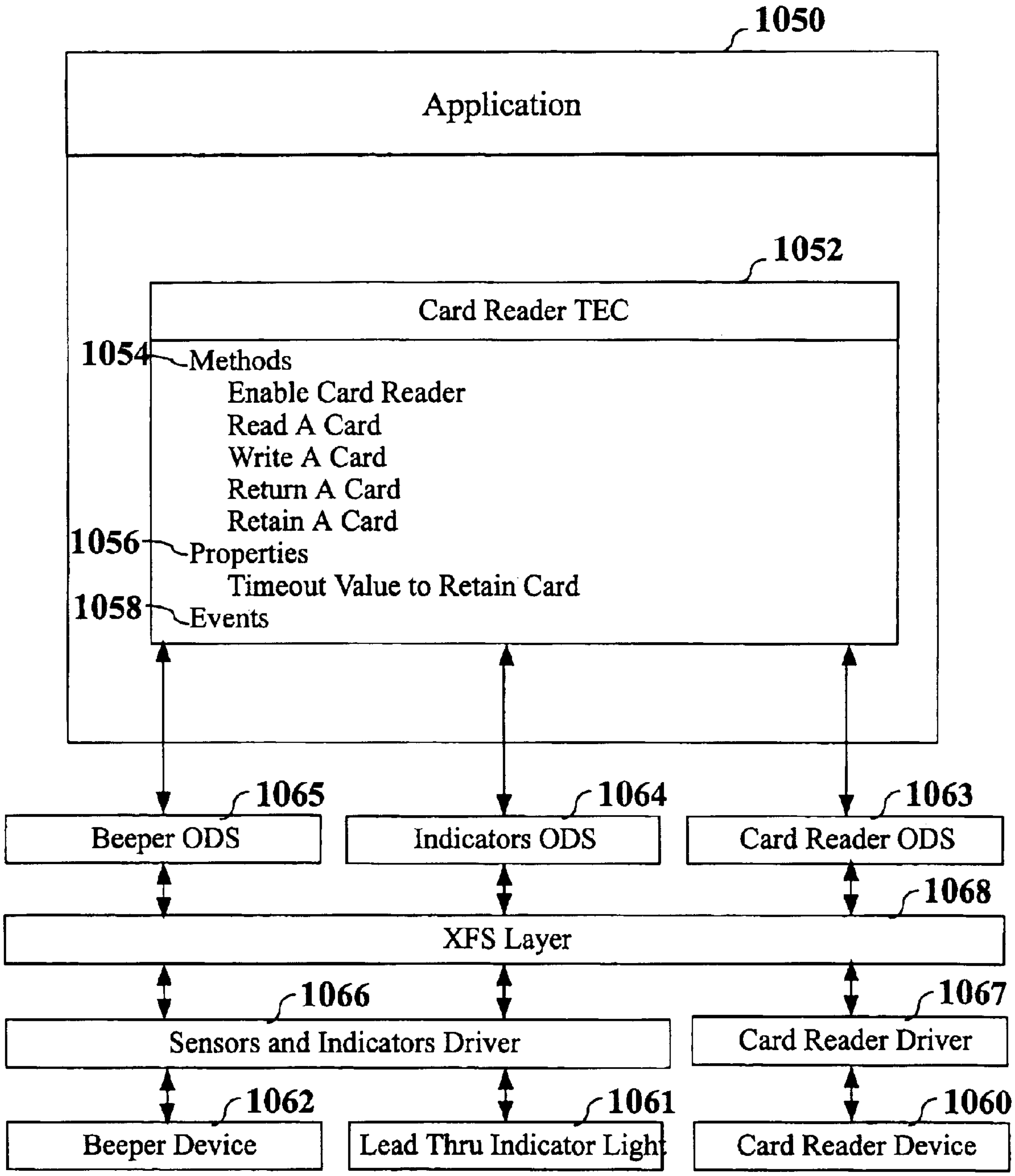
FIG. 29 is a schematic view representative of an exemplary embodiment of a terminal application that includes an exemplary card reader TEC to interact with exemplary ODS components.

FIG. 29 shows an exemplary terminal application 1050. The terminal application includes a card reader TEC 1052. The application 1050 is operative to invoke methods 1054 of the card reader TEC 1052 such as enable card reader, read a card, write a card, return a card and retain a card. The application 1050 is further operative to set properties 1056 of the card reader TEC 1052 such as the time out value before a card is returned by the card reader. In addition, the application is further operative to monitor one or more events 1058 that are triggered through the card reader TEC.

The exemplary card reader TEC 1052 is operative to communicate with three different hardware devices including a card reader device 1060, a lead through indicator device 1061 and a beeper device 1062. The exemplary card reader TEC 1052 interfaces with these devices through communication with three corresponding ODS components including a card reader ODS 1063, an indicator ODS 1064 and a beeper ODS 1065.

Through communication with the card reader ODS 1063, the card reader TEC 1052 is operative to have the card reader device 1060 perform a plurality of functions such as enabling the card reader, reading a card and returning the card to a customer. The card reader ODS communicates with the card reader device through the XFS layer 1068 and the card reader driver 1067. When enabling the card reader, the exemplary card reader TEC 1052 is further operative to automatically activate a lead thru indicator light 1061 to draw a customer's attention to the card reader 1060. This is performed by communicating with a sensors and indicators SP 1066 through interaction with the indicators ODS 1064. In addition, when a beeping sound is desired to signal the customer to remove their card, the exemplary card reader TEC 1052 interacts with the beeper ODS 1065 to have the sensors and indicators driver 1066 activate the beeper device 1062. The exemplary embodiments of the TECs are operative to combine device interaction in a logical manner by communicating with more than one ODS component and corresponding devices in response to various methods of the TEC being invoked.

In addition to enabling the generation of cross-vendor compatible terminal applications that either include TEC Objects, or that are operative to interface with the ODS layer directly, the exemplary embodiment encompasses adapting pre-existing and proprietary terminal control software of one vendor to run on another vendor's ATM hardware. Such proprietary terminal control software typically communicates with a plurality of proprietary device drivers directly without accessing the previously described XFS layer. Consequently proprietary terminal control software has previously been limited to running only on a specific vendor's hardware platform. However, the exemplary embodiment is further operative to enable such proprietary software to properly control another vendor's transaction function devices when installed on another vendor's ATM platform. This is achieved by adapting the proprietary software to communicate with ODS components rather than proprietary device drivers. Once the proprietary terminal control software has been so adapted, the software is operative to run on another vendor's ATM platform that includes an XFS layer and corresponding SPs.

As shown in FIG. 28, the SPs 1038 of an exemplary embodiment may further include or be associated with diagnostic interfaces 1040 in addition to their interfaces with the XFS layer 1028. The diagnostic interfaces 1040 may include additional low level hardware control functions that may be accessed using function calls by external applications without using an XFS layer. The low level functions for example may access specific motors, sensors and other components in the corresponding transaction function devices 1042. By employing a diagnostic application 1044 to access these low level functions of the SP 1038 directly, individual mechanical and electronic functions specific to the device can be tested, analyzed and possibly corrected.

For example a cash dispenser SP may be adapted to include an interface for manipulating individual motors or sensors in a corresponding cash dispenser transaction function device. Such access is provided to applications independently of the XFS layer. In an exemplary embodiment, the diagnostic application may be operatively programmed to access the diagnostic interfaces of a plurality of different SPs. Further exemplary embodiments of the diagnostic application may also be adapted to use the XFS layer to deactivate one or more devices from XFS communication. Once the devices have been taken off-line with respect to the XFS components, the diagnostic application may enable a service technician to directly access ATM hardware through the corresponding diagnostic interface for trouble shooting, repair and other maintenance purposes.

In a further exemplary embodiment, the diagnostic interfaces 1040 of the SPs 1038 may include an authentication system which is operative to validate that the application attempting to access the low level functions of the device is authorized to do so. In one exemplary embodiment of the authentication system, the diagnostic interface 1040 is operative to detect that a valid hardware device such as a dongle is in operative connection with the ATM before an external application is granted access to the transaction function device 1042 through the diagnostic interface 1040.

In an alternative exemplary embodiment of the authentication system, the diagnostic interface 1040 is operative to detect whether a valid license key is present. Such a license key for example may be located on a removable media in operative connection with the ATM such as a floppy disk, CD, magnetic stripe card, smart card, or any other portable medium that the diagnostic interface is operative to access through the machine. The license key may also be associated with the specific application such as the diagnostic application 1044 that is operatively programmed to access the diagnostic interfaces of SPs 1038. Communications from the diagnostic application may be required to include a valid license key before the diagnostic interface enables the diagnostic application to access the transaction function device.

In a further exemplary embodiment of the authentication system, the diagnostic interfaces 1040 may include a secret password or digital certificate which may be used by the diagnostic interface to determine if an application is allowed access to functions of a corresponding transaction function device. For example, a diagnostic interface of a SP may require communications from a diagnostic application to be digitally signed. The diagnostic interface may then authenticate the digital signature associated with the communication using one or more digital certificates and/or public keys stored in operative connection with the diagnostic interface. When the digital signature is valid, the diagnostic interface is operative to enable the diagnostic application to access the transaction function device through the diagnostic interface. When the digital signature is determined to be invalid, the diagnostic application is denied access to the transaction function device by the diagnostic interface.

In a further exemplary embodiment, the diagnostic application may be required to send a valid digital certificate to the diagnostic interface prior to being granted access to the transaction function device. The digital certificate may be validated by the diagnostic interface using a trusted public key of a certificate authority that issued the digital certificate. The digital certificate may also be evaluated by the diagnostic interface to determine if it has expired. When the digital certificate has expired or is otherwise invalid, the exemplary embodiment of the diagnostic interface may be operatively programmed to return a message to the calling application which indicates that the digital certificate is not valid and access to the transaction function device is denied. In further exemplary embodiments other software and/or hardware encryption and/or authentication systems may be combined with the diagnostic interfaces of the SPs to enable the selective validation of users and/or applications attempting to access transaction function devices through communication with the diagnostic interfaces of SPs.

The described exemplary embodiment may further comprises a terminal Manager 1046. The terminal Manager 1046 is a software application that is operative to configure and manage the ATM through interaction with the ODS layer.

Figure 30:
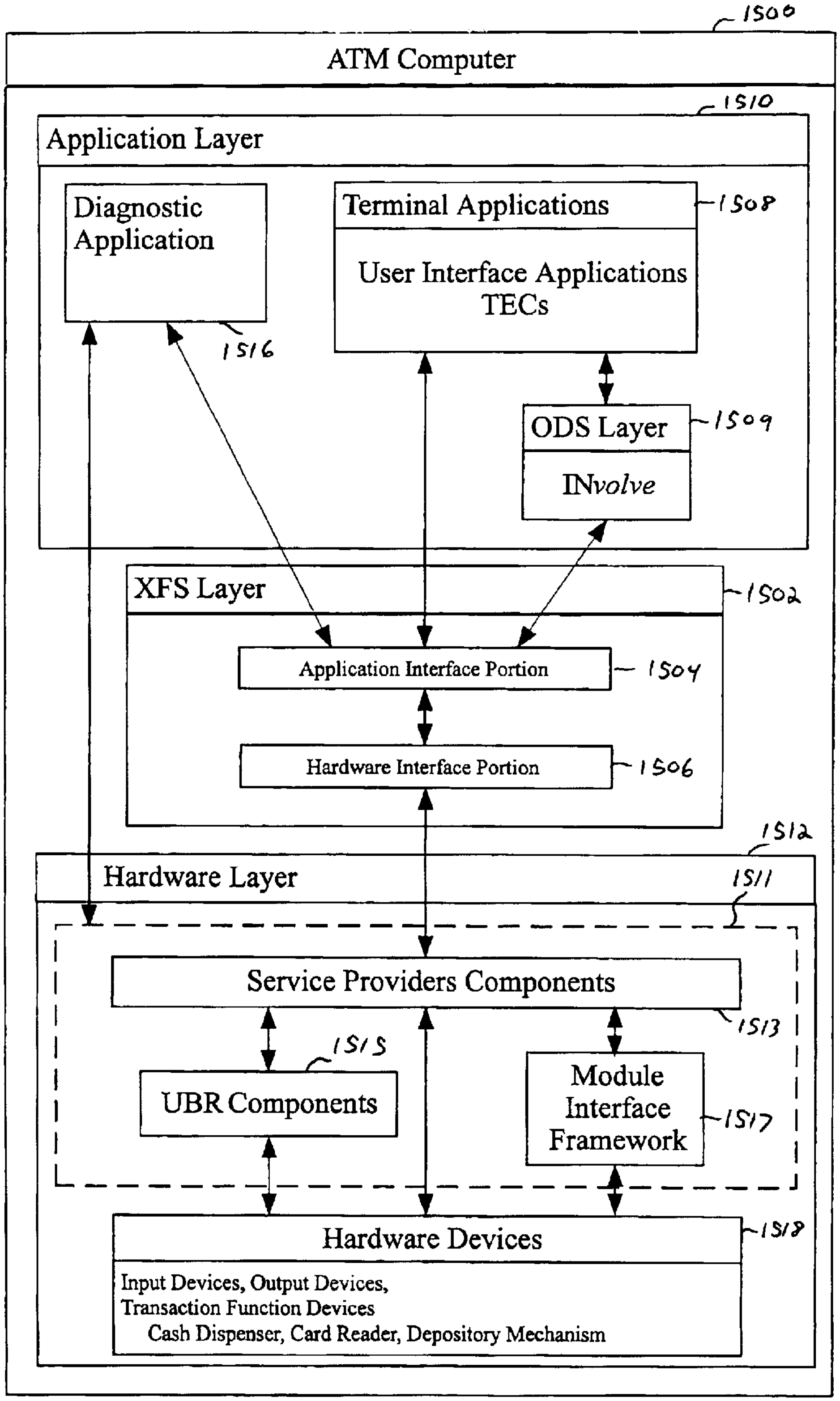
FIG. 30 is a schematic view representative of an exemplary embodiment of a diagnostic application.

FIG. 30, shows a further exemplary embodiment of an ATM 1500 which includes an XFS layer 1502. Here, the XFS layer may include an application interface portion 1504 and hardware interface portion 1506. The ATM may include one or more terminal applications 1508 such as a user interface application which provides selectable options through input and output devices of the ATM for enabling a user to perform transaction functions with the ATM. The user interface applications may use the previously described TEC components. In addition the ATM may include the previously described ODS Layer 1509. As used herein the one or more terminal applications, user interface applications 1508, TEC components, and/or the ODS layer 1509 shall be referred to as the application layer 1510 of the ATM.

The application layer 1510 of the ATM is adapted to communicate with the application interface portion 5104 of the XFS layer.

In addition as discussed previously, the ATM may include a device driver layer 1511 which may include the previously described XFS compatible device drivers such as the WOSA/XFS service providers 1513 or the J/XFS device services. In the exemplary embodiment the SPs may include interfaces which are compatible with the XFS 3.0 standard and are operative responsive to XFS layer communications from the hardware interface portion of the XFS layer to control the operation of hardware devices.

In addition in this described exemplary embodiment, the device driver layer 1511 may include unified base release (UBR) components 1515. Such UBR components may provide an additional layer of abstraction between the SPs and the hardware devices 1518. One or more of the SPs may be programmed to control hardware devices through communication with UBR components rather than directly communicating with one or more hardware devices. Thus, communication between the SPs and the hardware device may be implemented through the UBR components. In the exemplary embodiment, there may be a one to one correspondence between each UBR component and a hardware device. However, it is to be understood that in alternative exemplary embodiments, a UBR component may provide an interface to more than one hardware device. Also in exemplary embodiments, the UBR components may include the previously described diagnostic interface 1040 (FIG. 28) which provides access to low level manipulation of motors, sensors, and other components of a hardware device independently of the XFS layer.

As used herein the device driver layer 1511 and the hardware devices 1518 shall be referred to as the hardware layer 1512 of the ATM. The hardware layer 1512 of the ATM is adapted to communicate with the hardware interface portion 1506 of the XFS layer. In the exemplary embodiment, the application layer 1510 communicates with the XFS layer through calls to an application interface portion 1504 of the XFS layer. In response to the communications received with the application interface portion 1504, the XFS layer communicates with the hardware layer 1512 through the hardware interface portion 1506 to cause one or more functions to be performed by the hardware devices 1518.

Figure 17:
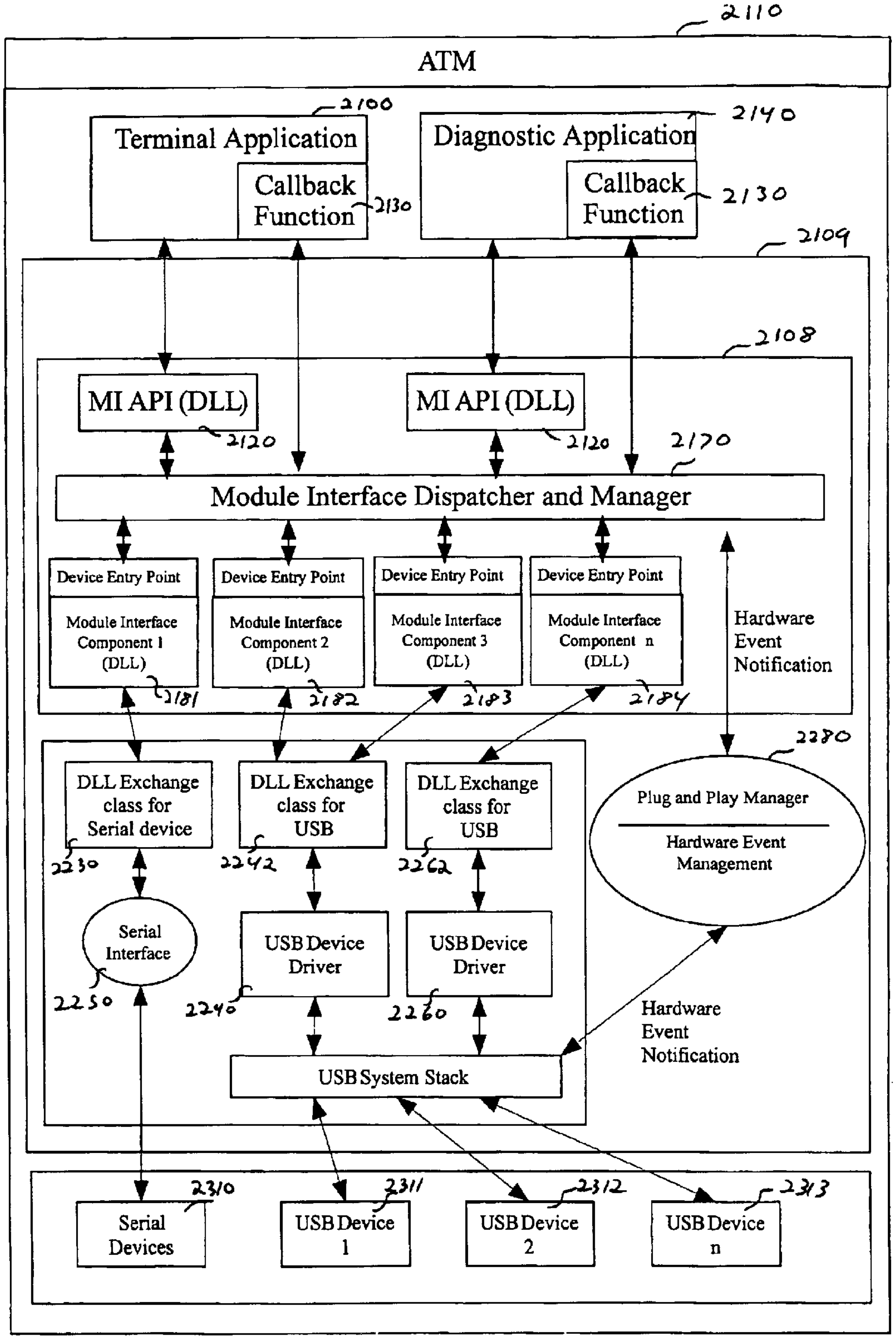
FIG. 17 is a schematic view representative of the software architecture of an exemplary embodiment.
Figure 18:
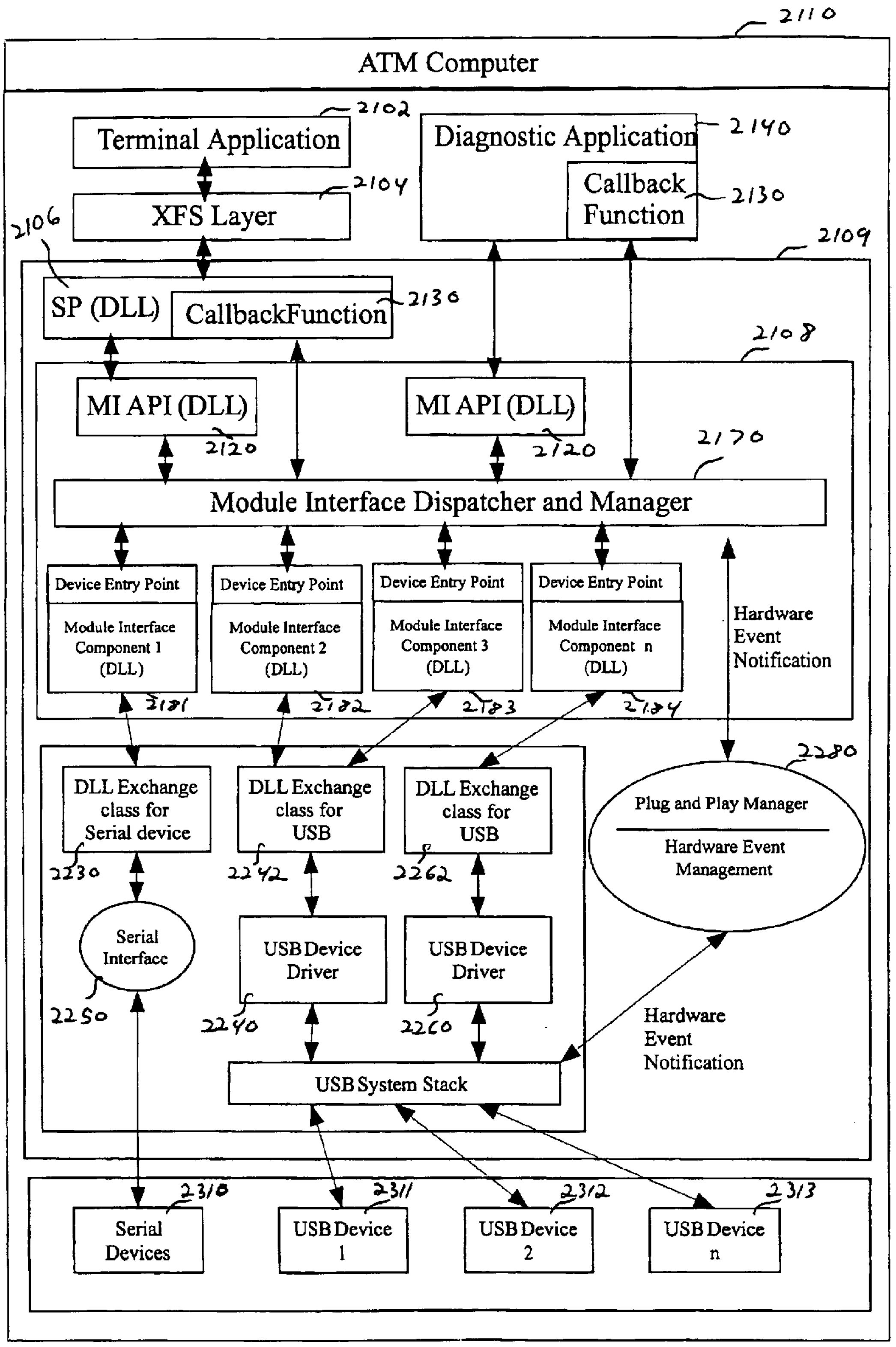
FIG. 18 is a schematic view representative of the software architecture of an exemplary embodiment.

FIG. 17 shows schematically another exemplary embodiment of a software architecture which maybe used in an ATM 2110. Here the exemplary software architecture also includes at least one terminal application 2100 which communicates with devices 2310–2313 of the ATM including transaction function devices through a device layer 2109 that includes a module interface layer or framework 2108. In an exemplary embodiment the terminal application 2100 may include a proprietary terminal control software application for an ATM. However as shown in FIG. 18, in other exemplary embodiment, the terminal application may correspond to an XFS enabled terminal application or application layer 2102 which communicates with transaction function devices through the previously described elements of an XFS layer 2104, and SPs 2106. In this described exemplary embodiment, the device driver layer 2109 includes the module interface layer or framework 2108, and other associated device driver components 2230, 2240, 2242, 2260, 2262 associated with the ATM hardware devices 2310–2313. For exemplary embodiments which include an XFS layer 2104 (FIG. 18), the device driver layer further comprises the SPs 2106.

Figure 5:
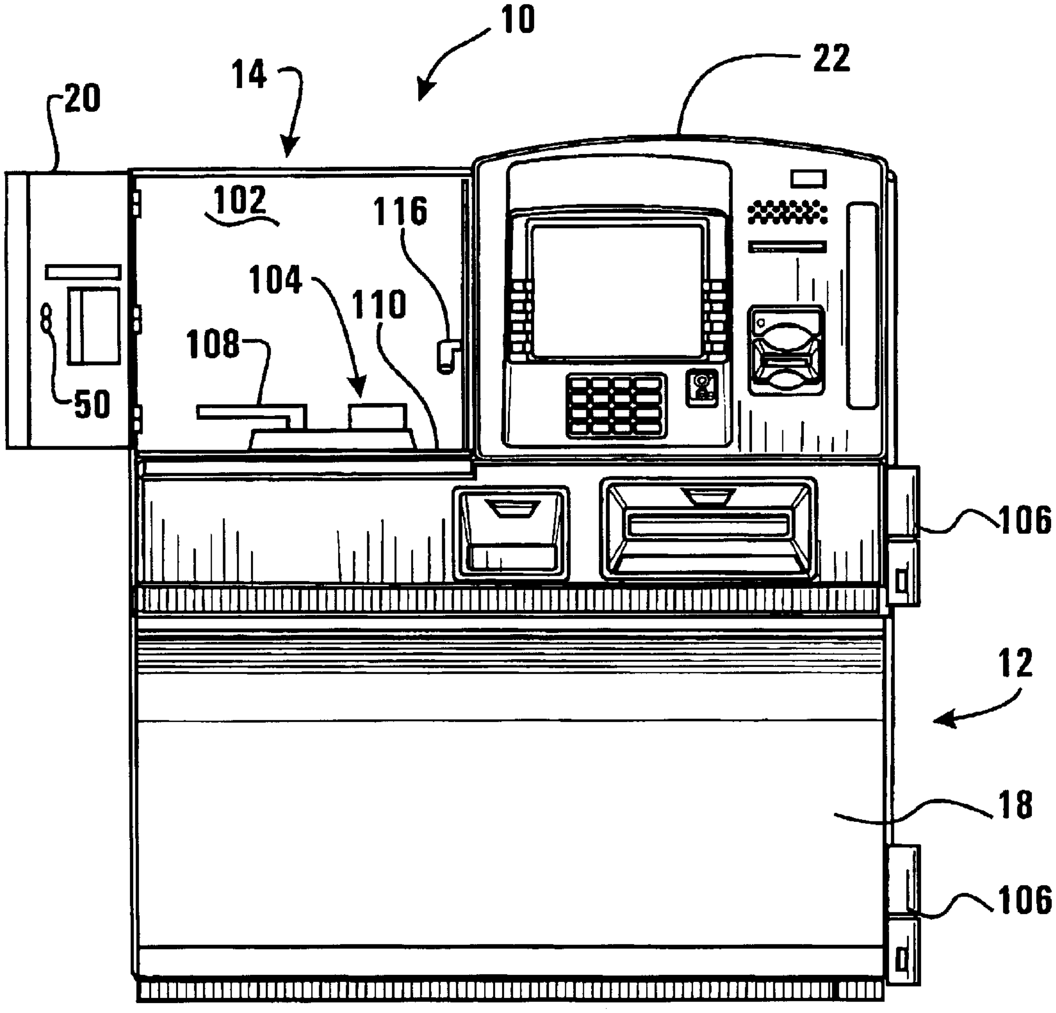
FIG. 5 is a front view showing the fascia portion moved to access a first portion of an upper housing of the machine.

In this described exemplary embodiment, the module interface layer or framework 2108 like the previously described UBR 1515 in FIG. 5, provides an additional level of abstraction between the service provide components 2106 (FIG. 18) and the hardware devices 2310–2313. For non XFS enabled terminal applications 2100 (FIG. 17), the module interface framework 2108 is likewise operative to provide an additional level of abstraction between a proprietary terminal control software application and the hardware devices 2310–2313.

In the exemplary embodiment a module interface framework 2108 may be comprised of a plurality of software components operative in the controller 72 or computer of the ATM. An exemplary module interface framework may include a device server application or process operating in the computer of the ATM which is referred to herein as a device dispatcher and manager 2170 Terminal applications 2100 and/or service provide components may be adapted to communicate with the device dispatcher and manager 2170 through a module interface API 2120. In an exemplary embodiment, the module interface API may correspond to one or more DLLs or other libraries which comprise standardized functions for communicating with the device dispatcher and manager 2170.

For one or more of the ATM hardware devices 2310–2313, the module interface framework 2108 may include corresponding module interface device components 2181–2184 such as DLLs or other device specific libraries. The module interface device components may be operative to provide device specific communications between the device dispatcher and manager 2170 and the low level vendor specific device drivers 2230, 2240, 2242, 2260, 2262 associated with the ATM hardware devices 2310–2313.

For ATM hardware devices which are compatible with a plug and play architecture of an operation system of the ATM, the device dispatcher and manager 2170 may further be operative to receive hardware event notifications for ATM hardware device 2313 directly from the plug and play manager 2280 of the operating system.

The described exemplary embodiment may further includes a diagnostic application 2140 which communicates with ATM hardware devices through the same module interface framework as the terminal applications 2100 and/or SPs 2106.

As with the diagnostic application 1044 described previously with respect to FIG. 28, the diagnostics application 2140 is operative to perform various diagnostic functions with the hardware devices 2310–2313 which are operative in the ATM. In the exemplary embodiment the diagnostics application 2140 operates in conjunction with the module interface framework 2108 to permit low level manipulation and diagnostic testing of the transaction function devices, and may work in conjunction with a separate diagnostic article, as discussed in more detail below.

As with the terminal applications 2100 and/or SPs 2106, a diagnostic application 2140 accesses the module interface framework using the module interface API 2120. The module interface API includes a standard set of functions which provide for both low and high level control of transaction function devices. Here the low level functions of the module interface API may correspond to the diagnostic interface 1040 discussed previously with respect FIG. 28.

A terminal application 2100, SP, and/or diagnostic application accesses the one or more functions of the module interface API to communicate the desired action or actions to the module interface dispatcher and manager 2170. In response to this communication, the module interface dispatcher and manager is operative to selectively call the module interface components 2181–2184 associated with the hardware devices 2310–2313 which may be required to perform requested action. The module interface components 2181–2184 are operative through the use of one or more DLLS 2230, 2240, 2242, 2260, 2262 associated with the transaction function devices to direct the actions of the appropriate hardware devices 2310–2313 through a USB port 2300, serial interface 2290, or other hardware communication port of the ATM.

Because the module interface API 2120 uses a standard set of functions, the terminal application 2100, SP 2106, and/or diagnostic application can be written to control the actions of the hardware devices 2310–2313 without regard to which particular model or make for each type of transaction function device will ultimately be incorporated in the ATM. Similarly, if a transaction function device later needs to be swapped out for a different transaction function device, the terminal application 2100, SP 2106, and/or diagnostic application may not require modification so long as the new device is operative to perform the same functions as the old device. In an exemplary embodiment, the module interface API 2120 provides a wide range of functional control over the transaction function devices.

In addition to providing high level control functions which cause transaction function devices to perform complete transaction functions, the module interface API 2120 also provides low level control functions. Such low level control functions may include for example outputting an audible tone, turning on a motor, disabling a keypad, or other low level operations which may be used by a diagnostic application to accurately diagnose the cause of a high level malfunction.

The module interface components 2181–2184 may be similarly uniformly standardized, with respect to the interface presented to the device dispatcher and manager 2170. The use of a standardized interface facilitates creating an extensible device dispatcher and manager 2170, which can manage a plurality of hardware devices 2310–2313 without requiring reprogramming each time a new hardware device 2310–2313 is added.

When a new transaction function device is added, a new module interface component 2181–2184 may be added to the module interface framework to enable the device dispatcher and manager to communicate with the new vendor provided device driver DLL or library associated with the new device. On the other hand, if the vendor provided device driver is compatible with a module interface component already incorporated in the module interface framework, a new module interface component may not be needed to operate the new transaction function device properly.

The described exemplary embodiment of the module interface framework 2108 may use a callback function 2130 associated with the terminal application 2100, SP 2106, and/or diagnostic application 2140. When a transaction function device is to perform an action on a delayed basis (i.e., an asynchronous event) a high level application may be programed to periodically poll of the status of the device to determine if the action or event has occurred. One example of an asynchronous event is when cash is to be presented to the customer for a fixed period, at the expiration of which the cash is retrieved if the cash has not been taken by the customer. A common method of determining whether the cash has been withdrawn is by repeated polling during the presentation period. To eliminate the inefficiencies associated with periodically polling a device, an exemplary embodiment of a terminal application, SP, or diagnostic application may provide the device dispatcher and manager with a callback function, which is called when the deleted action by the hardware device has completed.

For example an SP may through use of the module interface API register a call back function associated with the withdrawal of cash with the device dispatcher and manager. When the cash is later withdrawn, a notification is sent to the call back function from the device dispatcher manager, eliminating the need for status polling by the SP to determine whether the cash is still being offered to the customer. Similar call back functions of the terminal application, service provider, or diagnostic application may be registered with the device dispatcher and manager for receiving notification of events initiated by a transaction function device. Such events may correspond to unsolicited status messages. For example, when a card reader device detects the insertion of a card, the device may generate an unsolicited status message which is detected by the device dispatcher and manager and communicated to the terminal application, SP, or diagnostic application using a callback function registered to receive such messages.

Using the module interface API 2120, terminal application, SP and/or diagnostic application registers expected unsolicited events with the device dispatcher and manager 2170 during an initialization process. Similarly, when the terminal application, SP and/or diagnostic application relinquishes control to a hardware device 2310–2313 for performance of an asynchronous event, the event is registered with the device dispatcher and manager. When the device dispatcher and manager 2170 subsequently experiences a registered event, through interaction with a module interface device component 2181–2184, the device dispatcher and manager 2170 delivers notification of the event to the correct callback function in accordance with the directions provided when the event was registered.

As schematically represented in FIG. 4, a controller 72 is in operative connection with at least one communications bus 92. The communications bus 92 may in some exemplary embodiments be a universal serial bus (USB) or other standard or nonstandard type of bus architecture. The communications bus 92 is schematically shown in operative connection with transaction function devices 94. The transaction function devices 94 include devices in the ATM which are used to carry out transactions. These may include for example the currency dispenser device 54, card reader 26, receipt printer 44, keypad 32, as well as numerous other devices which are operative in the machine and controlled by the controller 72 to carry out transactions. In the exemplary embodiment one of the transaction function devices 94 in operative connection with the controller is a diagnostic article reading device 96 which is later discussed in detail, and which is operative to read a diagnostic article schematically indicated 98 used in servicing the machine. As later explained, in an exemplary embodiment the diagnostic article 98 comprises a CD which can be read by reader 96 as well as computer device 100 which is not generally associated with the operation of the ATM 10.

In the exemplary embodiment of ATM 10 the first fascia portion 20 and the second fascia portion 22 are independently movably mounted on the ATM housing 12. This is accomplished through the use of hinges attached to fascia portion 20. The opening of the fascia lock 50 on the first fascia portion 20 enables the first fascia portion 20 to be moved to an open position as shown in FIG. 5. In the open position of the first fascia portion 20 an authorized user is enabled to gain access to a first portion 102 in the upper housing area 14. In the exemplary embodiment there is located within the first portion 102 a chest lock input device 104. In this embodiment the chest lock input device 104 comprises a manual combination lock dial, electronic lock dial or other suitable input device through which a combination or other unlocking inputs or articles may be provided. In this exemplary embodiment input of a proper combination enables the chest door 18 to be moved to an open position by rotating the door about hinges 106. In the exemplary embodiment the chest door 18 is opened once the proper combination has been input by manipulating a locking lever 108 which is in operative connection with a boltwork. The boltwork which is not specifically shown, may be of a conventional or unconventional type that is operative to hold the chest door 18 in a locked position until the proper combination is input. Upon input of the correct combination the locking lever enables movement of the boltwork so that the chest door 18 can be opened. The boltwork also enables the chest door 18 to be held locked after the activities in the chest portion 16 have been conducted and the chest door 18 is returned to the closed position. Of course in other embodiments other types of mechanical or electrical locking mechanisms may be used. In the exemplary embodiment the chest lock input device 104 is in supporting connection with a generally horizontally extending dividing wall 110 which separates the chest portion 16 from the upper housing area 14. Of course this housing structure is exemplary and in other embodiments other approaches may be used.

An authorized servicer who needs to gain access to an item, component or device of the ATM located in the chest portion 16 may do so by opening the fascia lock 50 and moving the first fascia portion 20 so that the first portion 102 of the upper housing area 14 becomes accessible. Thereafter the authorized servicer may access and manipulate the chest lock input device 104 to receive one or more inputs, which if appropriate enables unlocking of the chest door 18. The chest door 18 may thereafter be moved relative to the housing and about its hinges 106 to enable the servicer to gain access to items, devices or components within the chest portion 16. These activities may include for example adding or removing currency, removing deposited items such as envelopes or checks, or repairing mechanisms or electrical devices that operate to enable the machine to accept deposited items or to dispense currency. When servicing activity within the chest portion 16 is completed, the chest door 18 may be closed and the locking lever 108 moved so as to secure the boltwork holding the chest door 18 in a closed position. Of course this structure and service method is exemplary and in other embodiments other approaches may be used.

In the exemplary embodiment the second fascia portion 22 is also movable relative to the housing of the machine. In the exemplary embodiment the second fascia portion 22 is movable in supporting connection with a rollout tray 112 schematically shown in FIG. 3. The rollout tray is operative to support components of the user interface thereon as well as the second fascia portion 22. The rollout tray 112 enables the second fascia portion 22 to move outward relative to the ATM housing thereby exposing components and transaction function devices supported on the tray and providing access to a second portion 114 within the upper housing area 14 and positioned behind the second fascia portion 22. Thus as can be appreciated, when the second fascia portion 22 is moved outward, the components on the rollout tray 112 are disposed outside the housing of the machine so as to facilitate servicing, adjustment and/or replacement of such components. Further components which remain positioned within the housing of the machine as the rollout tray 112 is extended become accessible in the second portion 114 of the upper housing area 14 as the second fascia portion 22 is disposed outward and away from the housing.

Figure 2:
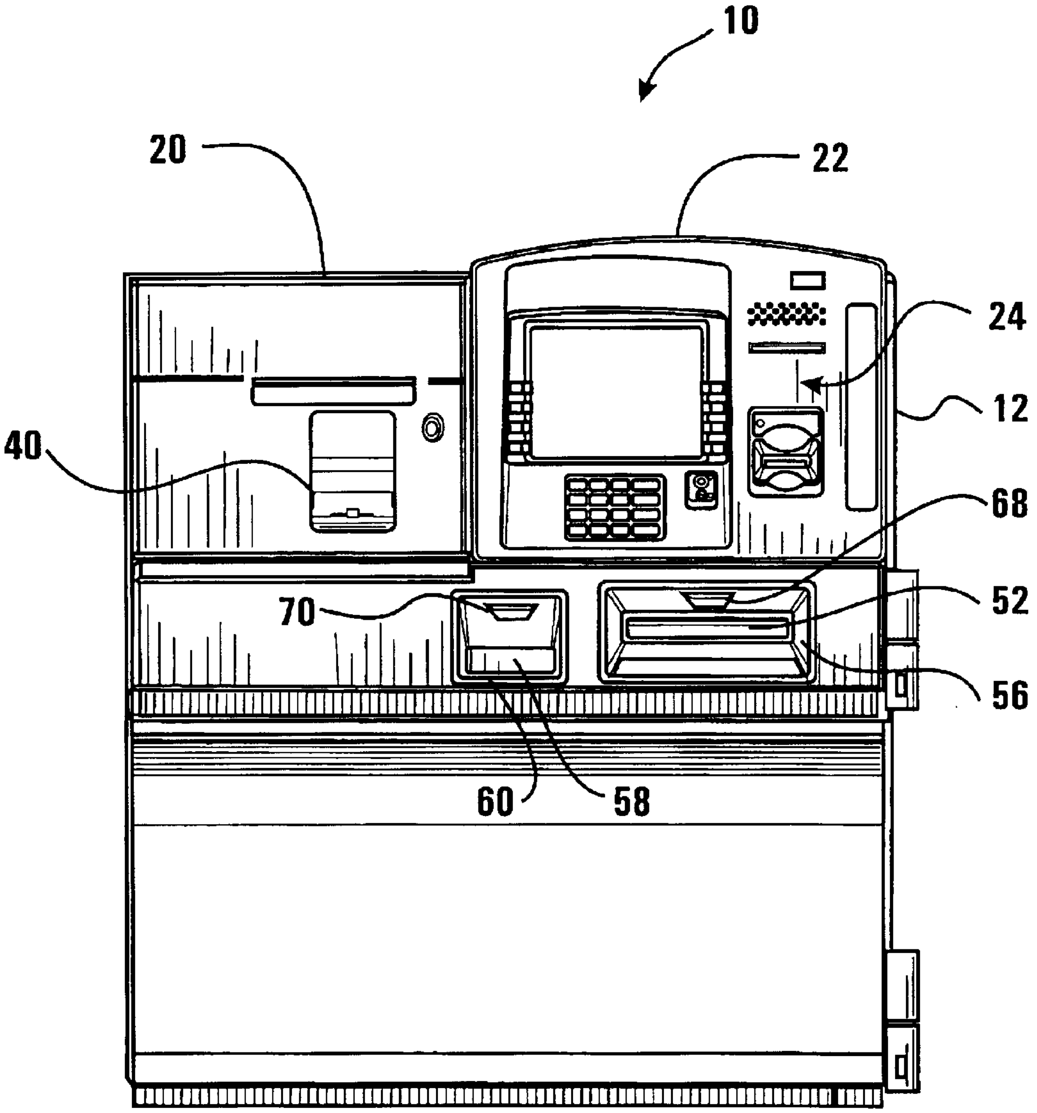
FIG. 2 is a front plan view of the ATM shown in FIG. 1.

In the exemplary embodiment the rollout tray 112 is in operative connection with a releasible locking device. The locking device is generally operative to hold the tray in a retracted position such that the second fascia portion 22 remains in an operative position adjacent to the upper housing area 14 as shown in FIGS. 1, 2 and 3. This releasible locking mechanism may comprise one or more forms of locking type devices. In the exemplary embodiment the releasible locking mechanism may be released by manipulation of an actuator 116 which is accessible to an authorized user in the first portion 102 of the upper housing area 14. As a result an authorized servicer of the machine is enabled to move the second fascia portion 22 outward for servicing by first accessing portion 102 in the manner previously discussed. Thereafter by manipulating the actuator 116 the second fascia portion 22 is enabled to move outward as shown in phantom in FIG. 11 so as to facilitate servicing components on the rollout tray 112. Such components may include for example a printer or card reader. After such servicing the second fascia portion 22 may be moved toward the housing so as to close the second portion 114 of the upper housing area 14. Such movement in the exemplary embodiment causes the rollout tray 112 to be latched and held in the retracted position without further manipulation of the actuator 116. However, in other embodiments other types of locking mechanisms may be used to secure the rollout tray 112 in the retracted position. It should be understood that this approach is exemplary and in other embodiments other approaches may be used.

Figure 6:
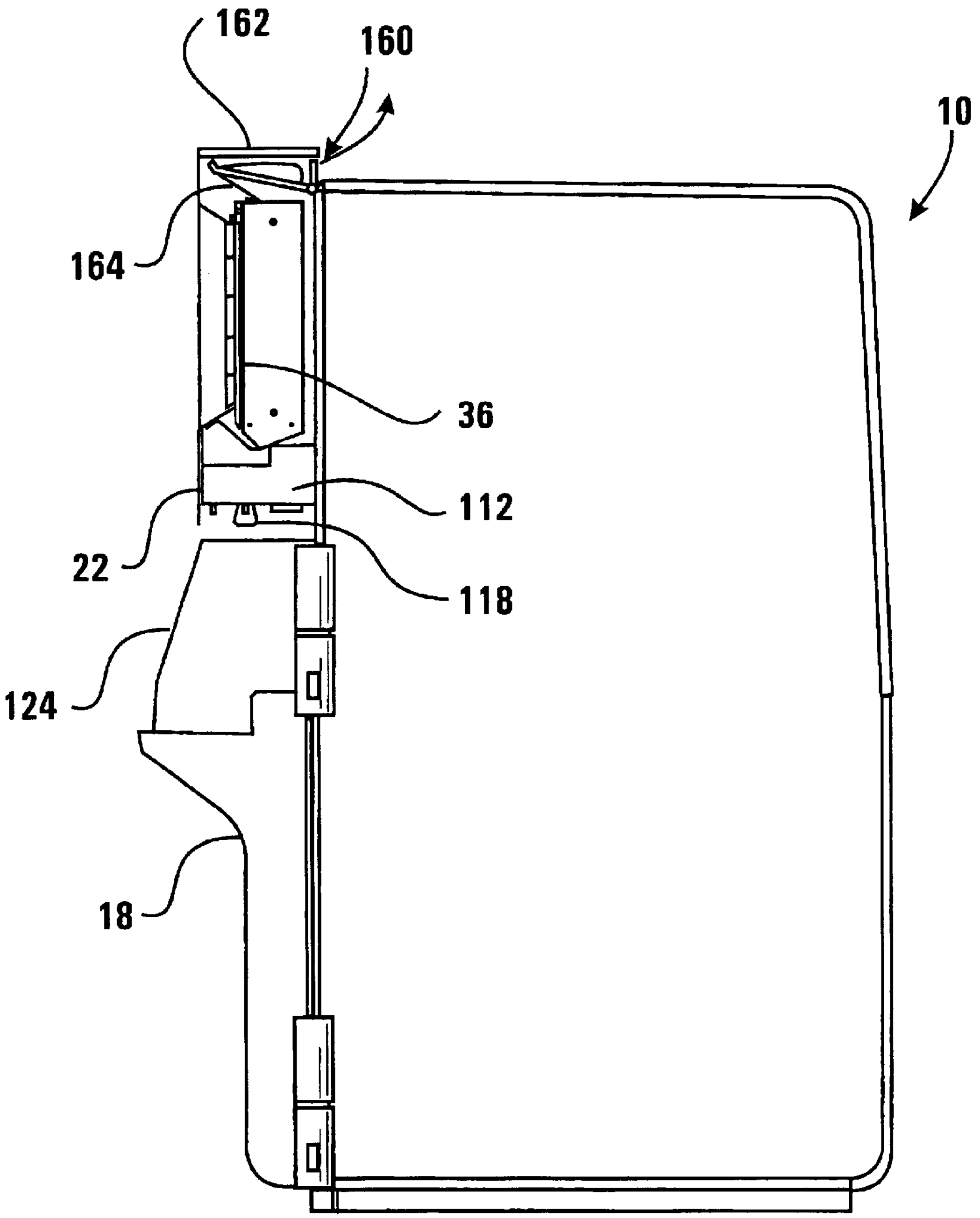
FIG. 6 is a partially transparent side view showing air flow through an air cooling opening of the machine.
Figure 10:
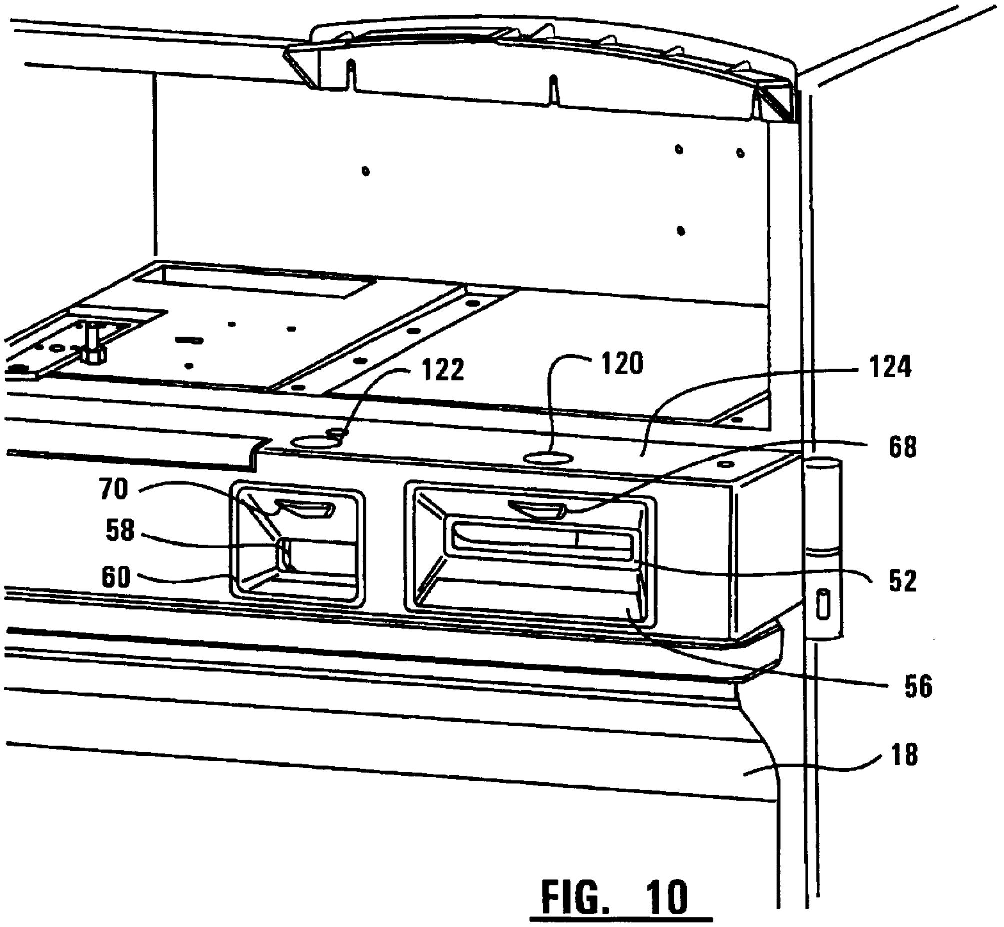
FIG. 10 is an isometric view of the ATM shown in FIG. 1 with the components of the upper housing portion removed and showing aspects of the illumination system for the transaction areas supported on the chest portion of the housing.

As best shown in FIG. 10 in which the components supported in the upper housing area 14 are not shown, the delivery area 52 and the deposit acceptance area 58 are in supporting connection with the chest door 18. As such when the chest door 18 is opened, the delivery area 52 and the deposit acceptance area 58 will move relative to the housing of the machine. The exemplary embodiment shown facilitates servicing of the machine by providing for the illumination for the transaction areas by illumination sources positioned in supporting connection with the rollout tray 112. As best shown in FIG. 6, these illumination sources 118 are movable with the rollout tray 112 and illuminate in generally a downward direction in the operative position of the second fascia portion 22 and the chest door 18. The illumination sources are generally aligned with apertures 120 and 122 which extend through the top of a cover 124 which generally surrounds the recessed pockets 60 and 56. As shown in FIG. 10 aperture 120 is generally vertically aligned with window 68 and aperture 122 is generally aligned with window 70. In an exemplary embodiment apertures 120 and 122 each have a translucent or transparent aperture cover positioned therein to minimize the risk of the introduction of dirt or other contaminants into the interior of the cover 124.

Figure 11:
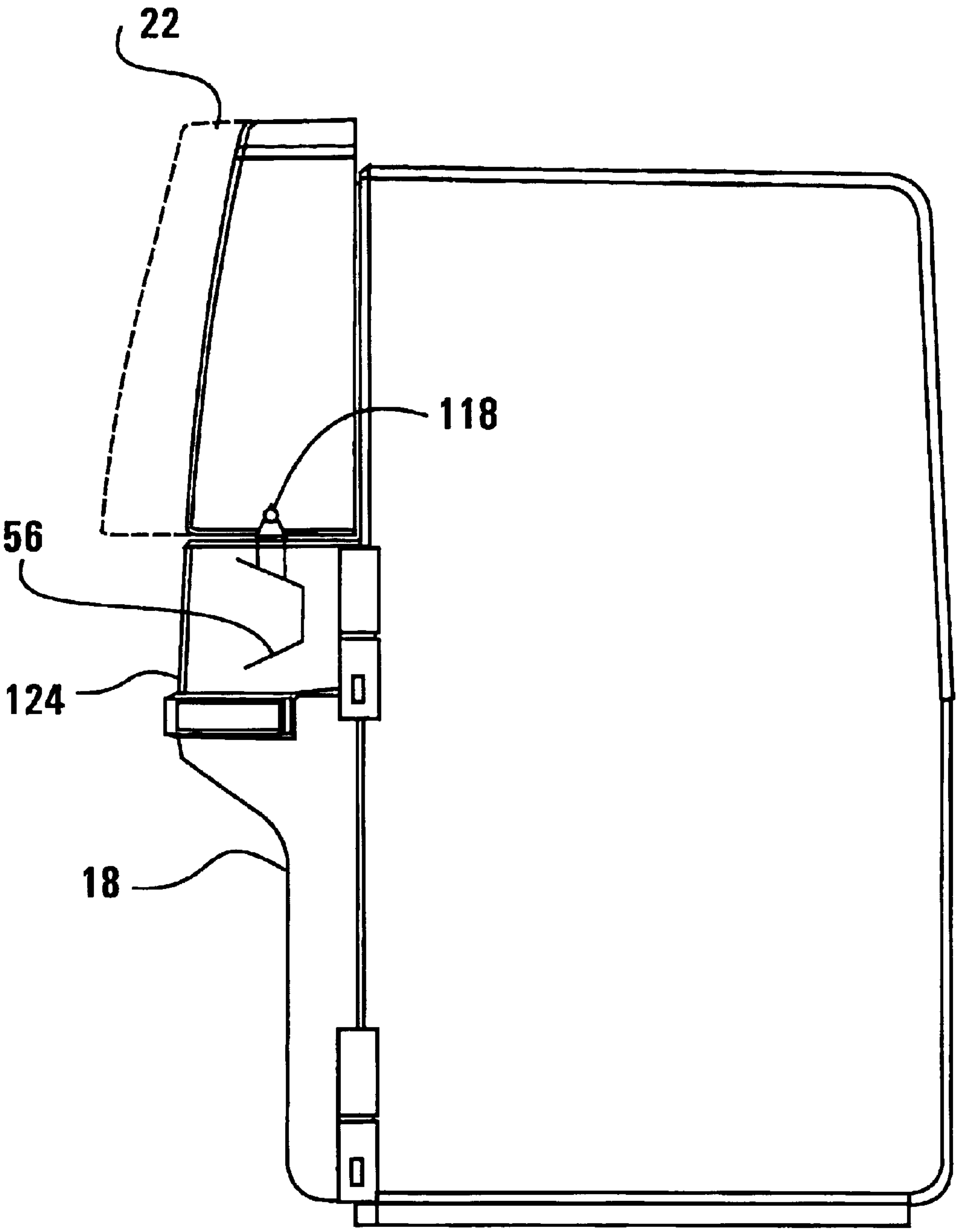
FIG. 11 is a schematic side view of the housing showing schematically the illumination system for the transaction areas and representing in phantom the movement of the upper fascia portion so as to provide access for servicing.

As can be appreciated from FIGS. 6 and 11, when the chest door 18 is closed and the second fascia portion 22 is moved to the operative position, the illumination sources 118 are positioned in generally aligned relation with apertures 120 and 122. As a result the illumination of the illumination devices is operative to cause light to be transmitted through the respective aperture 120, 122 and to illuminate the transaction area within the corresponding recessed pocket.

In operation of an exemplary embodiment, the controller 72 executes programmed instructions so as to initiate illumination of each transaction area at appropriate times during the conduct of transactions. For example in the exemplary embodiment if the user is conducting a cash withdrawal transaction, the controller 72 may initiate illumination of the delivery area 52 when the cash is delivered therein and is available to be taken by a user. Such illumination draws the user's attention to the need to remove their cash and will point out to the user that the cash is ready to be taken. In the exemplary embodiment the controller 72 is programmed so that when the user takes their cash the machine will move to the next transaction step. After the cash is sensed as taken, the controller 72 may operate to cease illumination of the delivery area 52.

Likewise in an exemplary embodiment if a user of the machine indicates that they wish to conduct a deposit transaction, the controller 72 may cause the machine to operate to initiate illumination of the deposit acceptance area 58. The user's attention is drawn to the place where they must insert the deposit envelope in order to have it be accepted in the machine. In the exemplary embodiment the controller 72 may operate to also illuminate the illumination panel 62 to illuminate the deposit envelope providing opening 48 so that the user is also made aware of the location from which a deposit envelope may be provided. In an exemplary embodiment the controller 72 may operate to cease illumination through the window 70 and/or the illumination panel 62 after the deposit envelope is indicated as being sensed within the machine.

In alternative embodiments other approaches may be taken. This may include for example drawing the customer's attention to the particular transaction area by changing the nature of the illumination in the recessed pocket to which the customer's attention is to be drawn. This may be done for example by changing the intensity of the light, flashing the light, changing the color of the light or doing other actions which may draw a user's attention to the appropriate transaction area. Alternatively or in addition, a sound emitter, vibration, projecting pin or other indicator may be provided for visually impaired users so as to indicate to them the appropriate transaction area to which the customer's attention is to be drawn. Of course these approaches are exemplary and in other embodiments other approaches may be used.

As can be appreciated the exemplary embodiment enables one or more illumination devices which are movable relatively with respect to the area to be illuminated to be used without the need for additional moving wiring harnesses or other releasable connectors. In addition the exemplary location of the illumination device 118, extending on the underside of the rollout tray 112 facilitates changing the illumination device 118 by extending the rollout tray 112 in the manner previously discussed and as is shown in FIG. 11. Of course it should be understood that the principles described can be applied to numerous types of banking machine structures and configurations which may be encompassed by the claims presented herein.

Figure 14:
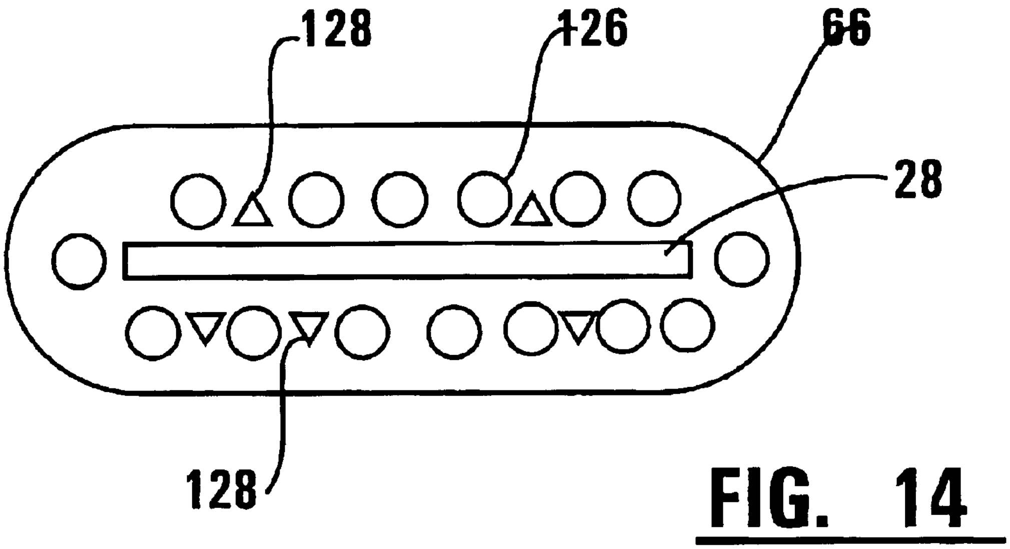
FIG. 14 is a schematic view of an illumination and anti-fraud sensing device which bounds a card reader slot of an exemplary embodiment.

As previously discussed the exemplary embodiment of ATM 10 is also operative to draw a user's attention at appropriate times to the card reader slot 28. ATM 10 also includes features to minimize the risk of unauthorized interception of card data by persons who may attempt to install an unauthorized card reading device on the machine. As shown in FIG. 14, the exemplary card slot 28 extends through a card slot housing 66 which extends in generally surrounding relation of the card slot 28. It should be understood that although the housing 66 generally bounds the entire card slot 28, in other embodiments the principles described herein may be applied by bounding only one or more sides of a card slot 28 as may be appropriate for detecting unauthorized card reading devices. Further, it should be understood that while the exemplary embodiment is described in connection with a card reader that accepts a card into the machine, the principles being described may be applied to types of card readers that do not accept a card into the machine, such as readers where a user draws the card through a slot, inserts and removes a card manually from a slot and other card reading structures.

In the exemplary embodiment the housing 66 includes a plurality of radiation emitting devices 126. In the exemplary embodiment the radiation emitting devices 126 emit visible radiation which can be perceived by a user of the machine. However, in other embodiments the radiation emitting devices 126 may include devices which emit nonvisible radiation such as infrared radiation, but which nonetheless can be used for sensing the presence of unauthorized card reading devices adjacent to the card slot 28. In the exemplary embodiment the controller 72 operates to illuminate the radiation emitting devices 126 at appropriate times during the transaction sequence. This may include for example times during transactions when a user is prompted to input their card into the machine or alternatively when a user is prompted to take their card from the card slot 28. In various embodiments the controller 72 may be programmed to provide solid illumination of the radiation emitting devices 126 or may vary the intensity of the devices as appropriate to draw the user's attention to the card slot 28.

In the exemplary embodiment the card slot housing 66 includes therein one or more radiation sensing devices 128. The radiation sensing devices 128 are positioned to detect changes in the radiation reflected from the radiation emitting devices 126. The radiation sensing devices 128 are in operative connection with the controller 72. The controller 72 is operative to compare one or more values corresponding to the magnitude of reflected radiation sensed by one or more of the radiation sensing devices 128, to one or more stored values and to make a determination whether the comparison is such that there is a probable unauthorized card reading device installed on the fascia of the machine. In some embodiments the controller 72 may be operative to execute fuzzy logic programming for purposes of determining whether the nature of the change in reflected radiation is such that there has been an unauthorized device installed and whether appropriate personnel should be notified.

Figure 15:
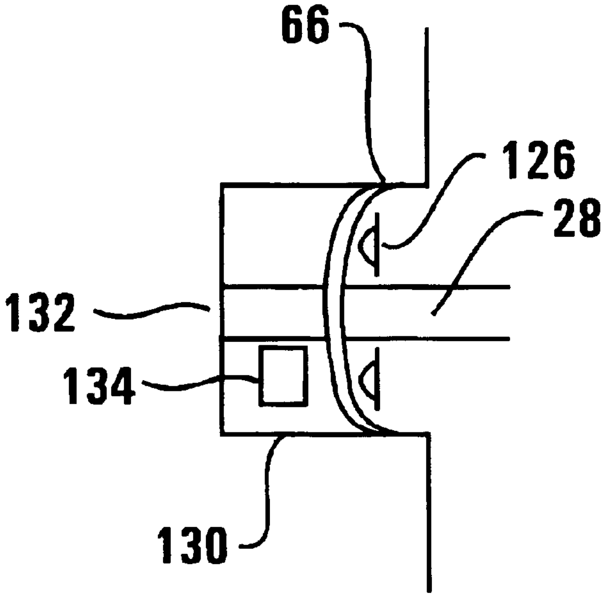
FIG. 15 is a schematic side view of an unauthorized card reading device in operative connection with a housing of the anti-fraud sensor.

FIG. 15 shows a side view of the housing 66. An unauthorized card reading device 130 is shown attached externally to the housing 66. The unauthorized card reading device 130 includes a slot 132 generally aligned with card reader slot 28. The device 130 also includes a sensor shown schematically as 134 which is operative to sense the encoded magnetic flux reversals which represent data on the magnetic stripe of a credit or debit card. As can be appreciated, an arrangement of the type shown in FIG. 15 enables the sensor 134 if properly aligned adjacent to the magnetic stripe of a card, to read the card data as the card passes in and out of card reader slot 28. Such an unauthorized reading device 130 may be connected via RF or through inconspicuous wiring to other devices which enable interception of the card data. In some situations criminals may also endeavor to observe the input of the user's PIN number corresponding to the card data so as to gain access to the account of the user.

As can be appreciated from FIG. 15 the installation of the unauthorized card reading device 130 changes the amount of radiation from emitting devices 126 and that is reflected to the sensors 128. Depending on the nature of the device and its structure, the amount of reflected radiation may increase or decrease. However, a detectable change will often occur in the magnitude of sensed radiation between a present transaction and a prior transaction which was conducted prior to an unauthorized card reading device 130 being installed.

Figure 16:
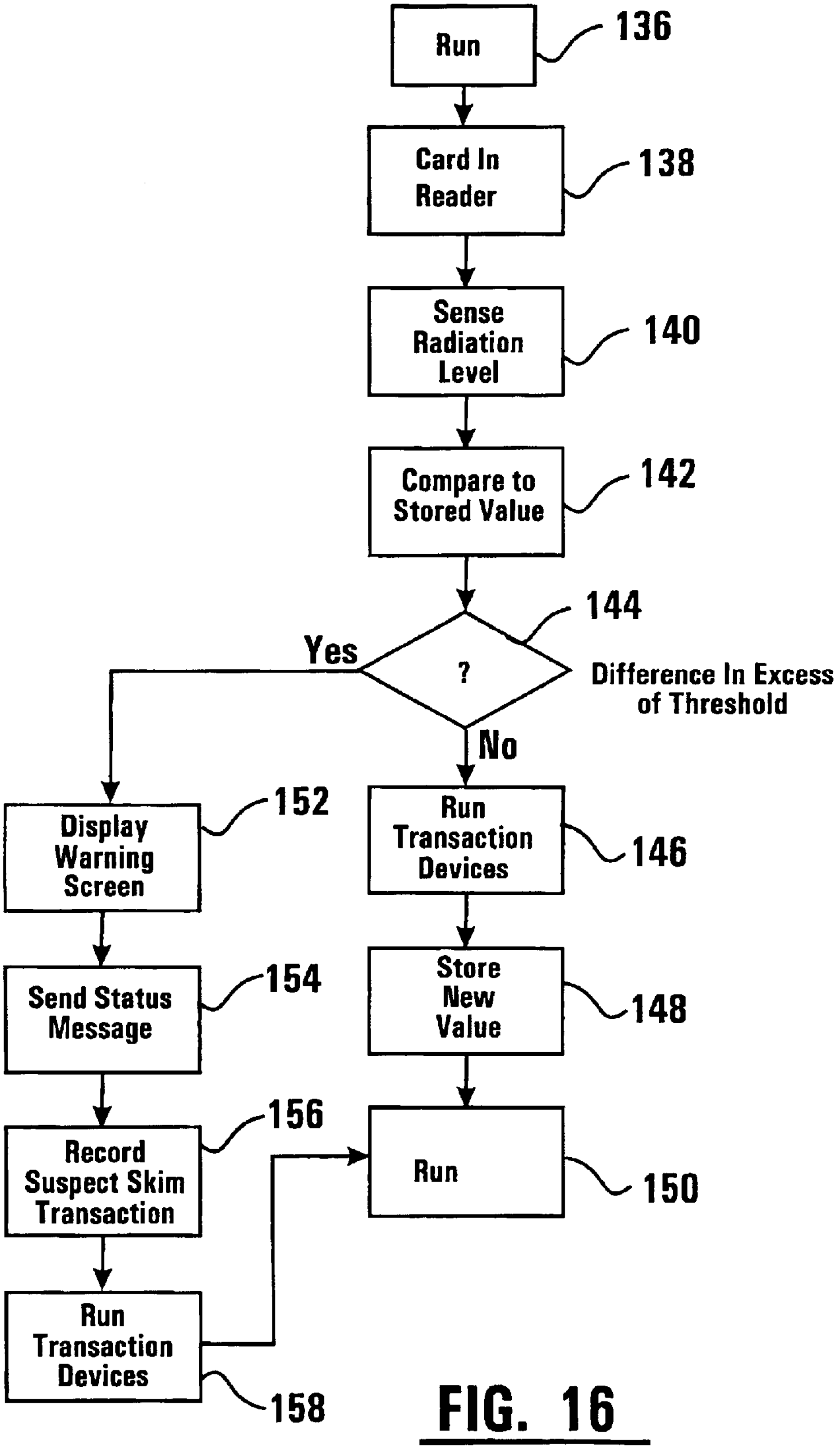
FIG. 16 is a schematic view of an exemplary embodiment of logic for purposes of detecting the presence of an unauthorized card reading device in proximity to the card reader during operation of the ATM.

FIG. 16 demonstrates a simplified logic flow executed by a controller for detecting the installation of an unauthorized card reading device. It should be understood that this transaction logic is part of the overall operation of the machine to carry out transactions. In this exemplary logic flow the machine operates to carry out card reading transactions in a normal manner and to additionally execute the represented steps as a part of such logic each time a card is read. From an initial step 136 the controller in the machine is operative to sense that a card is in the reader within the machine in a step 138. Generally in these circumstances the controller will be operating the radiation emitting devices 126 as the user inserts their card and the card is drawn into the machine. In this exemplary embodiment the controller continues to operate the radiation emitting devices and senses the radiation level or levels sensed by one or more sensors 128. This is done in a step 140.

The controller is next operative to compare the signals corresponding to the sensed radiation levels to one or more values in a step 142. This comparison may be done a number of ways and may in some embodiments employ fuzzy logic so as to avoid giving false indications due to acceptable conditions such as a user having their finger adjacent to the card slot 28 during a portion of the transaction. In the case of a user's fingers for example, the computer may determine whether an unauthorized reading device is installed based on the nature, magnitude and changes during a transaction in sensed radiation, along with appropriate programmed weighing factors. Of course various approaches may be used within the scope of the concept discussed herein. However, based on the one or more comparisons in step 142 the controller is operative to make a decision at step 144 as to whether the difference between sensed value(s) from step 140 and the stored value(s) have a difference that is in excess of one or more thresholds which suggests that an unauthorized card reading device has been installed.

If the comparison does not indicate a result that exceeds the threshold(s) the ATM transaction function devices are run as normal as represented in a step 146. Further in the exemplary embodiment, the controller may operate to adjust the stored values as a function of more recent readings. This may be appropriate in order to compensate for the effects of dirt on the fascia or loss of intensity of the emitting devices or other factors. This is represented in a step 148. As represented in step 150 the controller operates the ATM to conduct transaction steps in the usual manner.

If in step 144 the difference between the sensed and stored values exceeds the threshold(s), then this is indicative that an unauthorized card reading device may have been installed since the last transaction. In the exemplary embodiment when this occurs, the controller is operative to present a warning screen to the user as represented in a step 152. This warning screen may be operative to advise the user that an unauthorized object has been set adjacent to the card reader slot. This may warn a user for example that a problem is occurring. Alternatively if a user has inadvertently placed innocently some object adjacent to the card reader slot, then the user may withdraw it. In addition or in the alternative, further logic steps may be executed such as prompting a user to indicate whether or not they can see the radiation emitting devices being illuminated adjacent to the card slot and prompting the user to provide an input to indicate if such items are visible. Additionally or in the alternative, the illuminating devices within the housing 66 may be operative to cause the emitting devices to output words or other symbols which a user can indicate that they can see or cannot see based on inputs provided as prompts from output devices of the machine. This may enable the machine to determine whether an unauthorized reading device has been installed or whether the sensed condition is due to other factors. It may also cause a user to note the existence of the reading device and remove it. Of course various approaches could be taken depending on the programming of the machine.

If an unauthorized reading device has been detected, the controller in the exemplary embodiment will also execute a step 154 in which a status message is sent to an appropriate service provider or other entity to indicate the suspected problem. In a step 156 the controller will also operate to record data identifying the particular transaction in which there has been suspected interception of the card holder's card data. In addition or in the alternative, a message may be sent to the bank or other institution alerting them to watch for activity in the user's card account for purposes of detecting whether unauthorized use is occurring. Alternatively or in addition, some embodiments may include card readers that change, add or write data to a user's card in cases of suspected interception. Such changed data may be tracked or otherwise used to assure that only a card with the modified data is useable thereafter. Alternatively or in addition, in some embodiments the modified card may be moved in transverse relation, moved irregularly or otherwise handled to reduce the risk that modified data is intercepted as the card is output from the machine. Of course these approaches are exemplary of many that may be employed.

In the exemplary embodiment the ATM is operated to conduct a transaction even in cases where it is suspected that an unauthorized card reading device has been installed. This is represented in a step 158. However, in other embodiments other approaches may be taken such as refusing to conduct the transaction. Other steps may also be taken such as capturing the user's card and advising the user that a new one will be issued. This approach may be used to minimize the risk that unauthorized transactions will be conducted with the card data as the card can be promptly invalidated. Of course other approaches may be taken depending on the programming of the machine and the desires of the system operator.

The exemplary embodiment of the ATM 10 is a machine that is generally constructed for outdoor use and operation. As such it may be subjected to extremes of temperatures. However, the components of the ATM such as the controller, currency dispenser, display and other items may be sensitive to temperature and may begin to malfunction if the temperature within the housing of the machine becomes too hot or too cold.

In the exemplary embodiment the display 36 comprises a high illumination flat panel type display. Some types of such displays generate considerable heat which if not properly dissipated can cause high temperatures and damage components of the machine. In the exemplary embodiment the risk of such damage is reduced by providing air flow cooling through the housing of the machine, and specifically by providing air flow inside the housing within the area adjacent the display 36.

As shown in FIG. 6, the exemplary embodiment of ATM 10 includes an air cooling opening 160. In the exemplary embodiment the air cooling opening 160 extends between the top wall 162 of the second fascia portion 22 and a baffle structure 164 which is fixedly attached to the housing of the machine. As further explained in detail hereafter, the baffle structure 164 is operative to enable cooling air flow to pass through the housing around the rear and sides of the display 36 and to pass out of the housing through the opening 160. However, the exemplary baffle structure 164 is operative to minimize the risk of infiltration of moisture such as liquid water, droplets, snow, condensation and other contaminants into the interior area of the housing. Further, the exemplary baffle structure 164 is adapted to direct contaminants to the outside of the housing so as to avoid the accumulation thereof on the baffle.

Figure 7:
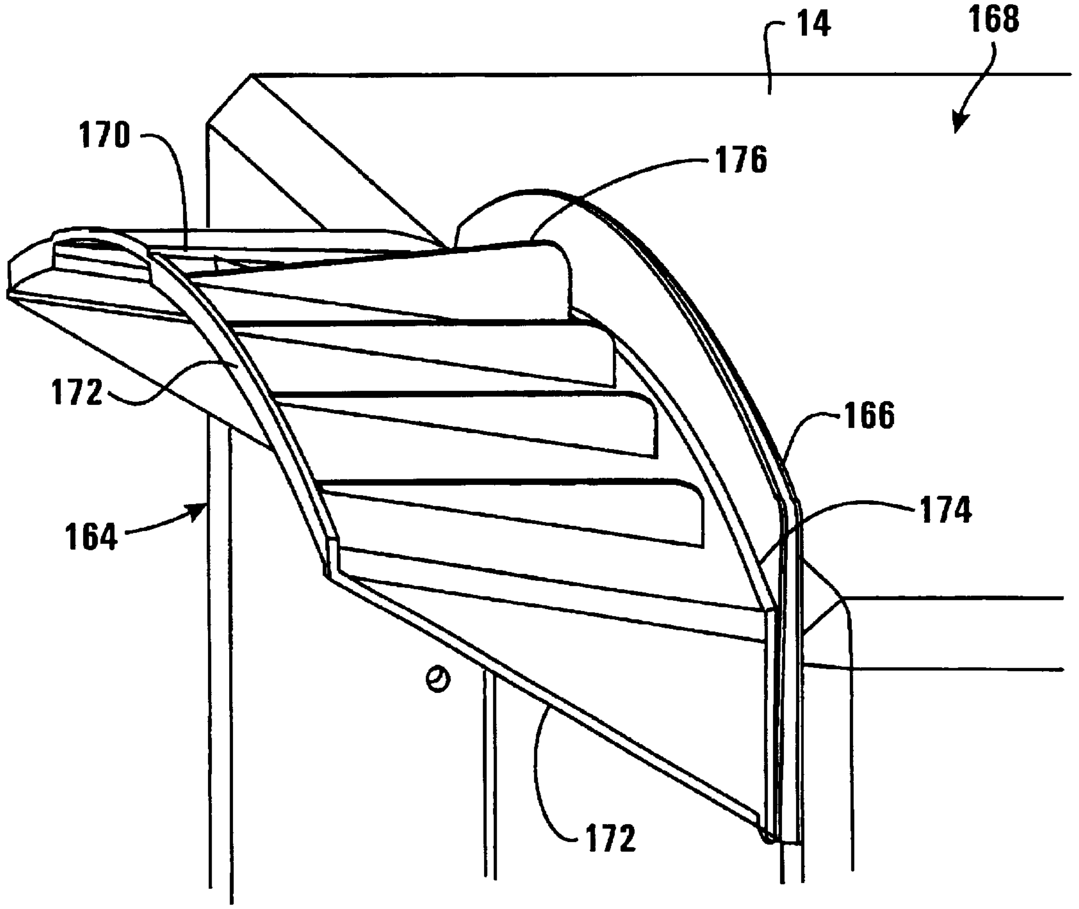
FIG. 7 is an isometric view showing a baffle structure used in an exemplary embodiment.

The exemplary baffle structure 164 is shown in greater detail in FIG. 7. The exemplary baffle structure 164 includes a vertically extending wall portion 166 that extends upward adjacent to the machine housing. As shown in FIG. 7 in the exemplary baffle structure 164, the vertically extending wall portion 166 extends above the generally flat top surface 168 of the housing. The exemplary baffle 164 further includes an arcuate surface 170. The arcuate surface 170 extends generally forward of the wall portion 166. In the operative position of the rollout tray 112 represented in FIG. 6, the arcuate surface 170 overlies the display 36 in a generally shroud like fashion.

In the exemplary embodiment the arcuate surface 170 has at the forward and side peripheries thereof, a lip 172. The lip 172 is operative to catch and direct moisture and other contaminants that may collect on the baffle structure 164 toward the area of the baffle structure 164 adjacent to the wall portion 166. Further as shown in FIG. 7, the arcuate surface 170 is generally angled to direct moisture toward the surface of the wall portion 166.

Positioned adjacent to the surface wall portion 166 is a moisture collecting trough 174. The moisture collecting trough 174 is operative to capture moisture and other contaminants that move toward the wall 166 and to direct them to the side of the arcuate surface and to the exterior of the housing in a manner that is later discussed. In the exemplary embodiment of the baffle structure 164, there are a plurality of fin portions 176 that extend generally outward from the arcuate surface 170. The fin portions 176 are generally disposed forward away from the wall portion 166 so as to avoid interfering with the flow of material through the moisture collecting trough 174. As can be appreciated the fin portions 176 are operative to direct air flow which passes across the baffle structure 164 as well as to minimize the potential cross flow of moisture across the arcuate surface 170 except in the area of the moisture collecting trough 174.

Figure 8:
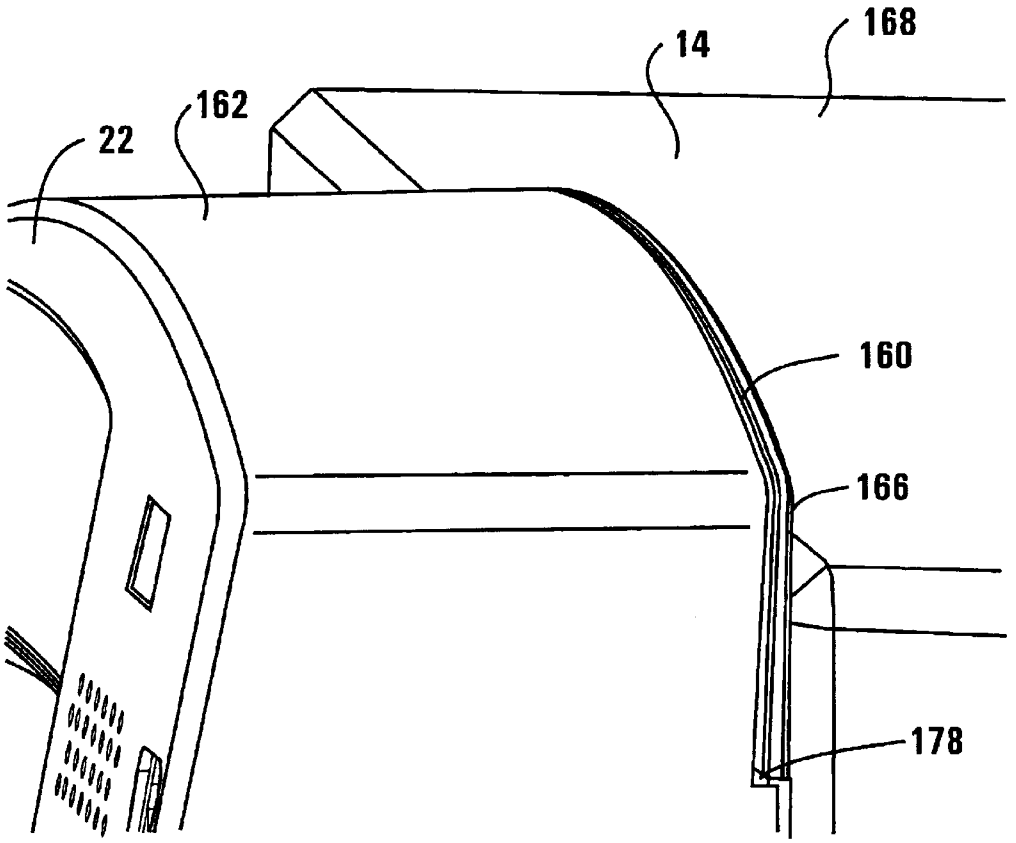
FIG. 8 is an isometric view showing a fascia portion in an operative position adjacent the baffle.

As shown in FIG. 8 when the second fascia portion 122 is moved to the operative position, the air cooling opening 160 extends generally between the top wall 162 of the second fascia portion 22 and the forward face of the vertically extending wall portion 166. This elongated opening provides sufficient area for air flow as required for maintaining the interior of the housing within the desired temperature range. Further, the configuration of the fascia portion 22 and the baffle structure 164 in the operative position causes the moisture collecting trough 174 to direct moisture and contaminants collected therein to the outside of the ATM housing through a base area 178 of the air cooling opening 160. This minimizes the opportunities for water and other contaminants to collect within the machine. As will be appreciated, the second fascia portion 22 and baffle structure 164 are symmetrical and thus the exemplary structure enables contaminants to exit from the housing of the machine on the sides of the first and second fascia portions 20, 22.

Figure 9:
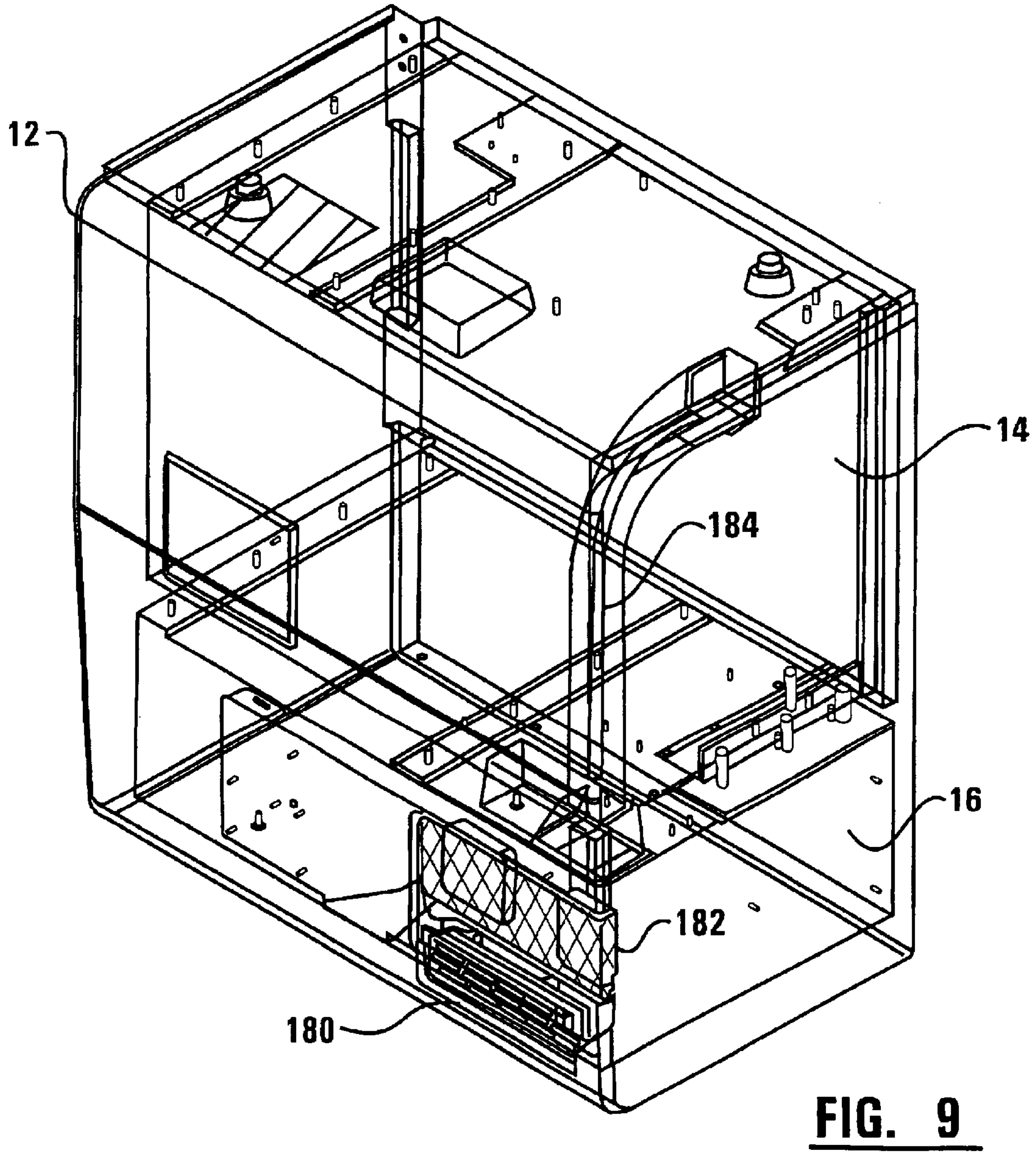
FIG. 9 is a transparent rear isometric view showing blowers, air openings and an air moving duct within a housing of an exemplary embodiment.

As shown in FIG. 9 the exemplary embodiment facilitates air flow through the machine for cooling purposes by providing an air opening 180 at the rear of the chest portion 16. As can be appreciated the air opening 180 is appropriately protected so as to prevent attack therethrough into the chest portion 16 of the housing. The air opening 16 is operatively connected through appropriate filters or other devices to one or more blowers 182. The blowers 182 are operative to provide forced air flow through the housing. In addition in exemplary embodiments of the invention heating and cooling devices may also be provided in proximity to the blowers so as to facilitate maintaining appropriate temperatures within the housing. Such devices may include for example, heat pumps, Peltier devices and other suitable devices for cooling, heating or otherwise conditioning air that flows through the housing. Appropriate sensors and other controls may be operated within the housing to maintain the components in the housing within a suitable temperature and/or humidity range.

In the exemplary embodiment a duct 184 is provided between the chest portion 16 and the upper housing area 14. The duct 184 enables air flow between the chest portion 16 and upper housing area 14 so as to facilitate the cooling or heating of components in both sections of the housing. As can be appreciated for purposes of maintaining the display in an appropriate temperature condition, air may be passed from the air opening 180 and through the duct 184 into the upper housing area 14. The positive pressure produced by the blower and the upper housing area 14 causes air flow through the upper housing area 14 and through the air cooling opening 160. In such circumstances air is directed around the rear and sides of the display 36 past the baffle structure 164 and out the opening 160. Alternatively under appropriate circumstances the blowers may be operated to reverse the air flow in which case the heat generated by a display 36 may be captured within the machine so as to supplement the heating capabilities of heaters within the machine to avoid components from becoming too cold. As can be appreciated in some embodiments the controller of the machine or other controllers may be operated to control the direction and rates of the blowers as well as the heating and cooling devices so as to maintain the interior of the housing within the appropriate temperature range. In the exemplary embodiment the structure of the display, baffle structure and second fascia portion facilitate cooling (and heating) the display and other components while minimizing the risk of the introduction of contaminants into the machine.

As can also be appreciated from the previous discussion, the baffle structure 164 is mounted in generally fixed relation with the housing. As a result the extension of the rollout tray 112 enables the display 36 and other components supported on the tray 112 to be extended outside the housing and away from the baffle structure 164 so as to facilitate servicing. Once such servicing is conducted the rollout tray 112 and second fascia portion 22 may be retracted so that the display 36 again moves in underlying relation of the baffle structure 164 and with the baffle structure 164 extended in intermediate relation between the display 64 and the air cooling opening 160 so as to provide protection. Of course it should be understood that these structures are exemplary and in other embodiments other approaches may be used.

In the exemplary embodiment the ATM 10 is provided with enhanced diagnostic capabilities as well as the ability for servicers to more readily perform remedial and preventive maintenance on the machine. This is accomplished in an exemplary embodiment by programming the controller and/or alternatively distributed controllers and processors associated with the transaction function devices, to sense and capture diagnostic data concerning the operation of the various transaction function devices. In an exemplary embodiment this diagnostic data includes more than an indication of a disabling malfunction. In some embodiments and with regard to some transaction function devices, the data may include for example instances of speed, intensity, deflection, vacuum, force, friction, pressure, sound, vibration, wear, or other parameters that may be of significance for purposes of detecting conditions that may be developing with regard to the machine and the transaction function devices contained therein. The nature of the diagnostic data that may be obtained will depend on the particular transaction function devices and the capabilities thereof as well as the programming of the controllers within the machine.

In the exemplary embodiment the controller is operative to process data representative of the condition of the various transaction function devices and to store such information in one or more data stores in a protected form. In an exemplary embodiment the protected form of the information is such that persons who are not authorized and do not have a suitable diagnostic article are not able to obtain access to such data. The nature of the protection used for the data may include in some cases encryption, storing such data in a memory device which erases the data in the event of tampering, or in other forms so as to protect such data from unauthorized persons.

In an exemplary embodiment authorized servicers are enabled to utilize the diagnostic data and to facilitate remedial and preventive maintenance on the machine by being issued a diagnostic article such as diagnostic article 98 previously mentioned in conjunction with FIG. 4. In the exemplary embodiment the diagnostic article is computer readable media such as a CD which may be operatively engaged with a diagnostic article reading device 96 such as a CD drive. Of course it should be understood that in other embodiments the diagnostic article may have other forms and may include for example a portable terminal such as a PDA or cell phone or may be a portable storage device such as a plug in USB memory module or smart card.

In the exemplary embodiment engaging the diagnostic article in operative connection with the controller enables a servicer to obtain access to the diagnostic data as well as to access information from the article which provides an indication of the significance of the diagnostic data being received. In an exemplary embodiment the diagnostic article includes service manual data which can be output through an output device of the ATM or other terminal, and which a servicer can utilize in a manner similar to repair instructions and other information which are usable to conduct servicing operations on the ATM. Further, in an exemplary embodiment, the diagnostic article includes diagnostic instructions that are operative to interpret results of diagnostic tests or operations that can be performed through operation of the controller.

In the exemplary embodiment the diagnostic article includes instructions which may be utilized by and interact with the controller of the machine. This enables the servicer to utilize the diagnostic data as well as service data from the diagnostic article to provide output indicia through an output device which may suggest to a servicer certain diagnostic tests. The controller may then be operated to enable a user to provide inputs through one or more input devices of the machine corresponding to such diagnostic tests. These diagnostic instructions which are included in the service data on the diagnostic article cause the controller to interact with the transaction function devices and to produce one or more results. Responsive to such results the controller in the machine is operative to cause the output of indicia which may indicate the result(s) to a servicer. Further responsive to the result(s) and the service data on the diagnostic article, the controller may operate to cause the output of indicia corresponding to other diagnostic tests which may be conducted as well as service or remedial actions which a servicer should consider taking in order to fix existing problems or minimize the risk of future ones. In an exemplary embodiment the service data included in the diagnostic article can be used to guide a servicer through service activities as well as to interact with the controller and provide servicer interaction at the machine so as to obtain test results and enable diagnosis of conditions within the machine. In addition, the exemplary embodiment of the service article when in operative connection with the controller, enables the output of indicia which may comprise textual, audible or graphical information so as to facilitate servicing activities at the machine by the servicer.

In the exemplary embodiment of the service article, the article provides to the controller one or more secret codes, commands, results or other things, all of which are referred to herein for brevity as secret codes. Such secret codes are analyzed through operation of the controller to determine if the diagnostic article is authorized. In some embodiments the controller may operate to require a user to input information which is utilized in making a determination as to whether the article is authorized. Such input user information may include for example, input codes to input devices on the machine or biometric inputs. In addition or in the alternative the secret codes which are derived from the diagnostic article may be time, machine, or device specific. For example, the particular diagnostic article may have secret codes which indicate that it is operative only during certain time periods or before or after a particular date. The controller in the ATM may operate to carry out a calendar function which provides a current date. The ATM controller may utilize the secret codes from the diagnostic article to produce one or more values which are compared to verification data which is produced responsive to time or date data so as to produce a comparison result. The controller may thereafter enable the output of diagnostic data or significance data for the performance of activities based on the comparison result indicating that the diagnostic article and/or user are authorized.

In some exemplary embodiments the service data included in the diagnostic article may be encrypted. Such encryption may include various standard or nonstandard techniques so as to reduce the risk of unauthorized users being able to access such service data. In the exemplary embodiment the controller at the ATM is operative to decrypt the service data so as to enable its utilization in conducting diagnostic activities and to enable the output of indicia corresponding thereto through output devices either on the machine or through an output device at a separate terminal.

Further in some exemplary embodiments the diagnostic article may include browser software. Such browser software may be loaded to the controller in the ATM and may be operative therein to provide output indicia as a result of processing the service data through the browser. In some embodiments such a browser may be programmed to interpret embedded instructions in the service data that do not conform to published standards and/or which are generally nonpublic. Such embedded instructions may be processed by the browser so as to output indicia usable in servicing the machine as well as to cause the controller to interact with transaction function devices within the machine so as to conduct diagnostic activities. The use of such nonstandard browser software further enhances security associated with the diagnostic article as well as the machine.

In addition in some embodiments the diagnostic article and/or the data stored in the ATM may contain instructions so as to prevent continued operation of the browser software and/or retention of the service data from the diagnostic article in memory after the diagnostic article is operatively disconnected from the controller. Such instructions may be utilized to minimize the risk that service data from the diagnostic article, the browser software or other instructions contained therein, continue to be operational in the machine after the authorized servicer has removed the diagnostic article from operative connection with the controller.

In addition in some exemplary embodiments the diagnostic article may be configured such that it may be used in conjunction with computer devices other than an automated banking machine. For example in circumstances where the diagnostic article includes service manual data, authorized users may be able to utilize the diagnostic article to obtain electronic service manual documentation from a computing device such as a notebook computer, PDA or cell phone. In such circumstances diagnostic instructions included in the diagnostic article that would otherwise interact with the machine controller and/or transaction function devices included in the ATM, will not be operative in another type of computing device. In such exemplary embodiments it may be appropriate however to prevent access to the service manual data contained on the diagnostic article unless the secret codes are determined to be appropriate through correspondence with time data inputs from a user or other appropriate verification data which indicates that access to the service manual data is authorized.

It should be understood that these approaches and techniques are exemplary and in other embodiments other approaches, techniques and capabilities may be used.

Figure 12:
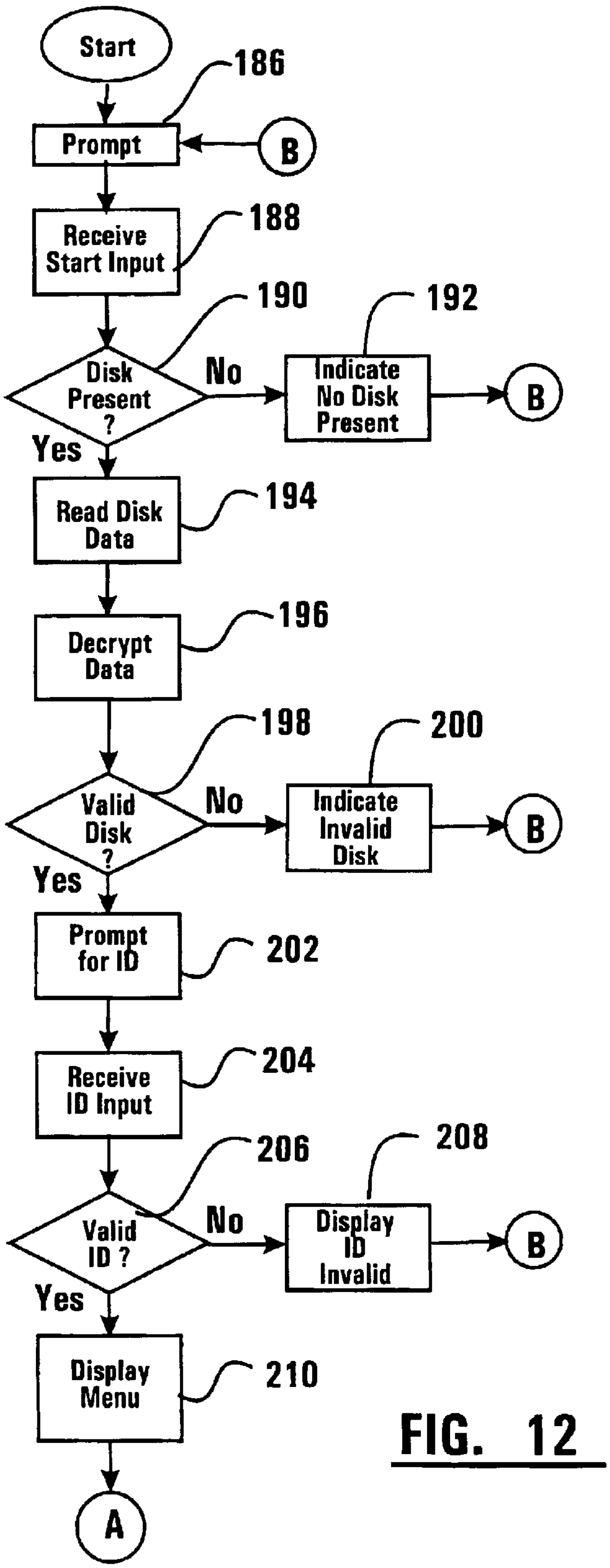
FIG. 12 and FIG. 13 show a schematic view of an exemplary embodiment of logic that may be used in servicing the machine through use of a diagnostic article.
Figure 13:
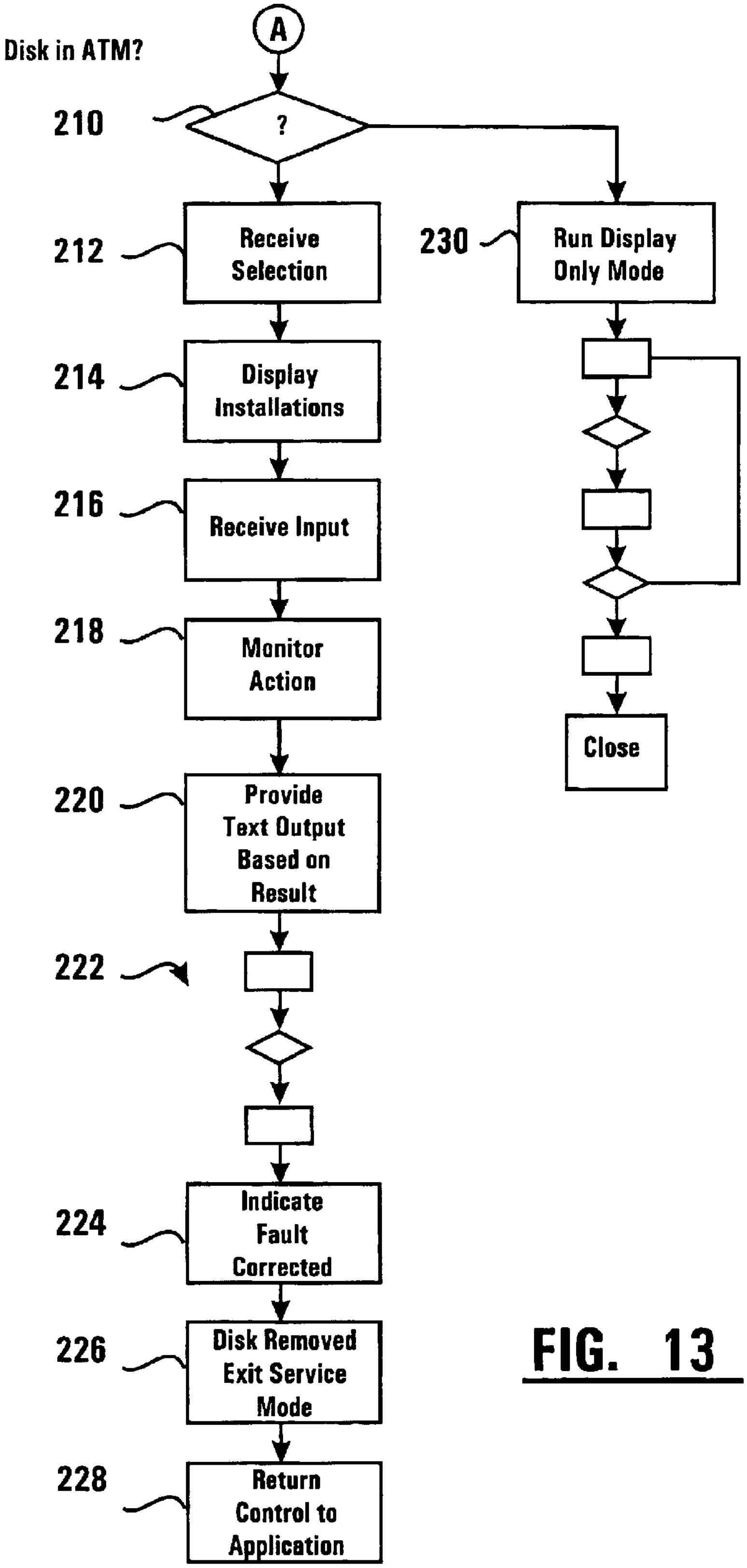

FIGS. 12 and 13 show an exemplary schematic logic flow associated with verifying the authorized character of the diagnostic article such as a CD in an ATM. It should be appreciated that in the exemplary embodiment the diagnostic article reading device such as the exemplary CD reader 96 will generally be positioned within the housing of the ATM and may be within the secure chest so that only authorized service personnel are able to gain access thereto. This may further help to assure that only those who may properly gain access to the interior portions of the housing may conduct the service activity which may include being able to access valuable documents, sensitive customer data, or other information.

As represented in FIG. 12, once a servicer has gained access to the diagnostic article reading device, the controller may operate in a step 186 to provide output indicia through an output device of the ATM prompting a servicer to provide an input to enter a diagnostics mode. If in a step 188 an input to enter the diagnostics mode is provided, the controller is then operative to check if a diagnostic article disk is present in a step 190. If no disk is present in the diagnostic article reading device, the controller is operative to provide indicia through an output device indicating to the servicer that no disk is present. This is done at a step 192 when the controller returns the logic to the prompting step 186.

If a diagnostic article is determined to be present in a step 190, the controller is operative to cause data to be read from the article in a step 194. In the exemplary embodiment the diagnostic article provides secret codes which are also encrypted and the controller is operative to decrypt the data to a usable form in a step 196. In step 196 the controller is operative to compare data corresponding to at least one of the secret codes to verification data for purposes of making a determination as to whether the diagnostic article is valid. This is done in a step 198. As previously discussed, the verification data in various embodiments may be derived from information stored in memory in the machine, date data, inputs provided by a user, or other data which is operative to generally reliably verify that the diagnostic article is authorized and is being used within the scope of its permitted use. If in step 198 it is determined that the diagnostic article is invalid, indicia is output to the user through an output device of the machine to indicate that the diagnostic article is invalid. This is done at a step 200 and the logic returns to the prompting step.

If in step 198 the disk is determined to be valid, the exemplary embodiment causes the controller to operate in accordance with its programming to provide output indicia which prompts the user to input ID data. This is done at a step 202. The user then provides at least one input to at least one input device on the ATM at a step 204. The controller is then operative to cause a verification step 206 to be executed to determine if the ID input by the user is valid. In various embodiments the determination as to whether the user ID is valid may be based on the secret code data, date data, stored data, or combinations or relationships thereof which operate to assure that access is limited to authorized users. If the input from the user is determined not to be valid, the controller is operative to output indicia indicative thereof to an output device as represented at a step 208 when the controller returns the logic flow.

If the user ID data input is valid as determined in step 206, the controller is operative to read the diagnostic article. As previously discussed in some embodiments this may include loading browser software from the diagnostic article into a memory in operative connection with the controller. Alternatively or in addition this may also involve decrypting encrypted service data or instructions from the diagnostic article. In the exemplary embodiment such activities are carried out and the controller operates to display a menu responsive to the service data included on the diagnostic article. This is done in a step 210.

In the exemplary embodiment of the diagnostic article, the controller in the ATM or the processor of the computer device in cases where the diagnostic article is not being used in the ATM, is operative to operate to execute a testing step to determine if the diagnostic article is in operative connection with an ATM. This is represented as a step 210 in FIG. 13. In the exemplary embodiment the diagnostic article contains instructions which enable the accessing of diagnostic data stored in the ATM and enable the utilization thereof in connection with conducting service activities. Logic flow may be derived at least in part from instructions on the diagnostic article. If such diagnostic data and transaction function devices are not present in a computing device because it is not an ATM, the logic flow may vary to accommodate use in the non-ATM computing device. For purposes of carrying on the description of the logic flow it will be presumed that the determination in step 210 properly indicates in the circumstances described that the diagnostic article is in operative connection with the ATM. This then causes the controller in the ATM to operate responsive to the diagnostic article to render diagnostic data accessible, as well as to provide output indicia on output devices on the ATM corresponding to menu options and selections which are available for conducting activities at the ATM.

The servicer then makes appropriate selections as represented in a step 212 which are responsive to the menu option and selections outputs produced in response to the operation of the controller. This may include for example a selection indicating that the servicer wants to determine the nature of any anomalies which currently exist or which have existed in the operation of transaction function devices in the ATMs. Of course other options for the servicer may also be provided in accordance with the programming of the controller and instructions on the diagnostic article.

In response to a user indicating that they wish to receive information about malfunctions or anomalies in the operation of the ATM, the controller is operative to cause indicia to be output through an output device on the machine corresponding to such information, as well as suggested diagnostic tests that could be performed at the ATM in order to determine the cause or nature of the malfunction or anomaly. This is represented in a step 214. In response to the output the servicer provides an input indicative of the action that the servicer wishes to have conducted. This input may be provided through one or more input devices on the ATM. Such input devices may be included in a special servicer interface, but in some embodiments input devices of the ATM generally used by consumers may be used for this purpose.

Inputs from the servicer in step 216 would generally cause the controller to interact with one or more transaction function devices to carry out a diagnostic test and to receive a result of the test. This is represented by a step 218. Responsive to the result of the diagnostic test and/or service data, the controller is operative to provide output indicia to the servicer. This output indicia may include information on the outcome of the test or may indicate that further tests should be conducted. This is represented by a step 220. Such further steps may be carried out as appropriate for purposes of diagnosing the particular condition(s) of interest in the machine. These further steps may involve in the exemplary embodiment, receiving instructions from the servicer. The controller responsive thereto, interacts with the transaction function devices in the machine and the service data from the diagnostic article so as to direct the diagnostic activities. Such activities are schematically represented through a series of steps indicated 222.

The fault or other condition which is sought to be detected, corrected or otherwise addressed will be detected, corrected or otherwise addressed by the controller operating responsive to the service data and the diagnostic data. This is represented in a step 224. In an exemplary embodiment, once this is accomplished, a servicer may conduct additional diagnostic activity by interacting with the machine. However, in this exemplary series of steps, it will be considered that the servicer has completed his activities and wishes to return the machine to service. In doing this the servicer will provide appropriate inputs to the machine and will remove the diagnostic article from operative connection with the controller. This is represented in a step 226. Such action is operative to take the ATM out of the diagnostics mode and to prevent additional access to diagnostic data within the machine. Such action will also generally cease the operation of any special browser software associated with the service article as well as any diagnostic programs which are only operated when the service article is engaged with the machine. Thereafter the controller operates to return control of the ATM machine to the application. This is represented in a step 228.

As can be appreciated, the exemplary embodiment provides for service data, such as diagnostic instructions and other diagnostic activities that may be described in service manuals or other instructions or data, to interact with the controller of the machine. In the exemplary embodiment this enables a servicer not only to receive indicia corresponding to what a servicer should do in order to conduct a particular test, but also to provide instructions to the controller based on the service data so that the controller can conduct a test. Further, in appropriate situations the result of the test may be utilized to direct a servicer to the appropriate remedial action or to a different test within the service data so as to complete the servicing activity as quickly as possible. Such capabilities, particularly when combined with the availability of the diagnostic data concerning transaction function devices stored in the machine, enables more accurate and rapid identification and correction of problems so that the machine may be returned to service.

As previously mentioned, in the exemplary embodiment the diagnostic article may also be operated as an electronic service manual within a computer device other than an ATM.

As shown in FIGS. 12 and 13, access to service data which is included on the service article may be restricted in a manner similar to that employed when the service article is used in conjunction with an ATM. This is done through appropriate programming and interaction with a non-ATM computer device. However, as indicated in step 210, when it is determined that the service article is not operating within an ATM, the service article operates in a display mode only as indicated at a step 230. In the display mode the service data is provided to a user in a manner similar to an electronic service manual. Thus the user may be able to browse selectively through the information review and to the textual material and diagrams associated therewith. However, when the diagnostic article is operated in display mode only, diagnostic instructions that would otherwise cause the controller of the ATM to interact with transaction function devices are not operative to perform functions within a non-ATM computer device. It should be appreciated, however, that being able to use the exemplary diagnostic article in conjunction with another type of computer device may facilitate servicing in some circumstances. In some embodiments the controller may be programmed to provide access to diagnostic capabilities to a remote computer device through a network. Such capabilities may be provided in some circumstances when the diagnostic article is installed or otherwise operative in the remote computer device. This may avoid the need in some embodiments for a servicer to travel to the machine to physically connect the diagnostic article with an article reading device such as a reader. Rather, the diagnostic activities may be conducted remotely so as to facilitate identifying any issues and to minimize machine downtime.

It should be understood that although in the exemplary embodiment the diagnostic article is described as a CD or other read-only device, in other embodiments the diagnostic article may be another type of device. This may include, for example, a portable terminal such as a notebook computer, PDA, cell phone, or other suitable article which can be verified as genuine and which can provide the service data and the instructions to facilitate carrying out diagnostic activities.

In some alternative embodiments the diagnostic article may be utilized in a system that enables remote communication with the ATM. For example, the diagnostic article may be utilized in conjunction with a remote computer that is operatively connected to the ATM through a network. In some examples the operation and logic may be similar to that previously described except that instead of the diagnostic article being adjacent to the ATM it communicates with the ATM controller through the network. In some embodiments the messages through the network may be encrypted to provide enhanced security.

For example in some embodiments the controller may be programmed so that a diagnostic article which is a CD, hard disk or other computer readable media resides on a computer remote from the ATM. The remote computer includes output and input devices that operate to provide outputs and inputs similar to that previously described when diagnosing conditions at the ATM. In this way a remote servicer may diagnose and possibly change, adjust or correct conditions at the ATM. In some embodiments the service manual data and diagnostic data may also be utilized by the remote servicer in conjunction with the service activities. The one or more secret codes or other means used to gain access to diagnostic data and other values or functions may be those from the diagnostic article and/or inputs by the user to the remote computer, or may be a function of other values from the user and/or remote computing device. In some embodiments the ability to conduct service activity locally or remotely may be provided to facilitate servicing of the ATM. Further, in some alternative embodiments the remote servicer may work in conjunction with a local servicer in diagnosing aspects of the machine. In some embodiments the local servicer may be associated with the remote servicer. In other embodiments the remote servicer and local servicer may be associated with different entities.

For example, in some circumstances an owner or operator of the ATM may choose to perform service and maintenance on the ATM themselves, or to have a service company not associated with the ATM manufacturer perform such service. This may be done as a cost saving activity by the machine owner or operator who may be capable of fixing simple problems either directly through their own service organization or through another servicer.

However, upon encountering more complex problems the ATM owner, operator or servicer may need the benefits of more sophisticated diagnostic capabilities. In such circumstances, the assistance may be requested from another service operation such as the ATM manufacturer or other entity capable of providing more sophisticated or proprietary diagnostic and/or service capabilities on a remote basis. This may be done in some embodiments by using a communications interface between the ATM and the remote service system which can provide the diagnostic or service capability. In some embodiments communication may be achieved between a person at the ATM and the remote service system may be achieved by other communication devices such as a cell phone or laptop computer with wireless modem.

In an exemplary embodiment, the remote diagnostic and testing capabilities for the ATM enables online communication with the remote system to test the ATM and diagnose possible problems in a manner similar to that previously described. In some embodiments, the communication with the person at the machine may enable the person at the machine to make repairs or take other remedial actions. This may be facilitated in some embodiments by the use of outputs such as graphics showing machine components and remedial procedures and/or simulated human voice instructions output through output devices on the ATM. Such outputs may be used to guide the person at the machine to conduct checks and/or to take remedial action. In some embodiments, the ATM manufacturer's service center may provide human assistance in connection with the testing and remedial action. In other embodiments, the testing and remedial guidance capability may be provided on an automated basis from the manufacturer's service system. In other embodiments, the assistance may include combinations of human assistance as well as an automated interface for providing diagnostic and remedial guidance.

In some embodiments, servicers may be charged fees for the use of the remote diagnostic and remedial service capability. Such fees may be paid, for example, on a periodic basis, a per machine basis, a per use basis, a time on line basis, based on the type or nature of resources used or other basis. For situations where the person or entity using the system pays for the amount of use thereof, provisions are made for charging accordingly. This may involve, for example, the person requesting the service identifying the machine, themself and/or the entity on whose behalf they are acting, to the service facility. This communication may be done through operation of the controller in the ATM communicating messages through one or more networks. In some embodiments, information stored in memory at the ATM may be accessed and used as the basis for accessing charges. In some embodiments, the person at the machine may provide identifying inputs that facilitate accessing charges. Such charges may include in some embodiments providing a debit or credit card or other account number to which the remote service entity's charges may be assessed. In some embodiments, the charge information may be input through manual inputs at the ATM such as through a keyboard at the machine. In some embodiments, charge information may be input by use of a servicer's card by reading the card through operation of the card reader on the ATM. In some embodiments, such capabilities may avoid the need for the ATM owner or the on site servicing entity to establish any relationship with the manufacturer or other remote service company prior to requesting services. In addition such an arrangement may provide the remote service entity with greater assurance of being paid. Of course, these approaches are exemplary and in other embodiments other approaches may be used.

In other exemplary embodiments the remote service entity may provide the capability for upgrading the software that resides at the ATM. This may be done on an as requested basis by the ATM owner or operator or local servicer. Alternatively this may be done on a periodic basis by the remote servicer as part of a subscription service or other activity.

The software programs residing at the ATM may be subject to occasional changes. Such changes may be in the nature of upgrades, problem fixes, new security features, support for new functions or devices or enhanced functionality. In some cases such software changes may be sufficiently significant so that the operator of the ATM or network in which they are used, may test and certify that the change is suitable for use. In other situations the change may not be of sufficient significance to warrant certification.

The ATMs used in exemplary embodiments may use a suitable communications device in operative connection with the ATM controller for communicating with the remote servicer system. Such a communications device may include for example a modem, network card or other device for communicating through an appropriate network with the servicer system. In some exemplary embodiments the controller may have in a data store associated therewith, computer executable instructions such as agent software to enable the generation and communication of messages between the ATM and the servicer system. The ATM controller may also be in operative connection with hardware or software suitable for providing encryption, SSL and/or other techniques for assuring secure communication with the remote system. As can be appreciated, various approaches may be used depending on the nature of the system, the network(s) through which communications pass and the nature of the data or other items transmitted between the remote servicer system and the ATM.

In cases where a problem exists at the ATM, the controller may be operative responsive to appropriate authorizing data, to send one or more messages to the remote servicer system indicating the software items and revision levels for the software currently residing on the ATM. A remote server operated by the remote servicer receiving this information may be programmed to compare or otherwise analyze the software items to the most current software for the particular type of ATM and/or ATM network or operator, or to analyze such software for malfunctions. The remote system may alternatively or in addition check to determine whether the software copies indicated are licensed for use on the particular ATM. This may be done based on receipt of data stored in ATM memory that identifies the particular machine. Upon determining that corrections, enhancements or other desirable changes and/or one or more items of software at the ATM may be provided, the server may be enabled to download the changes or one or more complete software items to the controller in the ATM. The controller operates to store the downloaded software in local memory.

This may be done in some embodiments automatically through operation of the ATM controller and remote server. In other embodiments it may be done in response to inputs provided by persons at the remote servicer facility, at the ATM, or both. In some embodiments a servicer may be required as a prerequisite to downloading the correction or software, to provide billing data or provide payment to the remote servicer for such software or service. Alternatively or in addition, the remote servicer may require agreement to certain contractual terms and/or the receipt of registration or other data prior to electronic delivery of the software or correction. In some embodiments this may be accomplished by communications between the remote server and the ATM controller. Such communications may cause the ATM to output license terms and "click to agree" or other legal terms which can be accepted by a servicer at the ATM through inputs to one or more input devices. Further the server may cause the ATM to output prompts for inputs by the servicer of information such as license registration data or other information the operator of the remote server requires as a condition to providing the software change. Alternatively or in addition, the remote servicer may operate to route communications to a computer other than the ATM controller to obtain agreement to terms, input of data or other data or information. This may be done for example in situations where owner or operator personnel who are not located at the ATM must agree to legal terms, provide data, grant approvals or otherwise communicate with the remote servicer. Of course these approaches are exemplary.

In some embodiments the remote server may alternatively or additionally operate to load diagnostic software onto the ATM and/or activate diagnostic capabilities of the ATM that are otherwise not accessible. Such diagnostic software or capabilities may be removed or discontinued at the end of the particular service session, may cease after a period of time or may operate on a continuing basis. Appropriate communications with the remote server may also be exchanged to provide appropriate authorizations and payment for such capabilities.

In other exemplary embodiments a remote servicer may provide software management services for the owner or operator of ATMs. Such service may include for example providing for the automated loading to ATMs of corrections, updates, or upgrades to software resident on the particular ATMs. This may be done for example on an automated basis through secure communications between the ATM controllers and the remote server. This may be done on a scheduled basis by the remote service provider in response to the ATM owner/operator paying for a subscription to such servicer. Alternatively, it may be done on a per request basis for one or more ATMs, with or without authorized servicers being present at the machines and providing inputs to authorize the software change. Of course these approaches are exemplary of many approaches that may be used.

As discussed previously with respect to FIGS. 17, 18, and 28, exemplary embodiments of the ATM may include a diagnostic application 2140, 1044 which is operative to access low level functions of an ATM hardware device. Such low level functions may include exercising a motor sensor or other sub-component of the hardware device. Through such fine level control of the inner workings of an ATM hardware device, the source or cause of a high level functional failure of the device may be determined.

In an exemplary embodiment the diagnostic application 2140, 1044 may comprise textual, audible or graphical information to facilitate servicing activities at the machine by servicers having a variety of skills and servicing styles. The use of the diagnostic application 2140, 1044 may be enabled by engaging a diagnostic article such as the diagnostic article 98, previously mentioned in conjunction with FIG. 4, in operative connection with the controller 72. Any of the various security measures previously discussed, such as biometric recognition, date and time limitations, encryption, or physical barriers may be used to ensure that only authorized servicers access the diagnostic application. The logic flow illustrated in FIGS. 12 and 13, or other series of logical steps designed to limit access to authorized servicers, may be implemented.

Figure 19:
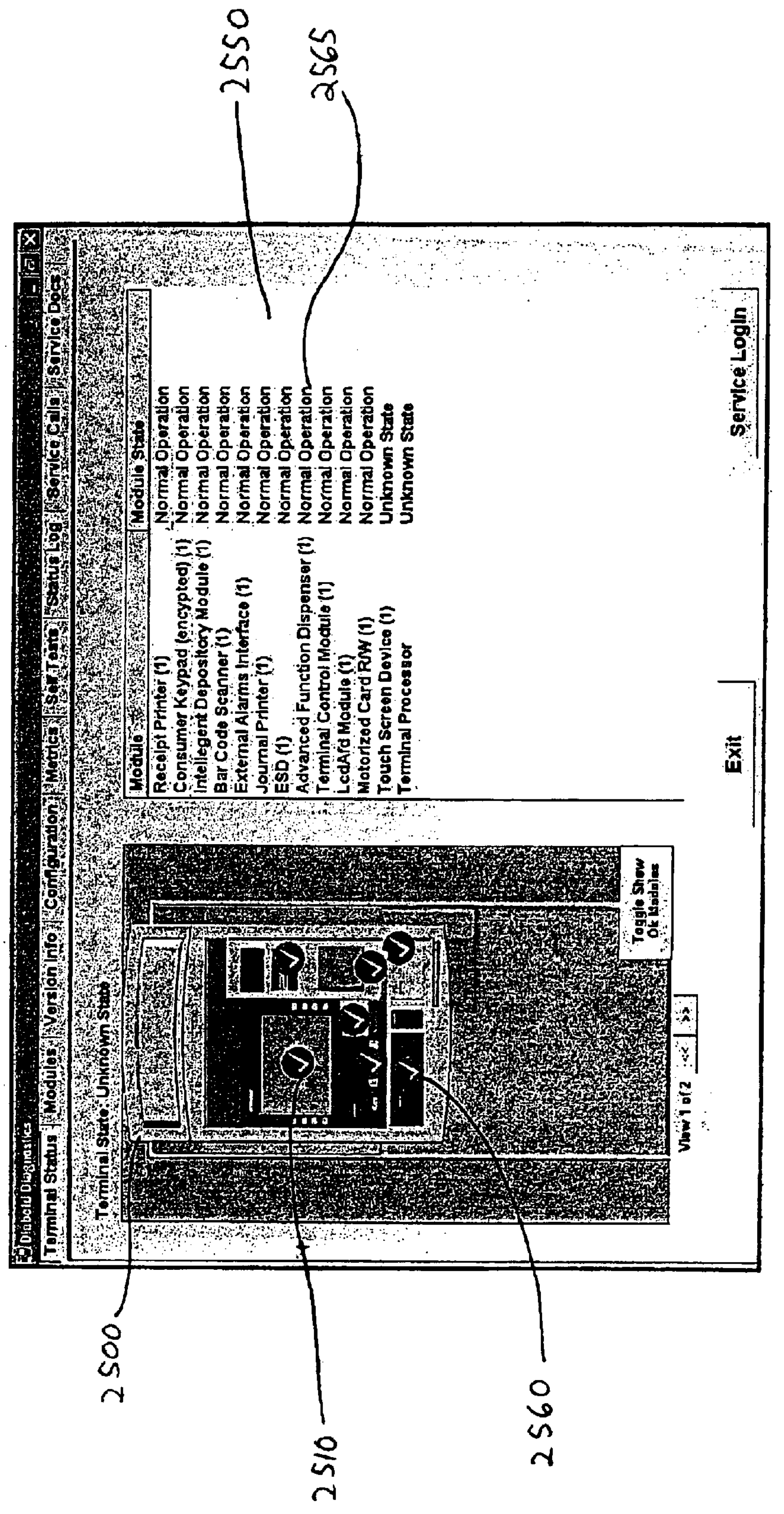
FIG. 19 shows a representative system status screen of a diagnostic application.
Figure 20:
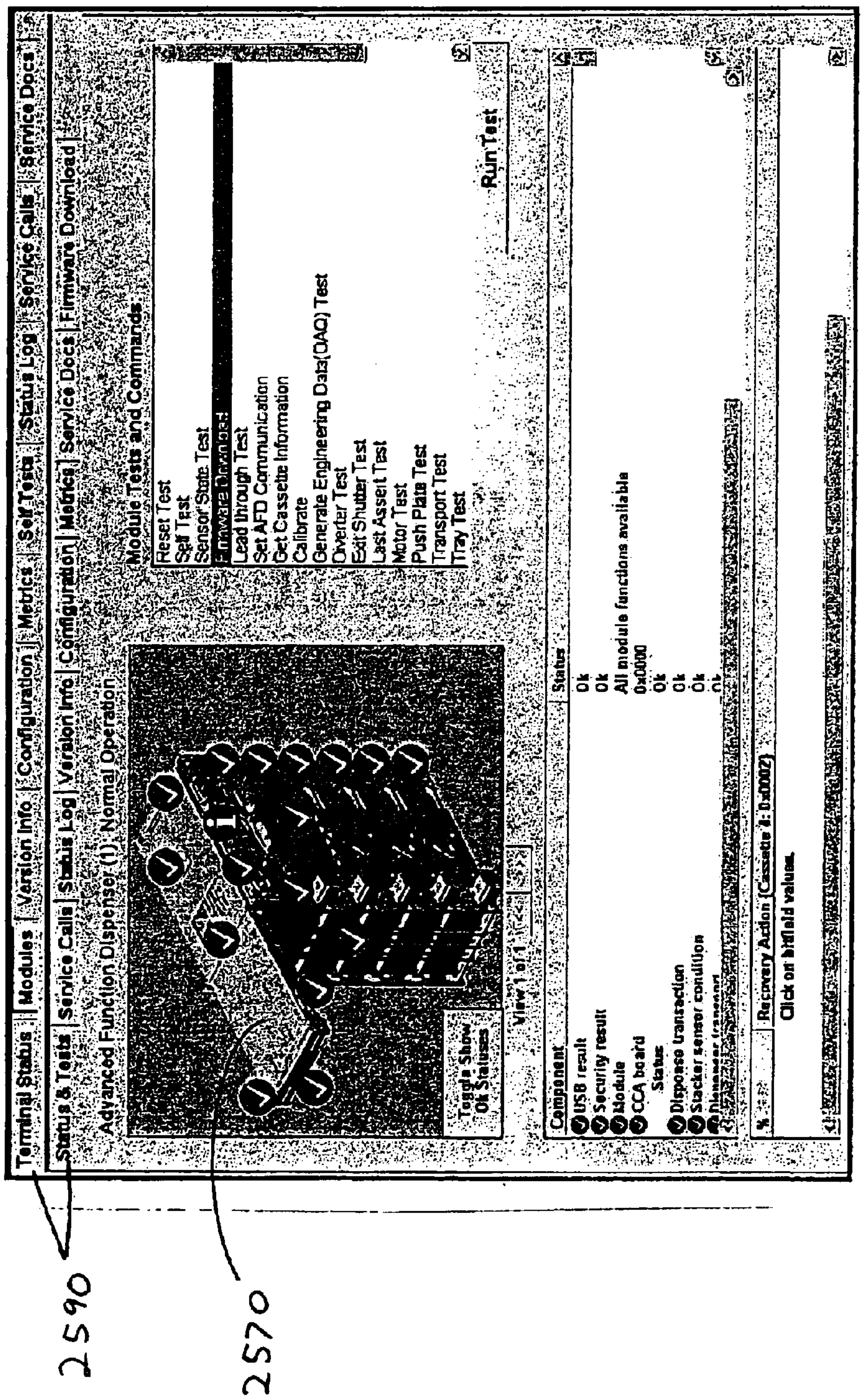
FIG. 20 shows a representative module status screen of a diagnostic application, including an information icon.

In an exemplary embodiment, once the diagnostic application is enabled, graphical indicia of status or other information may be output through an output device of the ATM. Exemplary screens bearing indicia of system and module status of the ATM are illustrated in FIGS. 19, 20. As can seen in FIG. 19, a graphical representation of the ATM 2500 may include a plurality of icons 2510 representing modules or components of the ATM 2500 about which additional information or testing options may be available.

Figure 21:
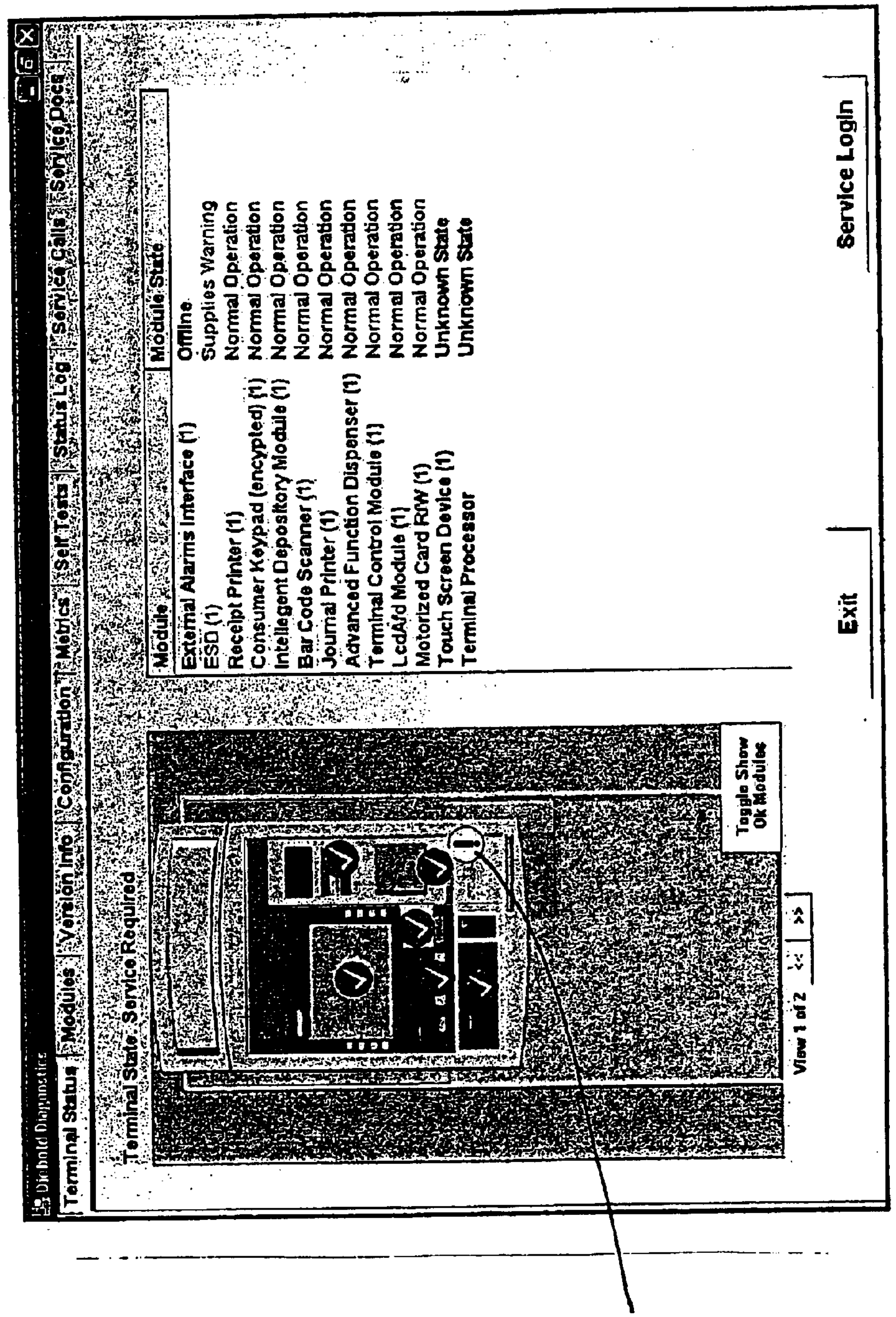
FIG. 21 shows a representative system status screen of a diagnostic application, including a problem icon.
Figure 22:
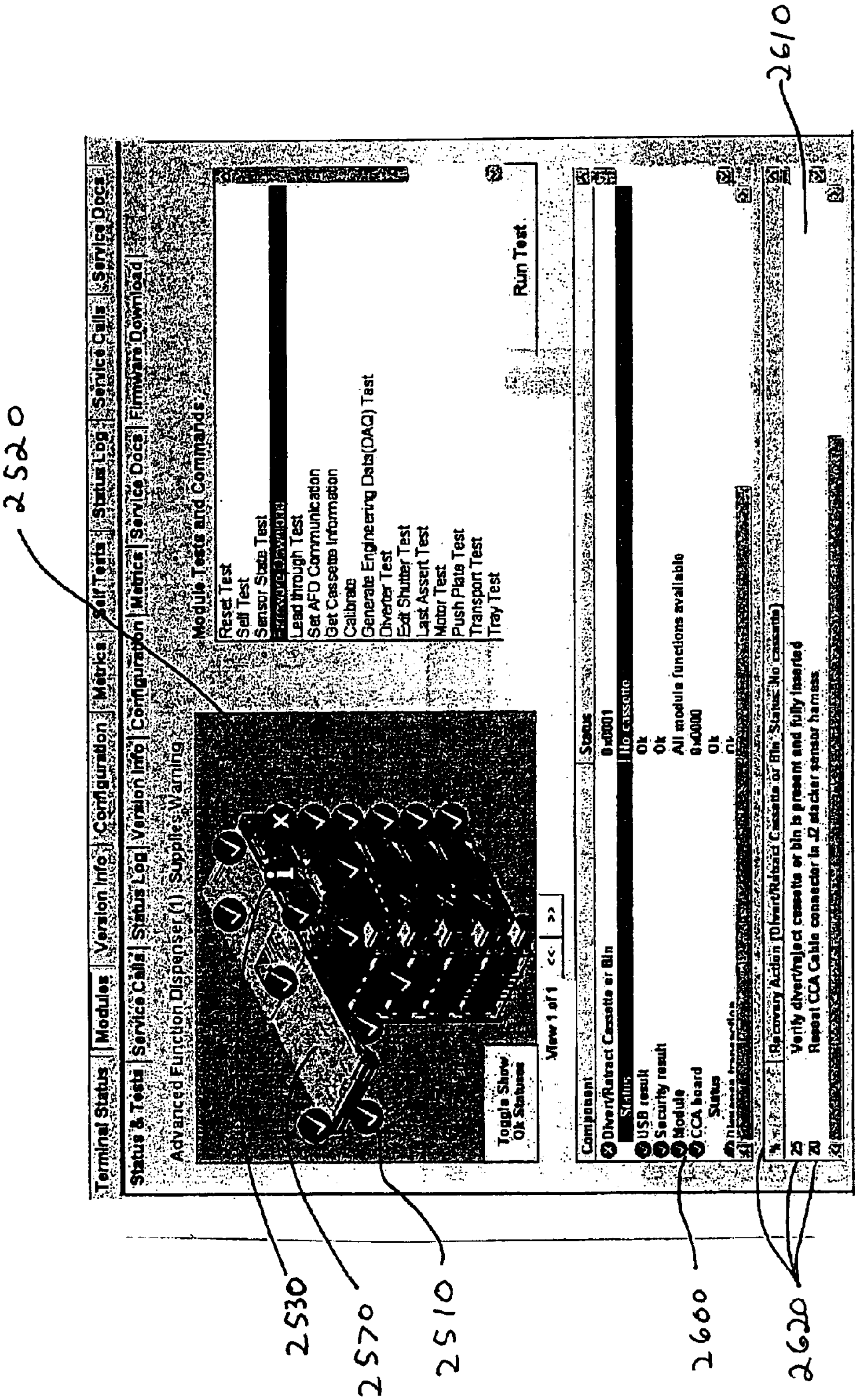
FIG. 22 shows a representative module status screen of a diagnostic application, including an unknown problem icon and suggested recovery actions.

In an exemplary embodiment, a checkmark identified by reference numeral 2510, may represent a satisfactory status. An "X" which is illustrated in FIG. 22 and identified by reference numeral 2520, may represent a malfunction or error of unknown origin. A lower case "I," as illustrated in FIG. 22 identified by reference numeral 2530 may represent a module or component about which additional information is available. Such information may be diagnostic data gathered during ATM operation, such as information about a disabling malfunction, or operational data such as speed, intensity, deflection, vacuum, force, friction, pressure, wear, or parameters that may be of significance in diagnosing existing or developing problems. An exclamation point, illustrated in FIG. 21, and denoted by reference number 1220, may indicate a problem with a known resolution, such as low envelope supplies. It should be noted that these icons are exemplary in nature, as are the nature of the status suggested by each. Additional or different icons or other indicia may be used to signify or suggest actions, status, or other information which may be useful to a servicer.

Figure 23:
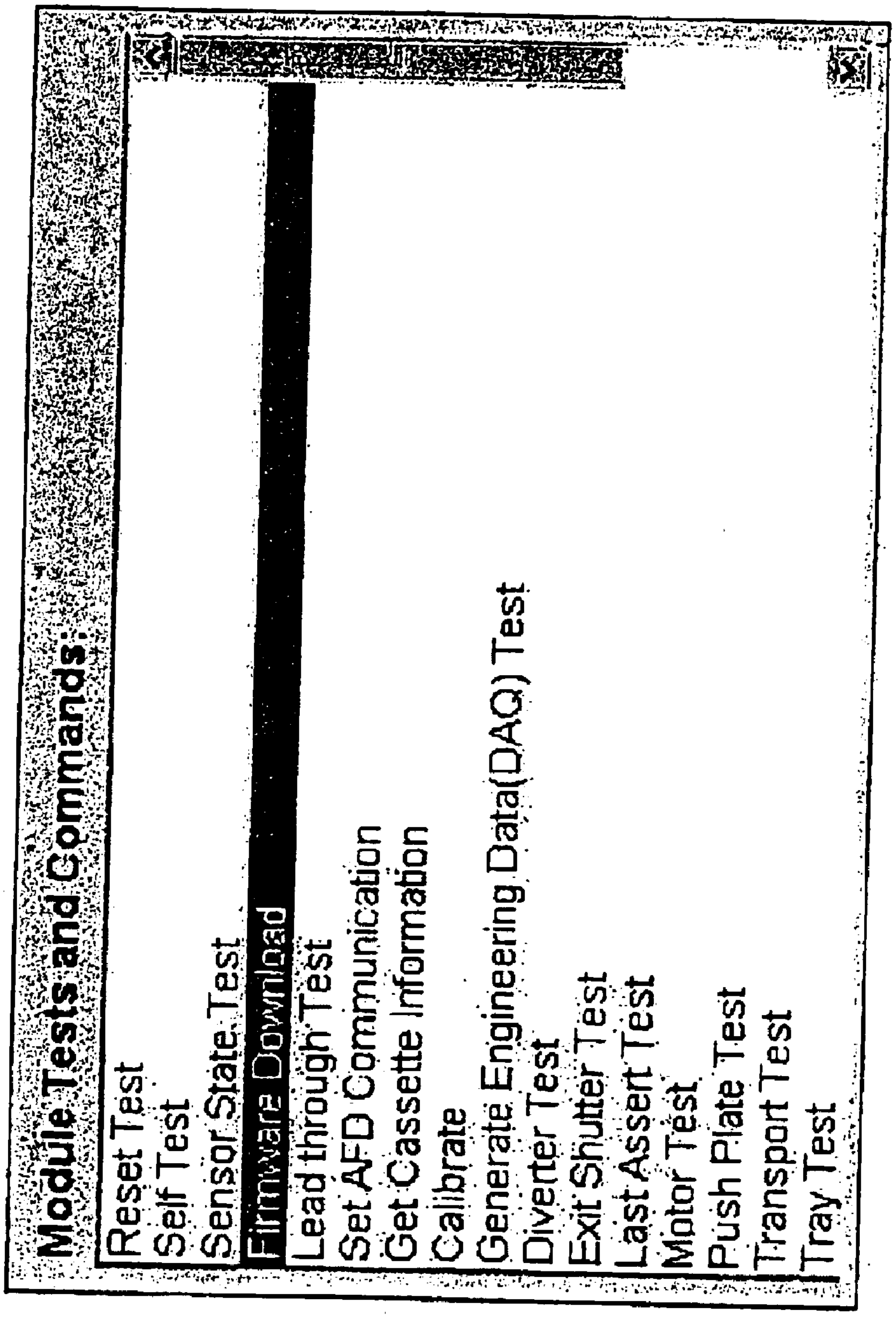
FIG. 23 shows a representative diagnostic application text screen.

In addition to a graphical status representation, the diagnostic application 2140, may be operative to output textual, audible, or other indicia representative of the same or similar information. In the exemplary illustration in FIG. 19, a textual status recitation 2550 is displayed adjacent the graphical status representation 2500. In FIG. 23 a textual embodiment of a portion of a diagnostic application 2140 is shown, which may be displayed without a graphical accompaniment. In other embodiments, the information may be output through any ATM output device such as a printer, via ATM speakers, or by other suitable means such as through a separate service device which is in operative connection with the ATM being serviced, such as a PDA, laptop computer, or other personal electronic device.

The diagnostic application 2140 may be operative responsive to servicer input to display different graphical representations, suggest problem resolutions, perform tests, or provide additional information. Servicer input may include such actions as clicking or touching an icon, entering a textual command, pressing a button, or transmitting directions from a separate local or remote service device. In the exemplary embodiment illustrated in FIG. 19, in response to the servicer clicking on the Advanced Function Dispenser icon 2560, or the adjacent Advanced Function Dispenser text line 2565, a graphical representation of the advanced function dispenser module 2570 may be displayed on an ATM output device, as illustrated in FIG. 22. This module representation 2580 may include a plurality of icons 2510, 2520, 2530 or other indicia of modules or components of the advanced function dispenser module about which additional information, testing, or other actions may be available. The diagnostic application 2140 may be further operative responsive to servicer input to switch to an entirely distinct diagnostic routine, or to leave the diagnostic application completely. In an exemplary embodiment this may be accomplished by clicking or touching one or more graphical tab 2590, such as those shown in FIG. 20.

In the exemplary embodiment illustrated in FIG. 22, the diagnostic application 2140 may be operative to output indicia of various diagnostic options to the servicer. This output may include, for example, a graphical representation of an exemplary module with icons 2520, or other indicia, of malfunctioning components. This output may also include other indicia of status, problems, or options, such as a textual representation of component status 2600, illustrated in FIG. 22 below the graphical representation 2560. The diagnostic application 2140, 1044 may be operative responsive to servicer input to provide recommended recovery actions. In the exemplary embodiment illustrated, in response to clicking the unknown problem icon 2520, the diagnostic application caused an output to be displayed which includes a plurality of recommended recovery actions 2610. In this exemplary embodiment, the output appears below the textual representation of component status 2600. In this exemplary embodiment, the recommended recovery actions are ranked based on the most likely cause of the malfunction or error, indicated illustratively in FIG. 22 by percentages 2620.

Figure 24:
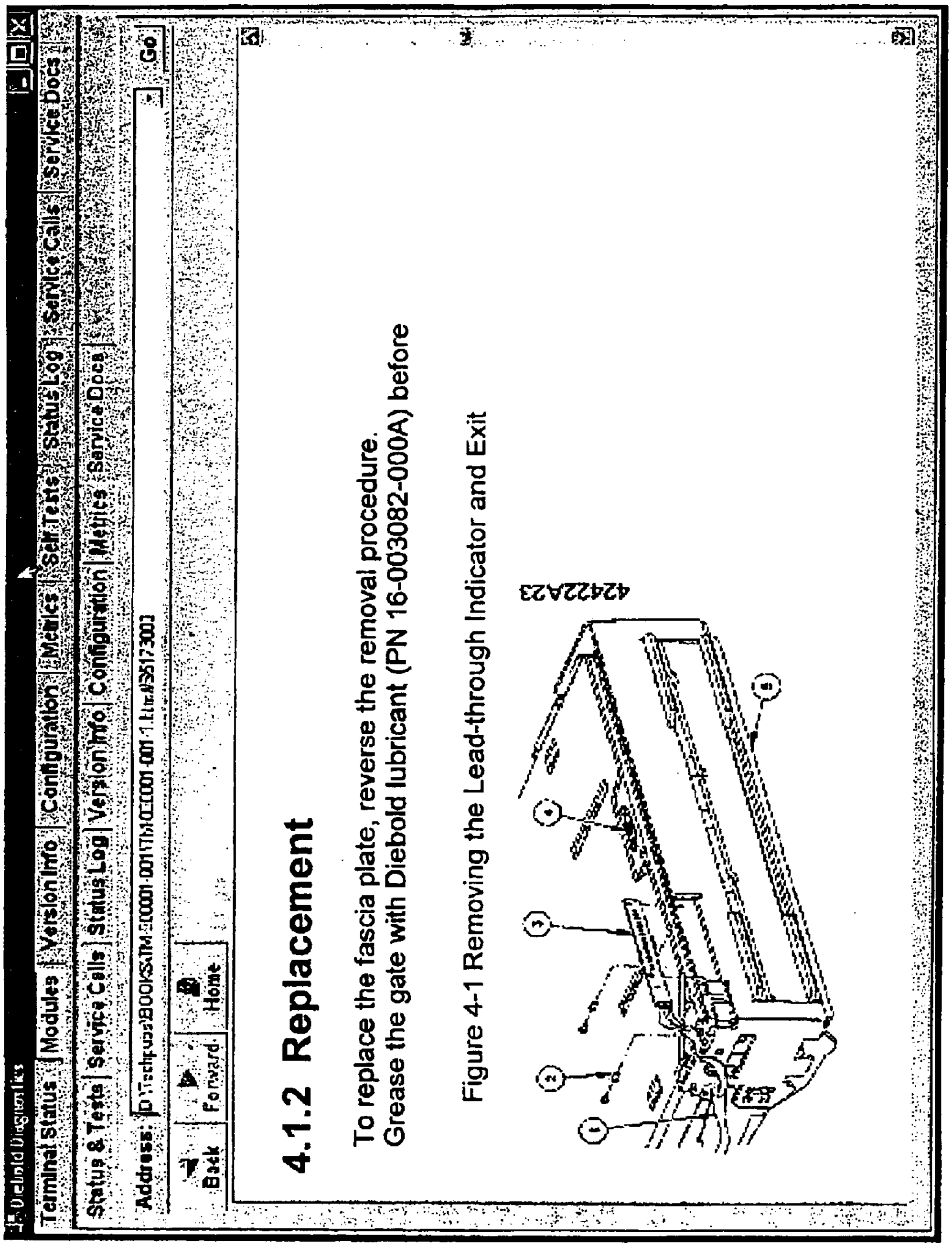
FIG. 24 shows a representative article which may be displayed in a browser.

The diagnostic application may be operative responsive to servicer input to output to the servicer the relevant article or articles from the service data on a diagnostic article. In the exemplary embodiment illustrated in FIG. 24, responsive to the servicer clicking on a recommended recovery action, the diagnostic application caused the ATM to output the service manual article on replacement of the lead-through indicator and exit sensor. In the exemplary embodiment illustrated in FIG. 24, the article is displayed on a screen in the ATM. In other embodiments, the article may be displayed on other terminal output devices, or on other electronic devices operatively connected locally or remotely with the ATM.

Because the diagnostic article may be updated periodically, or may be available in multiple languages or for multiple ATMs incorporating the same diagnostic application 2140 the diagnostic article 98 may contain an index or cross reference which links the relatively permanent references embedded in the diagnostic application 2140 to the appropriate sections of the service data contained in the current version of the diagnostic article 98. By updating the index or cross reference table, a diagnostic application 2140 can be used with multiple versions of a diagnostic article, or with multiple revisions of the same diagnostic article 98.

Further exemplary features of a diagnostic application 2140 may permit the servicer to selectively operate various components of a module or component, or to perform selected tests. In the exemplary embodiment illustrated in FIG. 20, when a module status page is displayed the diagnostic application also displays a textual description 2630 of various commands and tests the servicer may wish to perform. The diagnostic application 2140 is operative responsive to servicer input, such as clicking on a command line, to execute various commands or tests and may further be operative to output additional information such as component status before, during, and after the command, or recommended resolutions. Based on the information output, the servicer may take further action to resolve any identified problems.

In an exemplary embodiment, a diagnostic application may offer a wide range of scripted routines for problem diagnosis, which may assist the servicer to diagnose a problem by performing a series of steps. An exemplary scripted option may guide the servicer to perform a series of tasks including both high level operations, such as printing a receipt, and low level operations such as turning on the motor which drives the receipt printer. In the alternative, a servicer may opt to independently select and perform actions which the servicer's knowledge or experience indicate may be the source of the problem. In such a self-directed use of the diagnostic application, the servicer may be able to access both high and low level control of the transaction function devices, to facilitate testing the gross functionality of a transaction function device, or the interaction between two or more transaction function devices, as well as detailed functionality of each component of a transaction function device.

In an exemplary embodiment, the diagnostic application 2140 may further be operative in response to a system, module, or component status change to prompt the servicer to log the resolution of the problem. This information may be stored as part of the diagnostic data discussed above. An exemplary diagnostic application 2140 may be further operative to transfer such diagnostic data to the diagnostic article 98 for transmission to a diagnostic data collection application. Periodically such diagnostic data may be compiled and analyzed, the weights of the suggested recovery actions amended to reflect actual service experience, and the amended weights transferred back to the diagnostic application via a new release of the diagnostic article 98 or other means. In other embodiments, diagnostic data representing the correct recovery action may be recorded automatically based on data from the transaction function devices in conjunction with a change in component status or the diagnostic data may be transmitted to a diagnostic data collection application by means other than a diagnostic article 98, such as through a modem, wireless, or cable transmission.

Figure 25:
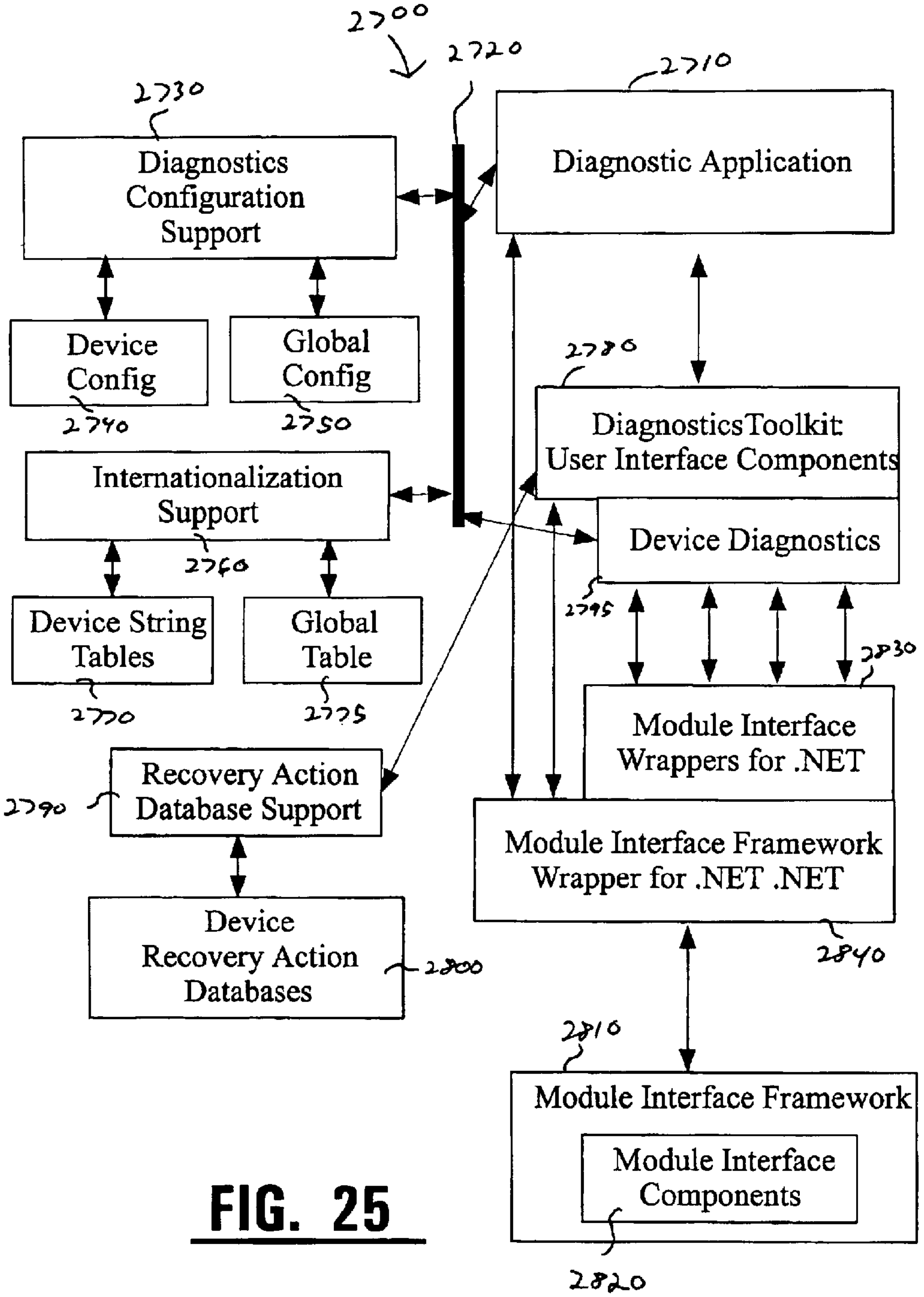
FIG. 25 is a schematic view representative of the software architecture of an exemplary embodiment of a diagnostic toolkit.
Figure 26:
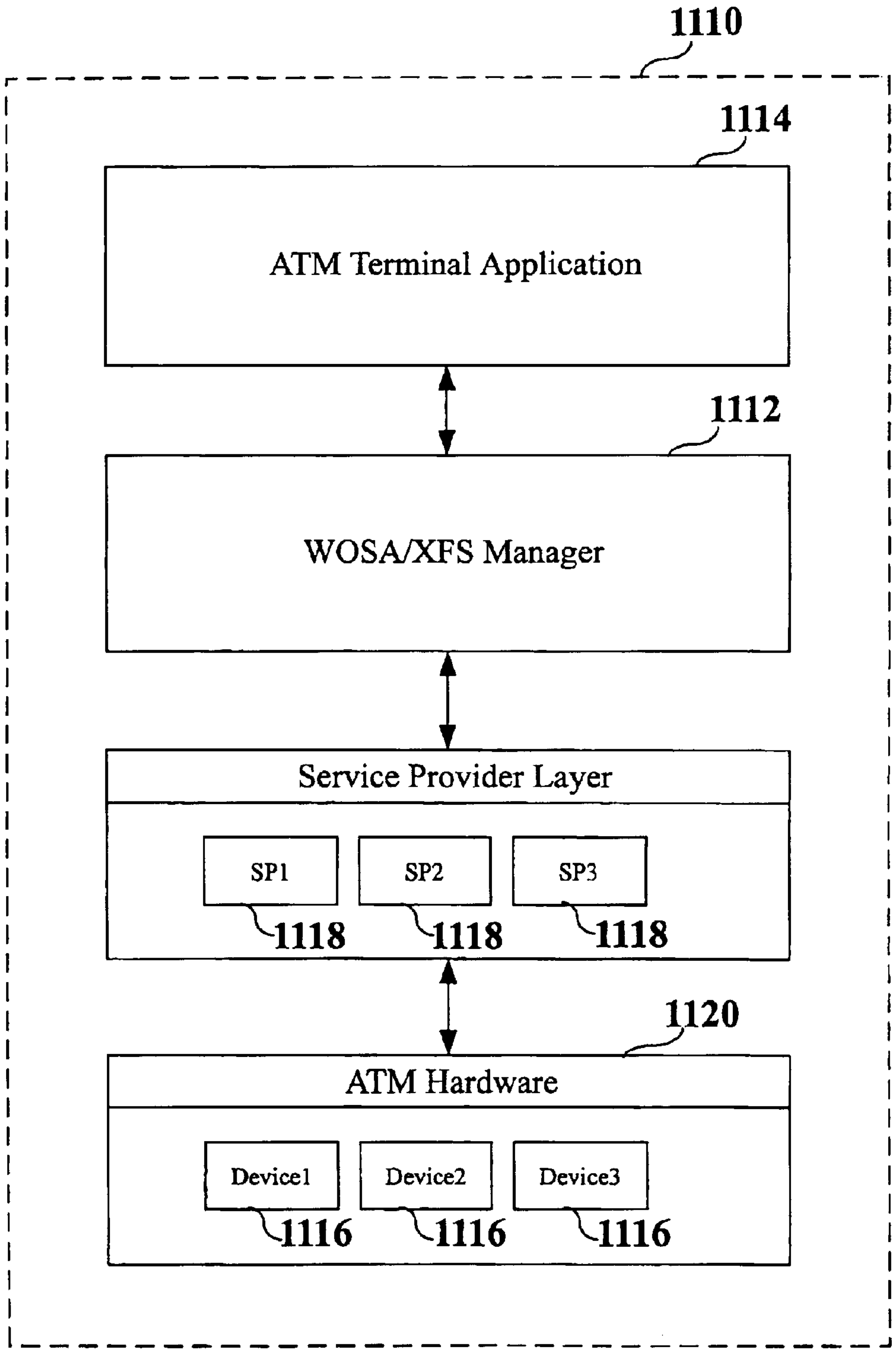
FIG. 26 is a schematic view representative of an exemplary WOSA/XFS enabled ATM.
Figure 27:
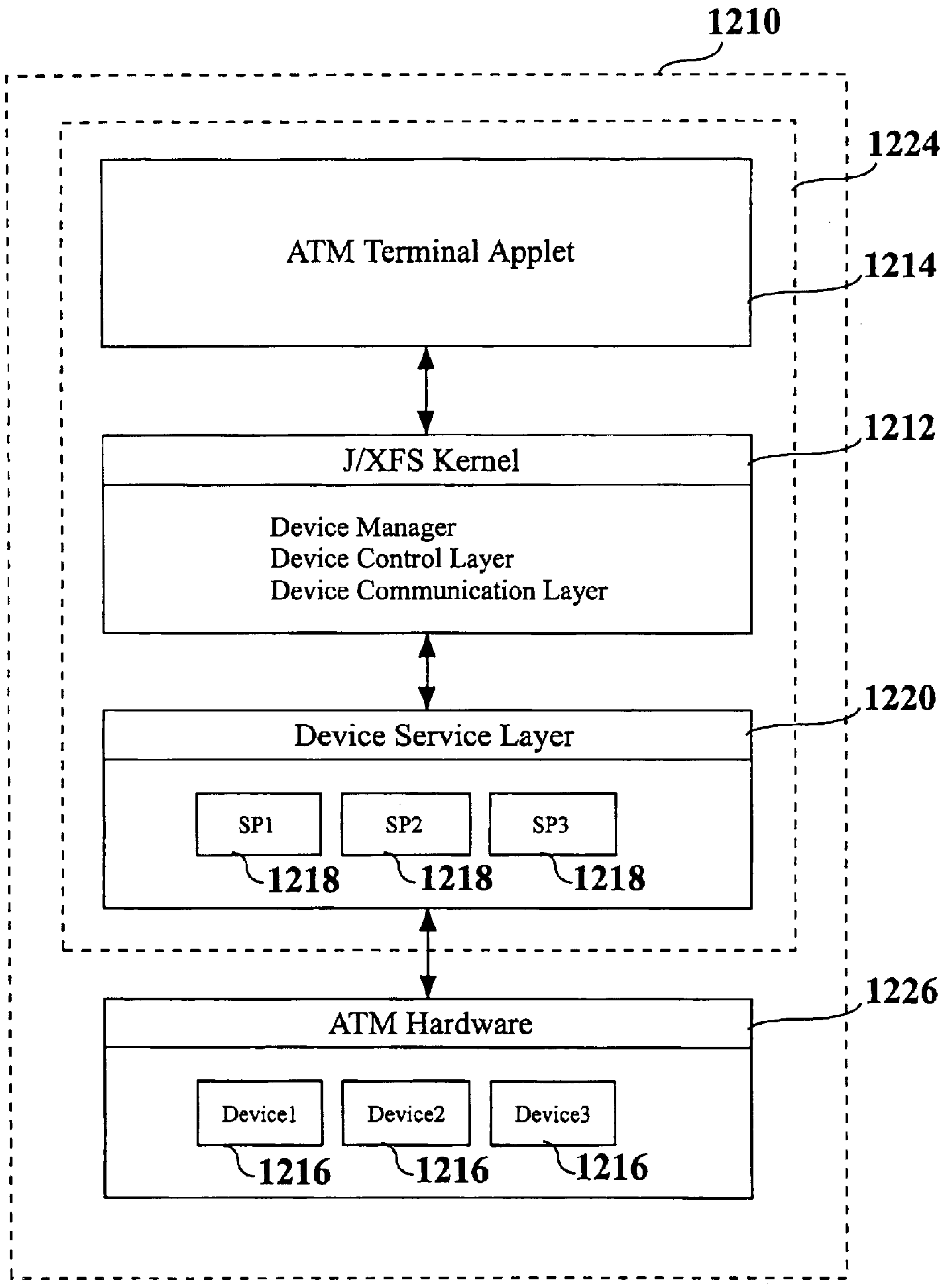
FIG. 27 is a schematic view representative of an exemplary J/XFS enabled ATM.

In some exemplary embodiments, any of the diagnostic enhancements discussed above may be made more accessible to a wider variety of servicers by use of a diagnostics toolkit. The architecture of one such toolkit 2700 is schematically illustrated in FIG. 25. Schematically shown is a diagnostics base application 2710 which includes terminal level features and an overall framework for device diagnostics. In simple form, an exemplary framework such as the one discussed in connection with FIGS. 19 through 23, may include tabbed pages containing a variety of diagnostic options including graphical and textual representations of various levels of system structure; iconic or textual access to additional information, tests, options, or suggested recovery actions; and links to a separate or incorporated service manual.

In an exemplary embodiment, the diagnostic base application 2710 may be interactive with a diagnostics support architecture 2730 for generalizing diagnostics, which may be further interactive with data stores 2740, 2750 to support the transformation of device specific diagnostic configurations into global diagnostic configurations which are accessible to non-vendor specific diagnostic applications. The diagnostic base application 2710 may be further interactive with an internationalization support architecture 2760 to provide support for internationalization of diagnostics, which may be further interactive with data stores 2770, 2775 to support the transformation of device or country specific string tables into strings accessible to the target audience.

In creating exemplary user interface components 2780 and device diagnostics for a diagnostics application directed to a particular servicer audience an exemplary diagnostics toolkit may be also be interactive with support architectures for diagnostic configuration 2730 and internationalization 2760. The user interface components 2780 of the diagnostics toolkit may be further interactive with a generally configured support architecture for a recovery action database 2790 to operatively link to device specific recovery action databases 2800.

As schematically illustrated the diagnostics configuration and internationalization support may be provided through a remote, or network interaction 2720, whereas the recovery database support may be more directly provided. It should be noted that these interactions are exemplary in nature, and other connections may be suitable as well.

Further, as illustrated in FIG. 25, to improve the accessibility of the resulting diagnostic tools to a broad population of servicers, device and framework module interfaces 2810, 2820 may be wrapped in more universal architectures or technologies 2830, 2840, such as Microsoft's .Net technology.

The use of such a toolkit allows a company to easily create diagnostic applications in a variety of languages and for a variety of transaction function devices which have a homogenous operation, architecture, and look and feel. This expands the range of machines which an individual servicer can service by making transition from one diagnostic application to another virtually seamless.

As discussed previously, exemplary embodiment of an ATM with an XFS layer may include a diagnostic application 2140, 1044 which is operative to control internal components of the transaction function devices of the ATM without communicating with the hardware devices through an XFS layer.

In alternative exemplary embodiments, the diagnostic applications 2140, 1044 described previously or a different diagnostic application operating in the ATM, may be used by a technician to diagnose problems that may be associated with the XFS layer and/or terminal applications in the application layer which run above the XFS layer.

For example, as shown in FIG. 30, an exemplary embodiment of an ATM may include a diagnostic application 1516 which may be operative to determine if a problem in the ATM is caused by a component of the application layer 1510 of the ATM or is caused by a hardware or software component in the hardware layer 1512 of the ATM. The determination may be formed by running each of the XFS controlled hardware devices through a plurality of predefined operations or functions. Based on whether the operations are successful or unsuccessful, the diagnostic application may be operative to form a determination as to whether the application layer 1510 or the hardware layer 1512 is responsible for problems that may be occurring with the operation of the ATM.

For example, an exemplary embodiment of an ATM may include a cash dispenser, a depository mechanism, and/or a card reader. Each of these hardware devices may be associated with a vendor provided SP. This described exemplary embodiment of the diagnostic application 1516 may be operative through communication with the XFS layer 1502 to run each of the hardware devices 1518 through a predefined set of operations. For example, through direct calls to the XFS layer, the diagnostic application 1516 may attempt to cause the cash dispenser to dispense an amount of cash and to retract the amount of cash. If the operation of the cash dispenser is not successful, the diagnostic application may be operative to determine that the problem with the ATM corresponds to the hardware layer 1512 of the ATM such as with an SP 1513, UBR component 1515, module interface framework 1517, or a hardware device 1518. If after running each of the devices through the predefined set of functions, all operations are successful, the diagnostic application may be operative to determine that the problem with the ATM corresponds to the application layer of the ATM such as with the terminal applications, user interface applications, TEC components and/or ODS components written to interface with the XFS layer.

In an exemplary embodiment, the diagnostic application may further prompt a technician to perform a function with the ATM. For example, when testing the functions of the card reader, the diagnostic application 1516 may prompt a technician to insert a card. In addition, the diagnostic application may also prompt a technician to confirm that a function of the ATM performed correctly. For example, when testing the receipt printer, the diagnostic application may include a predefined operation that causes the receipt printer to print a receipt. After the receipt is printed the diagnostic application may prompt the technician to confirm with an input through an input device of the ATM that the receipt was properly generated and dispensed to the technician. The diagnostic application may further output through the display device information concerning the expected output of the function such as what information should have been printed on the receipt. The diagnostic application may then enable the technician to input a response that is indicative of whether the printed receipt corresponds to the information that should have been printed on the receipt.

Figure 31:
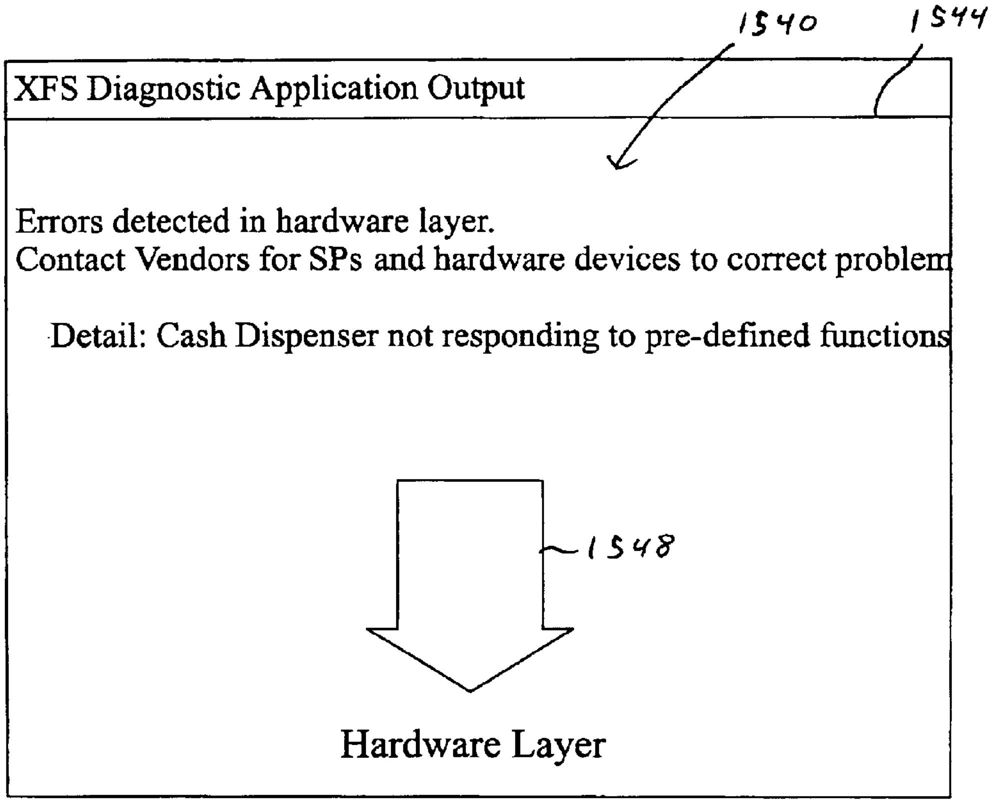
FIGS. 31 and 32 show exemplary embodiments of outputs through a display device of an ATM that are produced by the diagnostic application.
Figure 32:
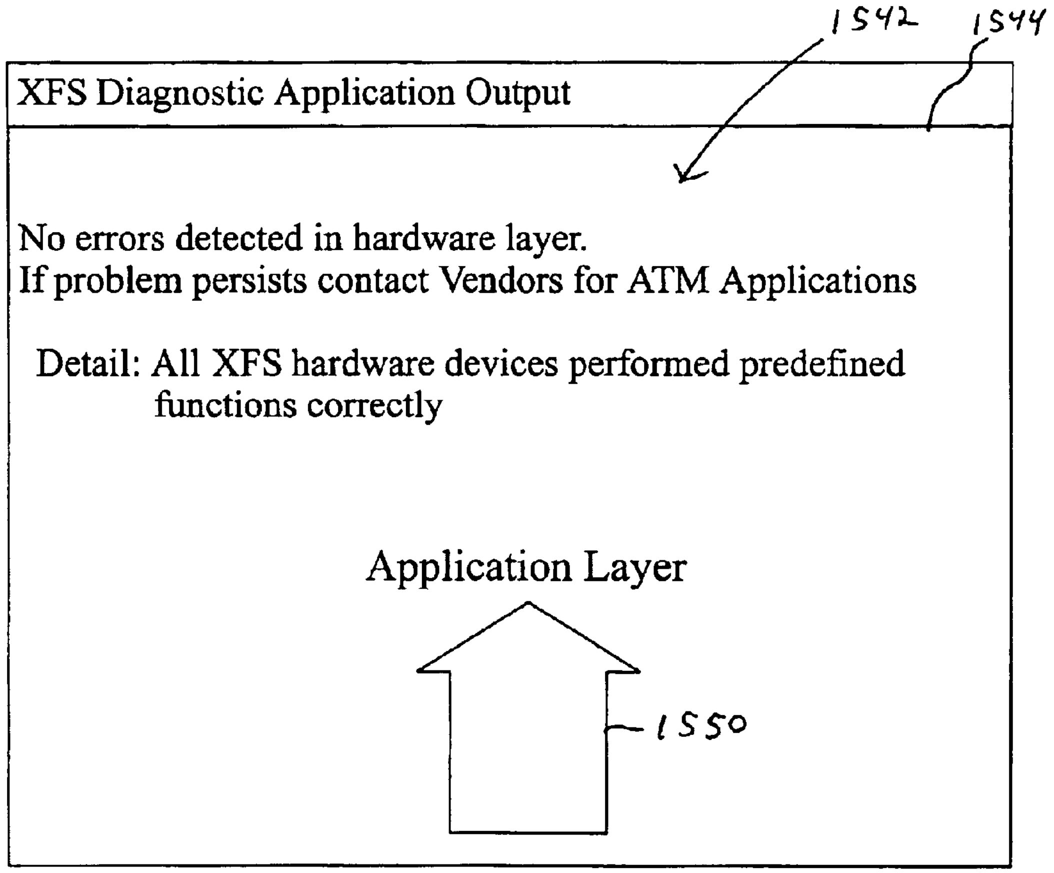
Figure 33:
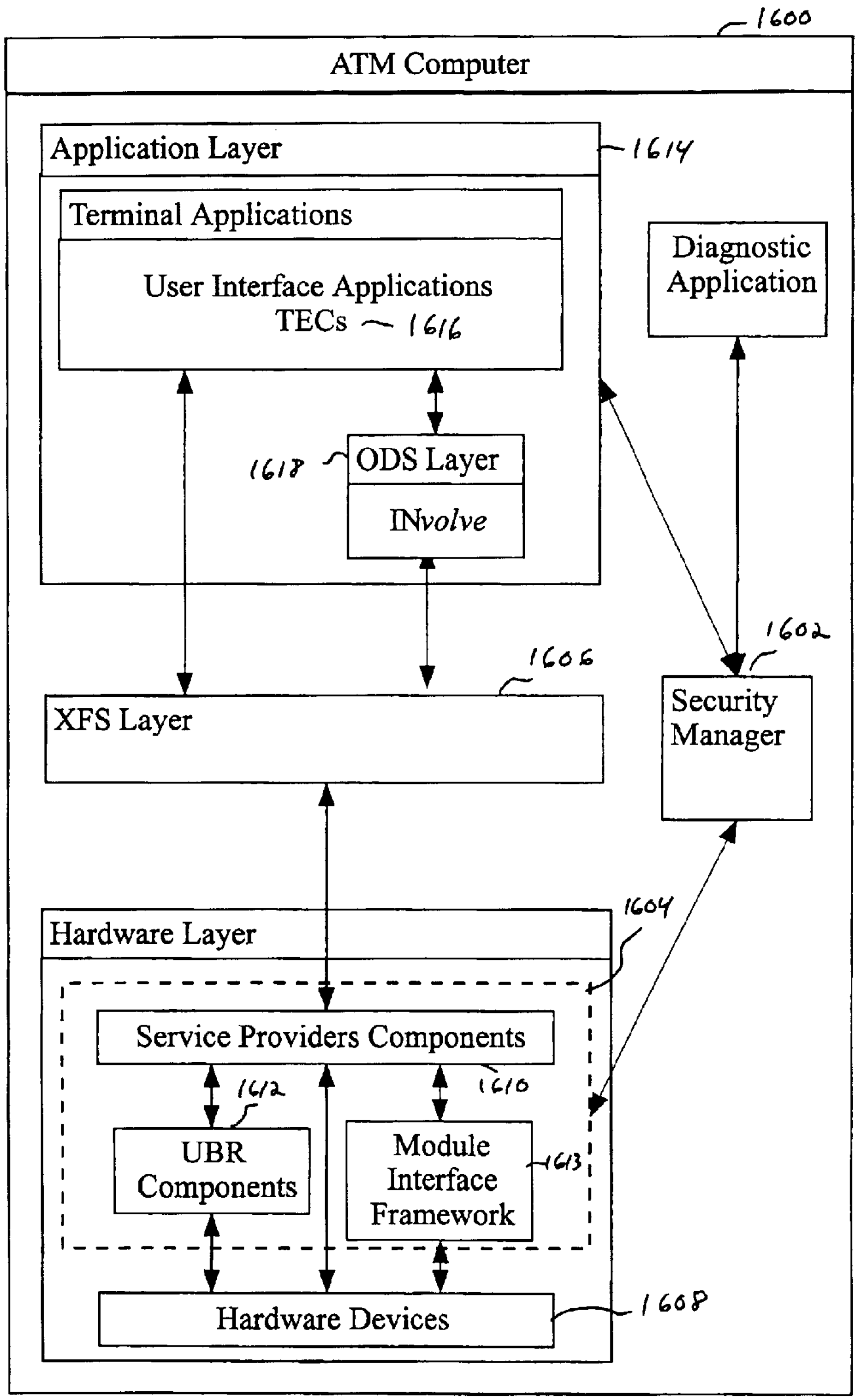
FIG. 33 shows an exemplary embodiment of an ATM which includes a security manager application.

In an exemplary embodiment, the diagnostic application may cause the ATM to output through an output device a message or other communication which indicates which of the application layer or hardware layer of the ATM is likely responsible for the problem or error in the ATM. For example, FIGS. 31 and 32 show exemplary embodiments of outputs 1540, 1542 through a display device 1544 of an ATM that are produced by a diagnostic application. As shown in FIG. 31 if all the predefined functions are completed successfully, the diagnostic application may cause the ATM to output through a display device an up arrow 1548 or other indicia which indicates that the vendor or vendors responsible for the components in the application layer of the ATM may be responsible for the problem with the ATM. If one or more predefined functions performed by the diagnostic application do not complete successfully, the diagnostic application may cause the ATM to output through a display device, a down arrow 1550 or other indicia which indicates that the vendor or vendors responsible for the software and/or hardware components of the hardware layer may be responsible for the problem with the ATM.

In further exemplary embodiments, the diagnostics application may further be responsive to the type of error that was detected when determining whether to output an up arrow or down arrow. For example, if the ATM had previously generated an error message corresponding to a problem with the operation of a cash dispenser mechanism. The diagnostic application may be responsive to the generated error message and may limit the testing of the ATM to the service providers and hardware devices that are associated with cash dispensing. If, in the exemplary embodiment, the diagnostic application detects a problem in a software and/or hardware component of the hardware layer of the ATM which appears unrelated to the component that caused the error message to be generated, the diagnostic application may still provide the technician with information about the problem detected. However, the diagnostic application may also provide an output that indicates that this detected problem may be unrelated to the error message and thus the vendors responsible for the components in the application layer may still be responsible for correcting the component associated with the error message.

FIG. 32 shows a further exemplary embodiment in which an ATM 1600 comprises a security manager application 1602. As discussed previously, components of the device driver layer 1604 are operative responsive to the XFS layer 1606 to control the operation of hardware devices 1608. In this described exemplary embodiment, the components of the device driver layer 1604 may be further responsive to the security manager application 1602 to control the operation of hardware devices 1608. The exemplary embodiment of the security manager may be operative to selectively enable or disable individual components of the device driver layer such as the SPs 1610, UBR components 1612 and/or module interface framework 613. Each of the SPs 1610, UBR components 1612, and/or the module interface framework may be adapted to communicate with the security manager 1602 to determine if they should proceed with controlling a hardware device responsive to communications receive from the XFS layer 1606, diagnostic application or other application. For example if an SP or UBR component associated with a cash dispenser device receives a communication from the XFS layer to cause a cash dispenser of the ATM to dispense cash, the associated SP or UBR for the cash dispenser is operative to acquire authorization from the security manager prior to causing the cash dispenser device to dispense cash.

In an exemplary embodiment, the security manager may expressly grant authorization to each individual SP or UBR component. As a result, each SP or UBR must receive authorization to proceed with a function prior to causing a corresponding hardware device of the ATM to perform the function. In an alternative exemplary embodiment, each SP and/or UBR may proceed with controlling hardware devices unless they receive a communication from the security manager 1602 not to proceed with the control of hardware devices. Thus, each SP and/or UBR may be operative to control hardware devices when the security manager is not installed on the ATM or is not enabled. However, when the security manager is install and is enabled, the same SPs and/or UBR components may be operative to stop being responsive to the XFS layer when a communication from the security manager directs that the SPs or UBR components stop controlling hardware devices responsive to the XFS layer. In this alternative exemplary embodiment, SPs and/or UBR components may be used in XFS enabled ATMs without installing a security manager on the ATM. When a security manager is installed on the ATM, the SPs or UBR components may then begin to be responsive to the security manager prior to operating hardware devices.

In exemplary embodiments of an ATM which includes both an XFS layer 1502 and a module interface framework 1613, the device server of the framework (i.e., device dispatcher and manager) may be operative to selectively control transaction devices such as a cash dispenser responsive to communications with the security manager 1602. In these described exemplary embodiments, the communication between the security manager 1602 and the device driver layer 1604 may be encrypted and/or digitally signed or otherwise cryptographically authenticated to prevent a rogue application from impersonating the security manager.

In an exemplary embodiment, components of the application layer 1614 such as the previously described TEC or ODS components 1616, 1618 may further be operative to communicate with the security manager 1602, prior to communicating with the XFS layer 1606. The security manager may be operative to enable the device driver layer to proceed with controlling hardware devices responsive to the communications received from the TEC, ODS or other application layer components. For example, prior to a cash dispensing TEC or ODS component communicating a cash dispenser command to the XFS layer, the cash dispensing TEC or ODS component may first send a communication to the security manager. This communication may cause the security manager to enable the elements of the device driver layer associated with cash dispensing (i.e., the module interface framework, SP or UBR) to control the cash dispenser device responsive to the XFS layer communication originating from the cash dispensing TEC or ODS component.

In further exemplary embodiments, the security manager may perform other consistency checks on the XFS communications received by the device driver layer. For example, the security manager may verify that the amount of cash requested to be dispensed by the XFS layer communication to the cash dispenser SP corresponds to an amount of cash which the application layer component indicated to the security manager would be dispensed.

In this described exemplary embodiment, the communication between the security manager 1602 and the components of the application layer 1614 may be encrypted and/or digitally signed or otherwise cryptographically authenticated to prevent a rogue application from impersonating an application layer component such as a TEC or ODS component. In this described exemplary embodiment, hardware devices may only be operative responsive to communications through the XFS layer when the security manager has verified that the XFS communications are being sent from an authorized application layer component. Thus, if a rogue application attempts to cause a hardware device to be operative such as a cash dispenser by communicating with the XFS layer, the security manager is operative to prevent the device driver layer from operating the hardware devices.

In this described exemplary embodiment, the security manager may further broker communications to the XFS layer. For example, when two or more applications attempt to communicate with the same hardware device through the XFS layer, the exemplary security manager may be operative to selectively control the order and timing of the communications. For example, the components of the XFS layer may be operative to wait for authorization from the security manager before sending a communication to the XFS layer. When the security manager receives multiple requests for authorization to communicate with the same hardware device and/or function of a hardware device, the XFS layer may initially authorize a first one of the application layer components to send a communication through the XFS layer. When the security manager receives an acknowledgment from the device driver layer that the first XFS communication has been received and/or has been completed, the security manager may then authorize the second application layer component to send a communication to the hardware device through the XFS layer.

The order of communications from application layer components to the XFS layer may be based on the order that the requests from the application layer components were received by the security manager. In other exemplary embodiments, the order may be based on other criteria. For example, in an exemplary embodiment, the security manager may enable an application layer component to have exclusive control over or lock on the communication with a particular hardware device and/or function of the hardware device. Such lock may be maintained until such time when the application layer component sends a communication to the security manager which relinquishes the lock. During the period of the lock, the security manager may only authorize the application layer component which created the lock to send communications through the XFS layer for the locked hardware device and/or function of the hardware device.

In this described exemplary embodiment, each of the application layer components, the device driver layer components, and the security manager may have an associated digital certificate, public key, private key, or other cryptographic information which can be used to authenticate communications between them. Communication between each application layer component and the security manager, or between each device driver layer component and the security manager may be digitally signed with a private key associated with the sending component. The exemplary embodiment of the security manager may be operative to verify the digital signature using a public key associated with the sending application layer or device driver layer component. In addition, to prevent possible man-in the middle attacks, the exemplary embodiments of the application layer components, the device driver layer components, and the security manager may be operative to perform handshaking protocols which pass encrypted information between the security manager and the application layer or device driver layer for use with establishing a secure communication channel or session between the components. Examples of methods of authenticating communications between software and/or hardware components of an ATM which may be used with the described exemplary embodiments, include the authentication methods found in U.S. patent application Ser. No. 10/620,966 filed Jul. 15, 2003 and U.S. patent application Ser. No. 10/126,728 filed Apr. 19, 2002, which are incorporated herein by reference in their entirety.

In further exemplary embodiments, components of the application layer, may further be operative to authenticate other components of the application layer prior to being responsive to each other. For example, the ODS layer components may authenticate communications from the TEC components or other application layer components prior to communicating with the XFS layer responsive to the received communications. In this described exemplary embodiment, the applications layer components may be operative to independently authenticate communications received from other application layer components. In alternative exemplary embodiments, the application layer components may be operative to use the security manager to authenticate communications. In this described exemplary embodiment, the security manager may be operative to authenticate communications on behalf of an application layer component prior to the application layer component acting on the communication. Further, in alternative exemplary embodiments, all communications between application layer objects may be passed through the security manager. The security manager may then be operative to authenticate each communication prior to forwarding the communication onto its intended recipient application layer component.

Computer software instructions used in operating the automated banking machines such as ATMs and connected computers may be loaded from computer readable media or articles of various types into the respective computers. Such computer software may be included on and loaded from one or more articles such as diskettes, CDs, or DVDs. Such software may also be included on articles such as hard disk drives, tapes, memory devices, or portable commuting devices. Other articles which include data representative of the instructions for operating computers in the manner described herein are suitable for use in achieving operation of automated banking machines and systems in accordance with exemplary embodiments.

The exemplary embodiments of the automated transaction machines and systems described herein have been described with reference to particular software components and features. Other embodiments of the invention may include other or different software components which provide similar functionality.

Thus, the features and characteristics of the embodiments previously described achieve desirable results, eliminate difficulties encountered in the use of prior devices and systems, solve problems and may attain one or more of the objectives stated above.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be deemed limited to the particular means shown in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods, processes and relationships are set forth in the appended claims.

We claim:

1. Apparatus comprising:

a diagnostic article adapted to be operatively connected to and disconnected from an ATM capable of dispensing cash, wherein the diagnostic article includes computer readable ATM service data capable of being read through operation of the ATM, wherein at least a portion of the ATM service data is encrypted and is capable of being decrypted by diagnostic software operating in at least one processor of the ATM, wherein the decrypted ATM service data is capable of being used by the diagnostic software operating in the at least one processor of the ATM to enable visual information to be provided through a display device of the ATM, at least some of which visual information is provided responsive to ATM service data read from the diagnostic article and diagnostic data stored in at least one data store of the ATM, which diagnostic data concerns at least one operational characteristic of at least one transaction function device of the ATM.

2. The apparatus according to claim 1 wherein the diagnostic article comprises a portable storage medium.

3. The apparatus according to claim 2 wherein the portable storage medium comprises a CD.

4. The apparatus according to claim 2 wherein the portable storage medium comprises a DVD.

5. The apparatus according to claim 2 wherein the portable storage medium comprises a portable flash memory device.

6. The apparatus according to claim 1, wherein the ATM service data includes data capable of being used by the diagnostic software operating in the at least one processor of the ATM to cause the visual information to be provided through the display device, which visual information includes indicia indicative of significance of the diagnostic data.

7. The apparatus according to claim 6, wherein the decrypted ATM service data enables the at least one processor to output the indicia indicative of significance.

8. The apparatus according to claim 6, wherein the indicia indicative of significance corresponds to diagnostic data stored in at least one data store of the ATM concerning at least one operational characteristic of a cash dispenser of the ATM.

9. The apparatus according to claim 1, wherein the diagnostic article includes data corresponding to at least one code capable of being read from the diagnostic article through operation of the ATM, wherein the at least one code is capable of being authenticated through operation of the at least one processor of the ATM, wherein successful authentication of the at least one code is operative to enable the diagnostic software operating in the at least one processor of the ATM to cause the visual information to be provided through the display device of the ATM, and wherein unsuccessful authentication of the at least one code is operative to prevent the diagnostic software operating in the at least one processor of the ATM from causing the visual information to be provided through the display device of the ATM.

10. The apparatus according to claim 9, wherein the encrypted ATM service data corresponds to the at least one code.

11. The apparatus according to claim 9, wherein the at least one code is capable of being authenticated with respect to at least one of a date determined through operation of the at least one processor, an input provided through an input device of the ATM, and data stored in the ATM.

12. The apparatus according to claim 11, wherein the diagnostic article includes the diagnostic software capable of being read from the diagnostic article by the at least one processor of the ATM, wherein the diagnostic software is operative in the at least one processor of the ATM to authenticate the at least one code.

13. The apparatus according to claim 1, wherein the diagnostic article includes at least a portion of the diagnostic software stored thereon.

14. The apparatus according to claim 13, wherein the diagnostic software includes a browser capable of selectively accessing different portions of ATM service data from the diagnostic article.

15. The apparatus according to claim 1, wherein the diagnostic article includes diagnostic instructions capable of enabling the at least one processor to interact with at least one of a plurality of transaction function devices in the ATM to operate to conduct at least one diagnostic test.

16. An article comprising:

computer readable media adapted to be selectively operatively connected with and disconnected from a cash dispensing automated banking machine, wherein the computer readable media includes computer executable instructions including service manual data corresponding to a plurality of service procedures for a cash dispensing automated banking machine, wherein the instructions are capable of being processed through operation of browser software to produce a plurality of outputs corresponding to a plurality of service procedures, and wherein when the article is in operative connection with a cash dispensing automated banking machine, at least one processor of the machine is operative responsive to the instructions to access diagnostic data stored in at least one data store of the machine concerning operation of at least one transaction function device of the machine, wherein the at least one transaction function device is operative to cause cash to be dispensed from the machine, and wherein the at least one processor of the machine is operative responsive to browser software operating in the at least one processor, the accessed diagnostic data and service manual data to cause at least one output device of the machine to output indicia corresponding to at least one service procedure for the machine.

* * * * *